United States Patent
Kim et al.

(10) Patent No.: US 12,045,954 B2
(45) Date of Patent: *Jul. 23, 2024

(54) METHOD AND APPARATUS FOR ADAPTIVE ARTIFICIAL INTELLIGENCE DOWNSCALING FOR UPSCALING DURING VIDEO TELEPHONE CALL

(71) Applicant: SAMSUNG ELECTRONICS CO., LTD., Suwon-si (KR)

(72) Inventors: Jaehwan Kim, Suwon-si (KR); Youngo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,248

(22) Filed: Aug. 23, 2022

(65) Prior Publication Data

US 2022/0405884 A1  Dec. 22, 2022

Related U.S. Application Data

(63) Continuation of application No. 17/330,809, filed on May 26, 2021, now Pat. No. 11,436,703.

(30) Foreign Application Priority Data

Jun. 12, 2020 (KR) .................. 10-2020-0071914
Dec. 2, 2020 (KR) .................. 10-2020-0166934

(51) Int. Cl.
*G06T 3/4092* (2024.01)
*G06T 3/10* (2024.01)
(Continued)

(52) U.S. Cl.
CPC .............. *G06T 3/4092* (2013.01); *G06T 3/10* (2024.01); *G06T 3/4046* (2013.01);
(Continued)

(58) Field of Classification Search
None
See application file for complete search history.

(56) References Cited

U.S. PATENT DOCUMENTS

| | | |
|---|---|---|
| 9,300,910 B2 | 3/2016 | Shoemake et al. |
| 10,817,985 B2 | 10/2020 | Kim et al. |
| 10,825,203 B2 | 11/2020 | Kim et al. |
| 2007/0039025 A1* | 2/2007 | Kraft ...................... H04N 7/147 348/E7.071 |

(Continued)

FOREIGN PATENT DOCUMENTS

WO   2020080873 A1   4/2020

OTHER PUBLICATIONS

International Search Report (PCT/ISA/210) and Written Opinion (PCT/ISA/237) dated Aug. 31, 2021 issued by the International Searching Authority in International Application No. PCT/KR2021/006589.

*Primary Examiner* — Peter D Le
(74) *Attorney, Agent, or Firm* — Sughrue Mion, PLLC

(57) ABSTRACT

Provided is a method of adaptively performing artificial intelligence (AI) downscaling on an image during a video telephone call of a user terminal. The method includes obtaining, from an opposite user terminal, AI upscaling support information of the opposite user terminal that is a target of a video telephone call, determining whether the user terminal is to perform AI downscaling on an original image, based on the AI upscaling support information, based on determining that the user terminal is to perform AI downscaling on the original image, obtaining a first image by AI downscaling the original image using a downscaling (Continued)

deep neural network (DNN), generating image data by performing first encoding on the first image, and transmitting AI data including information related to the AI downscaling and the image data.

15 Claims, 28 Drawing Sheets

(51) Int. Cl.
    *G06T 3/4046* (2024.01)
    *G06T 3/4053* (2024.01)
    *H04N 7/01* (2006.01)
    *H04N 7/14* (2006.01)

(52) U.S. Cl.
    CPC ......... *G06T 3/4053* (2013.01); *H04N 7/0102* (2013.01); *H04N 7/141* (2013.01)

(56) References Cited

U.S. PATENT DOCUMENTS

| | | | |
|---|---|---|---|
| 2007/0274400 A1* | 11/2007 | Murai | H04N 21/25808 375/240.26 |
| 2008/0192736 A1* | 8/2008 | Jabri | H04L 65/1063 370/352 |
| 2011/0013692 A1* | 1/2011 | Cohen | H04N 19/513 375/240.2 |
| 2012/0106669 A1* | 5/2012 | Rao | H04N 19/61 375/295 |
| 2017/0287109 A1 | 10/2017 | Tasfi | |
| 2018/0293706 A1 | 10/2018 | Viswanathan et al. | |
| 2019/0044984 A1 | 2/2019 | Chiang et al. | |
| 2020/0162789 A1* | 5/2020 | Ma | H04N 21/440263 |
| 2020/0210821 A1* | 7/2020 | Guo | G06N 3/105 |
| 2021/0021866 A1* | 1/2021 | Djokovic | H04N 19/85 |
| 2022/0239959 A1* | 7/2022 | Zhang | H04N 19/59 |

* cited by examiner

FIG. 5

| IMAGE-RELATED INFORMATION | DNN SETTING INFORMATION |
|---|---|
| SD, 10Mbps, AV1 | DNN SETTING INFORMATION A |
| HD, 15Mbps, H.264 | DNN SETTING INFORMATION B |
| Full HD, 20Mbps, HEVC | DNN SETTING INFORMATION C |
| Full HD, 15Mbps, HEVC | DNN SETTING INFORMATION D |

METHOD AND APPARATUS FOR ADAPTIVE ARTIFICIAL INTELLIGENCE DOWNSCALING FOR UPSCALING DURING VIDEO TELEPHONE CALL

CROSS-REFERENCE TO RELATED APPLICATIONS

This application is a continuation application of U.S. patent application Ser. No. 17/330,809, filed May 26, 2021, which is based on and claims priority under 35 U.S.C. § 119 to Korean Patent Application No. 10-2020-0071914, filed on Jun. 12, 2020, and Korean Patent Application No. 10-2020-0166934, filed on Dec. 2, 2020, in the Korean Intellectual Property Office, the disclosures of which are incorporated herein in their entirety by reference.

BACKGROUND

1. Field

The disclosure relates to methods and apparatuses for processing an image during a video telephone call, and more particularly, to a method and apparatus for adaptively performing downscaling by using artificial intelligence (AI) in order to upscale an image during a video telephone call.

2. Description of the Related Art

An image is encoded by a codec following a designated data compression standard, e.g., a moving picture expert group (MPEG) compression standard, and is then stored in a recording medium or transmitted via a communication channel in the form of a bitstream.

As hardware capable of video telephone calling is being developed and supplied, a need for a codec capable of effectively encoding and decoding an image during a video telephone call is increasing.

SUMMARY

Provided are a method and apparatus for adaptively performing downscaling by using artificial intelligence (AI) in order to upscale an image during a video telephone call, by which an image is adaptively downscaled based on AI according to at least one of a current communication environment or an upscaling capability of an opposite user terminal and is transmitted to the opposite user terminal.

Additional aspects will be set forth in part in the description which follows and, in part, will be apparent from the description, or may be learned by practice of the presented embodiments.

In accordance with an aspect of the disclosure, a mobile communication terminal capable of video telephone calling with an opposite user terminal, includes: a memory; and at least one processor, wherein the memory stores instructions executable by the at least one processor, and the at least one processor is configured to: obtain, from the opposite user terminal, artificial intelligence (AI) upscaling support information of the opposite user terminal that is a target of a video telephone call; determine whether to perform AI downscaling on an original image, based on the AI upscaling support information; based on determining to perform the AI downscaling on the original image, obtain a first image by AI downscaling the original image using a downscaling deep neural network (DNN); generate image data by performing first encoding on the first image; and transmit the image data and AI data including information related to the AI downscaling.

In accordance with another aspect of the disclosure, a mobile communication terminal capable of video telephone calling with an opposite user terminal, includes: a memory; and at least one processor, wherein the memory stores instructions executable by the at least one processor, and the at least one processor is configured to: transmit, to the opposite user terminal, artificial intelligence (AI) upscaling support information of the mobile communication terminal; obtain image data generated as a result of performing first encoding on a first image AI downscaled by the opposite user terminal based on the transmitted AI upscaling support information; obtain a second image corresponding to the first image by performing first decoding on the image data; and obtain an AI-upscaled reconstructed image from the second image through an upscaling deep neural network (DNN).

In accordance with another aspect of the disclosure, a method of adaptively performing artificial intelligence (AI) downscaling on an image during a video telephone call of a user terminal, includes: obtaining, from an opposite user terminal, AI upscaling support information of the opposite user terminal that is a target of a video telephone call; determining whether the user terminal is to perform AI downscaling on an original image, based on the AI upscaling support information; based on determining that the user terminal is to perform the AI downscaling on the original image, obtaining a first image by AI downscaling the original image using a downscaling deep neural network (DNN); generating image data by performing first encoding on the first image; and transmitting the image data and AI data including information related to the AI downscaling In accordance with another aspect of the disclosure, a method of performing artificial intelligence (AI) upscaling on an image during a video telephone call of a user terminal includes: transmitting, to an opposite user terminal of the video telephone call, AI upscaling support information of the user terminal; obtaining image data generated as a result of performing first encoding on a first image AI downscaled by the opposite user terminal based on the transmitted AI upscaling support information; obtaining a second image corresponding to the first image by performing first decoding on the image data; and obtaining an AI-upscaled reconstructed image from the second image through an upscaling deep neural network (DNN).

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a table showing a mapping relationship between several pieces of image-related information and several pieces of DNN setting information according to an embodiment;

DETAILED DESCRIPTION

Figure 1:
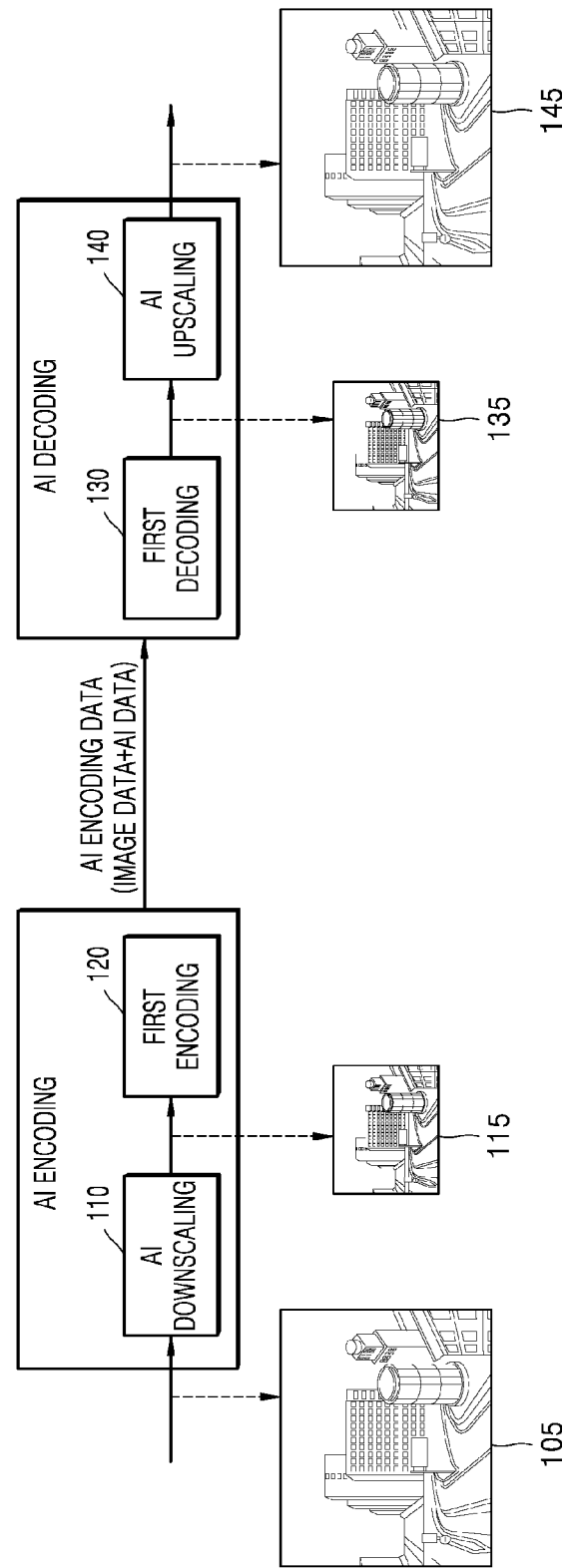
FIG. 1 is a diagram for describing an artificial intelligence (AI) encoding process and an AI decoding process, according to an embodiment.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Throughout the disclosure, expressions such as "at least one of a, b or c" indicates only a, only b, only c, both a and b, both a and c, both b and c, all of a, b, and c, or variations thereof.

Also, in the present specification, an "image" or a "picture" may denote a still image, a moving image including a plurality of consecutive still images (or frames), or a video.

Also, in the present specification, a deep neural network (DNN) is a representative example of an artificial neural network model simulating brain nerves, and is not limited to an artificial neural network model using a specific algorithm.

Also, in the present specification, a "parameter" is a value used in an operation process of each layer forming a neural network, and for example, may include a weight used when an input value is applied to a certain operation expression. Here, the parameter may be expressed in a matrix form. The parameter is a value set as a result of training, and may be updated through separate training data when necessary.

Also, in the present specification, a "first DNN" indicates a DNN used for artificial intelligence (AI) downscaling an image, and a "second DNN" indicates a DNN used for AI upscaling an image.

Also, in the present specification, "DNN setting information" includes the parameter described above as information related to the element constituting the DNN. The first DNN or the second DNN may be set by using the DNN setting information.

Also, in the present specification, an "original image" denotes an image that is an object of AI encoding, and a "first image" denotes an image obtained as a result of performing AI downscaling on the original image during an AI encoding process. A "second image" denotes an image obtained via first decoding during an AI decoding process, and a "third image" denotes an image obtained by AI upscaling the second image during the AI decoding process.

Also, in the present specification, "AI downscale" denotes a process of decreasing resolution of an image, based on AI, and "first encoding" denotes an encoding process according to an image compression method based on frequency transformation. Also, "first decoding" denotes a decoding process according to an image reconstruction method based on frequency transformation, and "AI up-scale" denotes a process of increasing resolution of an image, based on AI.

FIG. 1 is a diagram for describing an AI encoding process and an AI decoding process, according to an embodiment.

As described above, when resolution of an image remarkably increases, the throughput of information for encoding/decoding the image is increased, and accordingly, a method for improving efficiency of encoding and decoding of an image is required.

As shown in FIG. 1, according to an embodiment, a first image 115 is obtained by performing AI downscaling 110 on an original image 105 having an original resolution (e.g., high resolution, 1920×1080 resolution or higher, 3840×2160 resolution or higher, 7680×4320 resolution, etc.). Then, first encoding 120 and first decoding 130 are performed on the first image 115 having relatively low resolution (i.e., lower than the original resolution), and thus a bitrate may be largely reduced as compared to when the first encoding 120 and the first decoding 130 are performed on the original image 105.

In detail, referring to FIG. 1, the first image 115 is obtained by performing the AI downscaling 110 on the original image 105 and the first encoding 120 is performed on the first image 115, during the AI encoding process, according to an embodiment. During the AI decoding process, AI encoding data including AI data and image data, which are obtained as a result of AI encoding, is received, a second image 135 is obtained via the first decoding 130, and a third image 145 is obtained by performing AI upscaling 140 on the second image 135.

Referring to the AI encoding process in detail, when the original image 105 is received, the AI downscaling 110 is performed on the original image 105 to obtain the first image 115 of certain resolution and/or certain quality. The AI downscaling 110 is performed based on AI, and AI for the AI downscaling 110 is trained jointly with AI for the AI upscaling 140 with respect to the second image 135. This is because, when the AI for the AI downscaling 110 and the AI for the AI upscaling 140 are separately trained, a difference between the original image 105, which is an object of AI encoding, and the third image 145 reconstructed through AI decoding increases.

According to an embodiment, the AI data may be used to maintain such a joint relationship during the AI encoding process and the AI decoding process. Accordingly, the AI data obtained through the AI encoding process includes information indicating an upscaling target, and during the AI decoding process, the AI upscaling 140 is performed on the third image 135 according to the upscaling target verified based on the AI data.

The AI for the AI downscaling 110 and the AI for the AI upscaling 140 may be embodied as a DNN. As will be described below with reference to FIG. 11, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI upscaling 140 on the second image 135 to target quality and/or resolution based on the received target information.

Regarding the first encoding 120 and the first decoding 130 of FIG. 1, an information amount of the first image 115 obtained by performing the AI downscaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, AOMedia Video 1 (AV1), etc.

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Various modifications may be incorporated to the reconstructing process. For example, according to another embodiment, prediction (e.g., intra frame prediction) may be performed in the frequency domain rather than the spatial domain. Such first decoding 130 may be performed via an image reconstruction method corresponding to one of the image compression methods using frequency transformation, such as MPEG-2, H.264 AVC, MPEG-4, HEVC, VC-1, VP8, VP9, AV1, etc., which is used in the first encoding 132.

The AI encoding data obtained through the AI encoding process may include the image data obtained as a result of performing the first encoding 120 on the first image 115, and the AI data related to the AI downscaling 110 of the original image 105. The image data may be used during the first decoding 130 and the AI data may be used during the AI upscaling 140.

The image data may be transmitted in a form of a bitstream. The image data may include data obtained based on pixel values in the first image 115, for example, residual data that is a difference between the first image 115 and prediction data of the first image 115. Also, the image data includes pieces of information used during the first encoding 120 on the first image 115. For example, the image data may include prediction mode information, motion information, and quantization parameter-related information used during the first encoding 120. The image data may be generated according to a rule, for example, a syntax, of an image compression method used during the first encoding 120, from among MPEG-2, H.264 AVC, MPEG-4, HEVC, VC-1, VP8, VP9, AV1, etc.

The AI data is used in the AI up-scaling 140 based on the second DNN. As described above, because the first DNN and the second DNN are jointly trained, the AI data includes information enabling the AI upscaling 140 to be performed accurately on the second image 135 through the second DNN. During the AI decoding process, the AI upscaling 140 may be performed on the second image 135 to have targeted resolution and/or quality, based on the AI data.

The AI data may be transmitted together with the image data in the form of a bitstream. According to another embodiment, the AI data may be transmitted separately from the image data, in a form of a frame or a packet.

Alternatively, according to another embodiment, the AI data may be included in the image data and transmitted.

The image data and the AI data may be transmitted through a same type of network or different types of networks.

Figure 2:
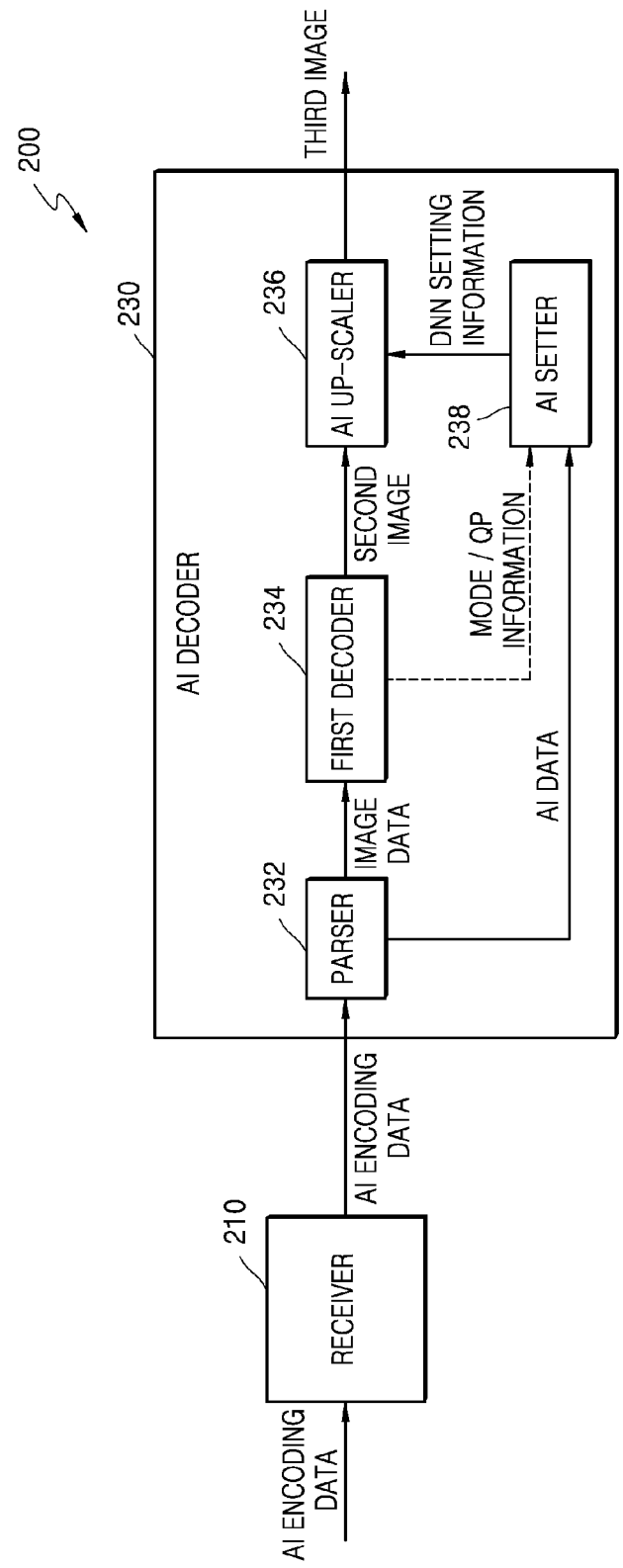
FIG. 2 is a block diagram of a structure of an AI decoding apparatus according to an embodiment.

FIG. 2 is a block diagram of a configuration of an AI decoding apparatus 200 according to an embodiment.

Referring to FIG. 2, the AI decoding apparatus 200 may include a receiver 210 and an AI decoder 230. The AI decoder 230 may include a parser 232, a first decoder 234, an AI up-scaler 236, and an AI setter 238.

In FIG. 2, the receiver 210 and the AI decoder 230 are illustrated as separate devices, but the receiver 210 and the AI decoder 230 may be implemented through one processor. In this case, the receiver 210 and the AI decoder 230 may be implemented through a dedicated processor or through a combination of software and a general-purpose processor such as an application processor (AP), a central processing unit (CPU), or a graphic processing unit (GPU). The dedicated processor may include a memory for implementing an embodiment (e.g., for storing instructions executable by the processor to perform a method according to an embodiment) or may include a memory processor for using an external memory.

The receiver 210 and the AI decoder 230 may be configured by a plurality of processors. In this case, the receiver 210 and the AI decoder 230 may be implemented through a combination of dedicated processors or through a combination of software and a plurality of general-purpose processors such as an AP, a CPU, or a GPU. According to an embodiment, the receiver 210 may be implemented using a first processor, the first decoder 234 may be implemented using a second processor different from the first processor, and the parser 232, the AI up-scaler 236, and the AI setter 238 may be implemented using a third processor different from the first and second processors. It is understood that this is just an example, and one or more other embodiments may implement the various components via any combination of one or more processors.

The receiver 210 receives AI encoding data obtained as a result of AI encoding. For example, the AI encoding data may be a video file having a file format such as mp4 or mov.

The receiver 210 may receive AI encoding data transmitted through a network. The receiver 210 outputs the AI encoding data to the AI decoder 230.

According to an embodiment, the AI encoding data may be obtained from a data storage medium including a magnetic medium (such as a hard disk, a floppy disk, or a magnetic tape), an optical recording medium (such as CD-ROM or DVD), or a magneto-optical medium (such as a floptical disk).

The parser 232 parses the AI encoding data to transmit image data obtained through first encoding on the first image 115 to the first decoder 234 and transmit AI data to the AI setter 238.

According to an embodiment, the parser 232 may parse the AI encoding data including the image data and the AI data separate from each other. The parser 232 may distinguish the AI data from the image data by reading a header within the AI encoding data. For example, the AI data may be included in a Vendor Specific InfoFrame (VSIF) within an HDMI stream.

A structure of the AI encoding data including the AI data and the image data separate from each other will be described below with reference to FIG. 9.

According to another embodiment, the parser 232 may parse the AI encoding data to obtain image data, may extract AI data from the image data, and then may transmit the AI data to the AI setter 238 and the remaining image data to the first decoder 234. In other words, the AI data may be included in the image data. For example, the AI data may be included in supplemental enhancement information (SEI) that is an additional information region of a bitstream corresponding to the image data. A structure of the AI encoding data including the image data including the AI data will be described below with reference to FIG. 10.

According to another embodiment, the parser 232 may split the bitstream corresponding to the image data into a bitstream to be processed by the first decoder 234 and a bitstream corresponding to the AI data, and may output the split two bitstreams to the first decoder 234 and the AI setter 238, respectively.

The parser 232 may verify that the image data included in the AI encoding data is image data obtained via a certain codec (for example, MPEG-2, H.264 AVC, MPEG-4, HEVC, VC-1, VP8, VP9, AV1, etc.). In this case, the parser 232 may transmit corresponding information to the first decoder 234 such that the image data is processed via the verified codec.

The first decoder 234 reconstructs the second image 135 corresponding to the first image 115, based on the image data received from the parser 232. The second image 135 obtained by the first decoder 234 is provided to the AI up-scaler 236.

According to embodiments, first decoding related information, such as prediction mode information, motion information, and quantization parameter information may be provided by the first decoder 234 to the AI setter 238. The first decoding related information may be used to obtain DNN setting information.

The AI data provided to the AI setter 238 includes pieces of information enabling the second image 135 to undergo AI upscaling. Here, an upscaling target of the second image 135 should correspond to a downscaling target of a first DNN. Accordingly, the AI data includes information for verifying the downscaling target of the first DNN.

Examples of the information included in the AI data include difference information between resolution of the original image 105 and resolution of the first image 115, and information related to the first image 115.

The difference information may be expressed as information about a resolution conversion degree of the first image 115 compared to the original image 105 (for example, resolution conversion rate information). Also, because the resolution of the first image 115 is ascertained through the resolution of the reconstructed second image 135 and the resolution conversion degree can be verified accordingly, the difference information may be expressed only as resolution information of the original image 105. Here, the resolution information may be expressed as vertical/horizontal screen sizes or as a ratio (16:9, 4:3, or the like) and a size of one axis. Also, when there is pre-set resolution information, the resolution information may be expressed in the form of an index or flag.

The information related to the first image 115 may include information about at least one of a resolution of the first image 115, a bitrate of the image data obtained as the result of performing first encoding on the first image 115, or a codec type used during the first encoding of the first image 115.

The AI setter 238 may determine the upscaling target of the second image 135, based on at least one of the difference information or the information related to the first image 115, which are included in the AI data. The upscaling target may indicate, for example, to what degree resolution is to be upscaled for the second image 135. When the upscaling target is determined, the AI up-scaler 236 performs AI upscaling on the second image 135 through a second DNN in order to obtain the third image 145 corresponding to the upscaling target.

Before describing a method, performed by the AI setter 238, of determining the upscaling target based on the AI data, an AI upscaling process through the second DNN will now be described with reference to FIGS. 3 and 4.

Figure 3:
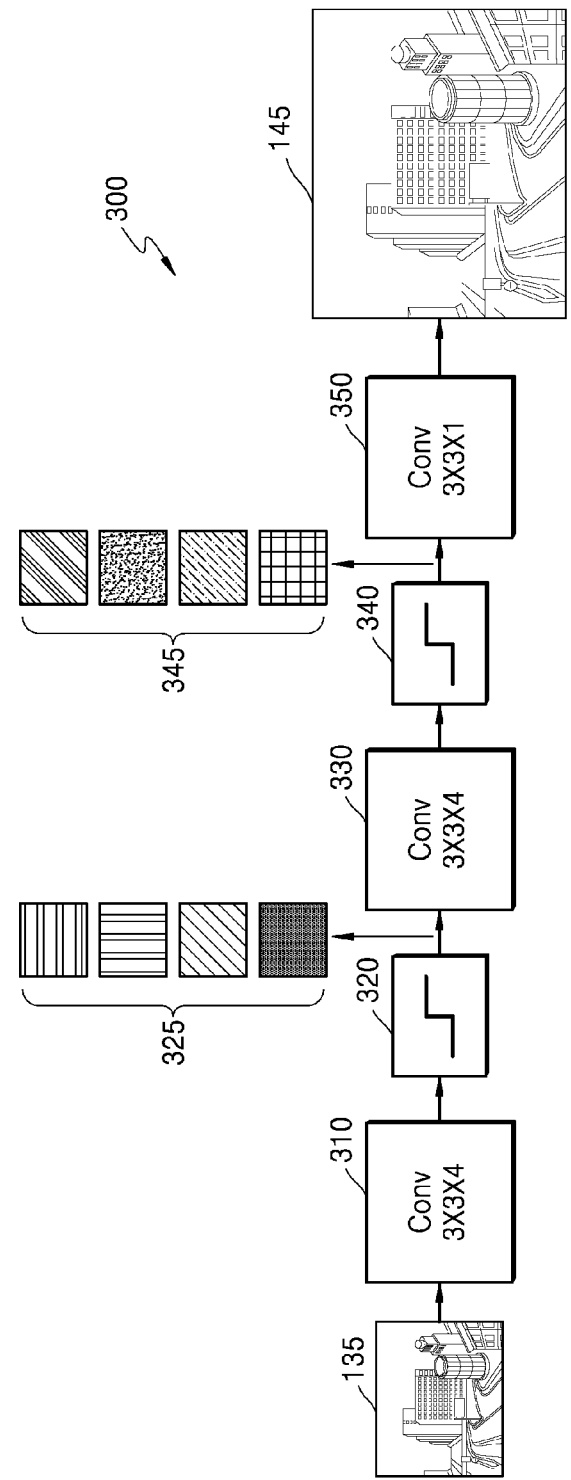
FIG. 3 is a diagram showing a second deep neural network (DNN) for performing AI upscaling on a second image according to an embodiment.
Figure 4:
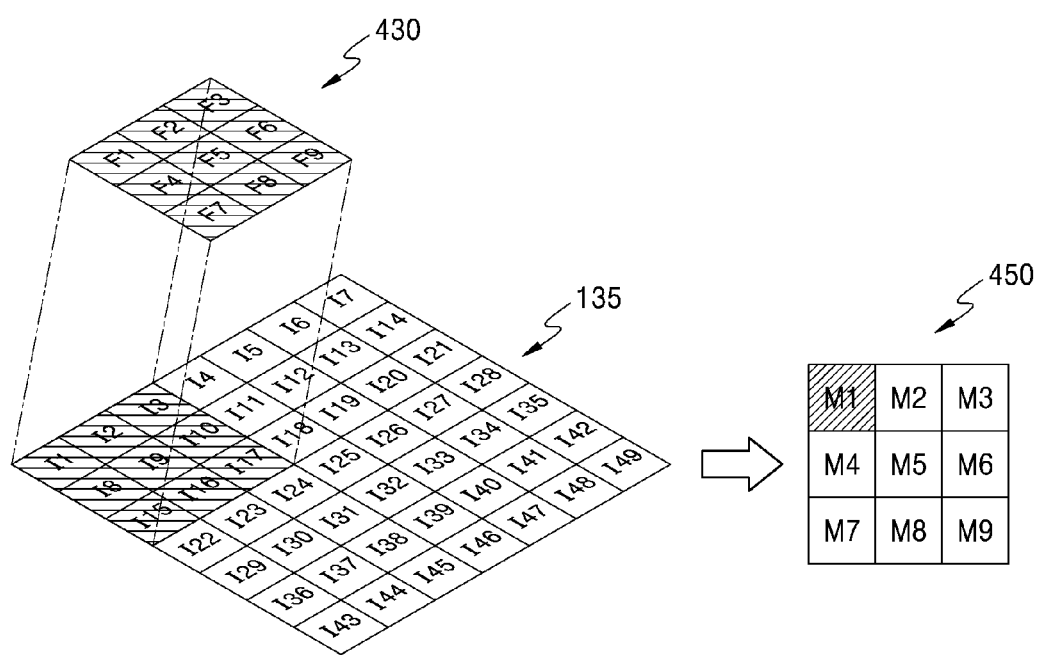
FIG. 4 is a diagram for describing a convolution operation in a convolution layer according to an embodiment.

FIG. 3 is a diagram showing a second DNN 300 for performing AI upscaling on the second image 135, and FIG. 4 is a diagram illustrating a convolution operation in a first convolution layer 310 of FIG. 3.

As shown in FIG. 3, the second image 135 is input to the first convolution layer 310. 3×3×4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic of the second image 135.

A convolution operation in the first convolution layer 310 is described in detail with reference to FIG. 4.

One feature map 450 may be generated through multiplication and addition between parameters of a filter kernel 430 having a size of 3×3 used in the first convolution layer 310 and corresponding pixel values in the second image 135. Because four filter kernels are used in the first convolution layer 310, four feature maps may be generated through the convolution operation using the four filter kernels.

I1 through I49 indicated in the second image 135 in FIG. 4 indicate pixels in the second image 135, and F1 through F9 indicated in the filter kernel 430 indicate parameters of the filter kernel 430. Also, M1 through M9 indicated in the feature map 450 indicate samples of the feature map 450.

In FIG. 4, the second image 135 includes 49 pixels, but the number of pixels is only an example. When the second image 135 has a resolution of 4K, the second image 135 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of combination (for example, addition) of result values of the multiplications may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplications may be assigned as a value of M2 of the feature map 450.

While the filter kernel 430 is moving along the stride to the last pixel of the second image 135, the convolution operation is performed between the pixel values in the second image 135 and the parameters of the filter kernel 430, and thus the feature map 450 having a certain size may be generated.

According to the present disclosure, values of parameters of a second DNN, for example, values of parameters of a filter kernel used in convolution layers of the second DNN (for example, F1 through F9 of the filter kernel 430), may be optimized through joint training of a first DNN and the second DNN. The AI setter 238 may determine an upscaling target corresponding to a downscaling target of the first DNN, based on AI data, and determine parameters corresponding to the determined upscaling target as the parameters of the filter kernel used in the convolution layers of the second DNN.

Convolution layers included in the first DNN and the second DNN may perform processes according to the convolution operation process described with reference to FIG. 4, although it is understood that this convolution operation process described with reference to FIG. 4 is only an example, and embodiments of the disclosure are not limited thereto.

Referring back to FIG. 3, the feature maps output from the first convolution layer 310 may be input to a first activation layer 320.

The first activation layer 320 may assign a non-linear feature to each feature map. The first activation layer 320 may include, but is not limited to, a sigmoid function, a Tan h function, a rectified linear unit (ReLU) function, or the like.

The first activation layer 320 assigning the non-linear feature indicates changing and outputting some sample values of the feature map, which is an output of the first convolution layer 310. Here, the changing is performed by applying the non-linear feature.

The first activation layer 320 determines whether to transmit sample values of the feature maps output from the first convolution layer 310 to a second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×3×4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×3×1 indicated in the third convolution layer 350 shown in FIG. 3 indicates that a convolution process is performed to generate one output image by using one filter kernel having a size of 3×3. The third convolution layer 350 is a layer for outputting a final image, and generates one output by using one filter kernel. According to an embodiment, the third convolution layer 350 may output the third image 145 through a convolution operation.

There may be a plurality of pieces of DNN setting information indicating the numbers of filter kernels of the first, second, and third convolution layers 310, 330, and 350 of the second DNN 300, parameters of the filter kernels of the first, second, and third convolution layers 310, 330, and 350 of the second DNN 300, and the like, as will be described below, and the plurality of pieces of DNN setting information are connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers, namely, the first, second, and third convolution layers 310, 330, and 350, and two activation layers, namely, the first and second activation layers 320 and 340, but this is only an example. According to an embodiment, the numbers of convolution layers and activation layers may vary. Also, according to an embodiment, the second DNN 300 may be implemented as a recurrent neural network (RNN). In this case, a convolutional neural network (CNN) structure of the second DNN 300 according to an embodiment is changed to an RNN structure.

According to an embodiment, the AI up-scaler 236 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from a previous layer and sample values of the filter kernel, and an adder that adds result values of the multiplication. Also, for the operation of the activation layer, the ALU may include a multiplier that multiplies an input sample value by a weight used in a pre-determined sigmoid function, a Tan h function, or an ReLU function, and a comparator that compares a multiplication result and a certain value to determine whether to transmit the input sample value to a next layer.

A method in which the AI setter 238 determines the upscaling target of the second image 135 and the AI up-scaler 236 performs the AI upscaling on the second image 135 according to the upscaling target will now be described.

According to an embodiment, the AI setter 238 may store a plurality of pieces of DNN setting information settable in a second DNN.

Here, the DNN setting information may include information about at least one of the number of convolution layers included in the second DNN, the number of filter kernels for each convolution layer, or a parameter of each filter kernel. The plurality of pieces of DNN setting information may respectively correspond to various upscaling targets, and the second DNN may operate based on DNN setting information corresponding to a certain upscaling target. The second DNN may have different structures based on the DNN setting information. For example, the second DNN may include three convolution layers according to any piece of DNN setting information, or may include four convolution layers according to another piece of DNN setting information.

According to an embodiment, the DNN setting information may only include a parameter of a filter kernel used in the second DNN. In this case, rather than the structure of the second DNN changing, only the parameter of the internal filter kernel may change based on the DNN setting information.

The AI setter 238 may obtain the DNN setting information for performing AI upscaling on the second image 135, among the plurality of pieces of DNN setting information. Each of the plurality of pieces of DNN setting information used at this time is information for obtaining the third image 145 of a pre-determined resolution and/or pre-determined quality, and is trained jointly with a first DNN.

For example, one piece of DNN setting information among the plurality of pieces of DNN setting information may include pieces of information for obtaining the third image 145 of resolution twice as high as the resolution of the second image 135, for example, the third image 145 of 4K (4096×2160) twice as high as 2K (2048×1080) of the second image 135, and another piece of DNN setting information may include pieces of information for obtaining the third image 145 of resolution four times higher than the resolution of the second image 135, for example, the third image 145 of 8K (8192×4320) four times higher than 2K (2048×1080) of the second image 135.

Figure 7:
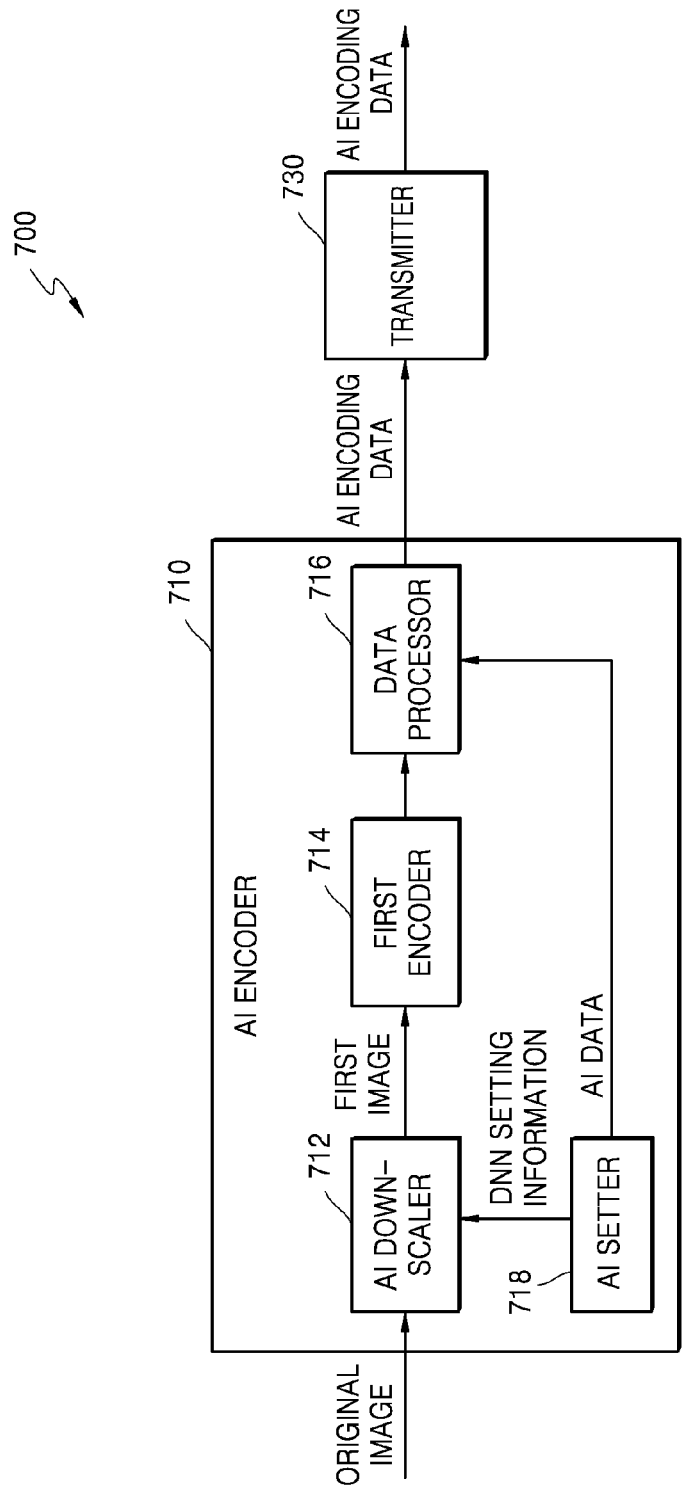
FIG. 7 is a block diagram of a structure of an AI encoding apparatus according to an embodiment.

Each of the plurality of pieces of DNN setting information is obtained jointly with DNN setting information of the first DNN of an AI encoding apparatus 700 of FIG. 7, and the AI setter 238 obtains one piece of DNN setting information among the plurality of pieces of DNN setting information according to an enlargement ratio corresponding to a reduction ratio of the DNN setting information of the first DNN. To this end, the AI setter 238 verifies information of the first DNN. In order for the AI setter 238 to verify the information of the first DNN, the AI decoding apparatus 200 according to an embodiment receives AI data including the information of the first DNN from the AI encoding apparatus 700.

In other words, the AI setter 238 may verify information targeted by DNN setting information of the first DNN used to obtain the first image 115 and obtain the DNN setting information of the second DNN trained jointly with the DNN setting information of the first DNN, by using pieces of information received from the AI encoding apparatus 700.

When DNN setting information for performing the AI upscaling on the second image 135 is obtained from among the plurality of pieces of DNN setting information, the DNN setting information may be transmitted to the AI up-scaler 236, and input data may be processed based on the second DNN operating according to the DNN setting information.

For example, when any one piece of DNN setting information is obtained, the AI up-scaler 236 sets the number of filter kernels included in each of the first, second, and third convolution layers 310, 330, and 350 of the second DNN 300 of FIG. 3, and the parameters of the filter kernels, as values included in the obtained DNN setting information.

In detail, when parameters of a filter kernel of 3×3 used in any one convolution layer of the second DNN 300 of FIG. 3 are {1, 1, 1, 1, 1, 1, 1, 1, 1} and DNN setting information is changed, the AI up-scaler 236 may replace the parameters of the filter kernel with {2, 2, 2, 2, 2, 2, 2, 2, 2} that are parameters included in the changed DNN setting information.

The AI setter 238 may obtain the DNN setting information for upscaling on the second image 135 from among the plurality of pieces of DNN setting information, based on information included in the AI data. The AI data used to obtain the DNN setting information will now be described.

According to an embodiment, the AI setter 238 may obtain the DNN setting information for upscaling on the second image 135 from among the plurality of pieces of DNN setting information, based on difference information included in the AI data. For example, when it is verified that the resolution (for example, 4K (4096×2160)) of the original image 105 is twice as high as the resolution (for example, 2K (2048×1080)) of the first image 115, based on the difference information, the AI setter 238 may obtain the DNN setting information for doubling the resolution of the second image 135.

According to another embodiment, the AI setter 238 may obtain the DNN setting information for AI upscaling on the second image 135 from among the plurality of pieces of DNN setting information, based on information related to the first image 115 included in the AI data. The AI setter 238 may pre-determine a mapping relationship between pieces of image-related information and pieces of DNN setting information, and obtain the DNN setting information mapped to the information related to the first image 115.

FIG. 5 is a table showing a mapping relationship between several pieces of image-related information and several pieces of DNN setting information according to an embodiment.

As shown in FIG. 5, the AI encoding/AI decoding according to an embodiment does not only consider a change of resolution. Rather, DNN setting information may be selected considering at least one of resolution, such as standard definition (SD), high definition (HD), or full HD, a bitrate, such as 10 Mbps, 15 Mbps, or 20 Mbps, or codec information, such as AV1, H.264, or HEVC, individually or collectively. For such consideration, training based on each element is jointly performed with encoding and decoding processes during an AI training process (see FIG. 11).

Accordingly, when a plurality of pieces of DNN setting information are provided based on image-related information including a codec type, resolution of an image, and the like, as shown in FIG. 5 according to training, the DNN setting information for AI-upscaling the second image 135 may be obtained based on the information related to the first image 115 received during the AI decoding process.

In other words, the AI setter 238 is capable of using DNN setting information according to image-related information by matching the image-related information at the left of a table of FIG. 5 with the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI setter 238 may obtain DNN setting information A among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed on the first image 115 via H.264 codec, the AI setter 238 may obtain DNN setting information B among the plurality of pieces of DNN setting information.

Also, when it is verified, from the information related to the first image 115, that the resolution of the first image 115 is full HD, the bitrate of the image data obtained as the result of performing the first encoding on the first image 115 is 20 Mbps, and the first encoding is performed on the first image 115 via HEVC codec, the AI setter 238 may obtain DNN setting information C among the plurality of pieces of DNN setting information. When it is verified, from the information related to the first image 115, that the resolution of the first image 115 is full HD, the bitrate of the image data obtained as the result of performing the first encoding on the first image 115 is 15 Mbps, and the first encoding is performed on the first image 115 via HEVC codec, the AI setter 238 may use DNN setting information D among the plurality of pieces of DNN setting information. One of the DNN setting information C and the DNN setting information D is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on a certain image quality, and accordingly, the AI setter 238 may obtain DNN setting information according to a bitrate of image data indicating the quality of the second image 135.

According to another embodiment, the AI setter 238 may obtain the DNN setting information for performing AI upscaling on the second image 135 from among the plurality of pieces of DNN setting information considering both information (prediction mode information, motion information, quantization parameter information, and the like) provided from the first decoder 234 and the information related to the first image 115 included in the AI data. For example, the AI setter 238 may receive quantization parameter information used during a first encoding process of the first image 115 from the first decoder 234, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 234 are/is considered together, compared to when only the AI data is used.

Also, according to an embodiment, the AI data may include an identifier of mutually agreed DNN setting information. An identifier of DNN setting information is information for distinguishing a pair of pieces of DNN setting information jointly trained between the first DNN and the second DNN, such that AI upscaling is performed on the second image 135 to the upscaling target corresponding to the downscaling target of the first DNN. The AI setter 238 may obtain the identifier of the DNN setting information included in the AI data and then obtain DNN setting information corresponding to the identifier of the DNN setting information, and the AI up-scaler 236 may perform AI upscaling on the second image 135 by using the DNN setting information corresponding to the identifier of the DNN setting information. For example, an identifier indicating each of the plurality of pieces of DNN setting information settable in the first DNN and an identifier indicating each of the plurality of pieces of DNN setting information settable in the second DNN may be previously designated. In this case, the same identifier may be designated for a pair of DNN setting information settable in each of the first DNN and the second DNN. The AI data may include an identifier of DNN setting information set in the first DNN for AI downscaling of the original image 105. In response to the AI data, the AI setter 238 may obtain DNN setting information indicated by the identifier included in the AI data among the plurality of pieces of DNN setting information, and the AI up-scaler 236 may perform AI upscaling on the second image 135 by using the DNN setting information indicated by the identifier included in the AI data.

Also, according to an embodiment, the AI data may include the DNN setting information. The AI setter 238 may obtain the DNN setting information included in the AI data, and the AI up-scaler 236 may perform AI upscaling on the second image 135 by using the DNN setting information included in the AI data.

According to an embodiment, when pieces of information (for example, the number of convolution layers, the number of filter kernels for each convolution layer, a parameter of each filter kernel, and the like) constituting the DNN setting information are stored in a form of a lookup table, the AI setter 238 may obtain the DNN setting information by combining some values selected from the values in the lookup table, based on information included in the AI data, and the AI up-scaler 236 may perform AI upscaling on the second image 135 by using the obtained DNN setting information.

According to an embodiment, when a structure of a DNN corresponding to the upscaling target is determined, the AI setter 238 may obtain the DNN setting information, for example, parameters of a filter kernel, corresponding to the determined structure of the DNN.

As described above, the AI setter 238 obtains the DNN setting information of the second DNN through the AI data including information related to the first DNN, and the AI up-scaler 236 may perform AI upscaling on the second image 135 through the second DNN set based on the obtained DNN setting information, In this case, memory usage and throughput may be reduced compared to when features of the second image 135 are directly analyzed for upscaling.

According to an embodiment, when the second image 135 includes a plurality of frames, the AI setter 238 may independently obtain DNN setting information in units of a certain number of frames (where the certain number is one or an integer greater than one), or may obtain common DNN setting information for all of the plurality of frames.

Figure 6:
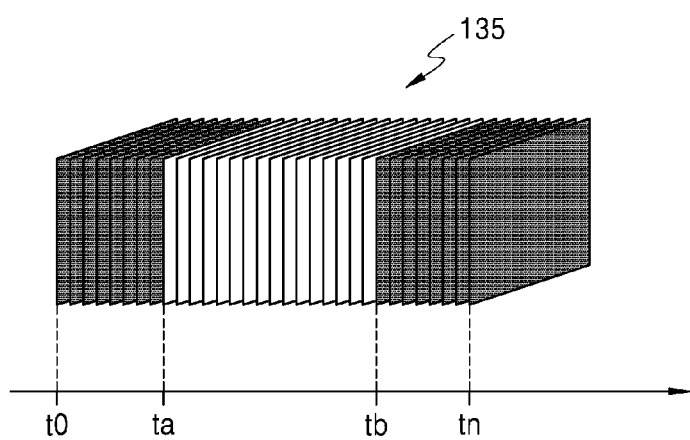
FIG. 6 is a diagram showing a second image including a plurality of frames according to an embodiment.

FIG. 6 is a diagram showing the second image 135 including a plurality of frames according to an embodiment.

As shown in FIG. 6, the second image 135 may include frames t0 through tn.

According to an embodiment, the AI setter 238 may obtain DNN setting information of a second DNN through AI data, and the AI up-scaler 236 may perform AI upscaling on the frames t0 through tn based on the obtained DNN setting information. In other words, the frames t0 through tn may be AI-upscaled based on common DNN setting information.

According to another embodiment, the AI setter 238 may obtain DNN setting information 'A' from AI data, for some of the frames t0 through tn, for example, the frames t0 through ta, and may obtain DNN setting information 'B' from the AI data, for the frames ta+1 through tb. Also, the AI setter 238 may obtain DNN setting information 'C' from the AI data, for the frames tb+1 through tn. In other words, the AI setter 238 may independently obtain DNN setting information for each group including a certain number of frames (where the certain number is one or an integer greater than one) among the plurality of frames, and the AI up-scaler 236 may perform AI upscaling on the frames included in each group by using the independently-obtained DNN setting information.

According to another embodiment, the AI setter 238 may independently obtain DNN setting information for each frame forming the second image 135. In other words, when the second image 135 includes three frames, the AI setter 238 may obtain DNN setting information in relation to a first frame, obtain DNN setting information in relation to a second frame, and obtain DNN setting information in relation to a third frame. In other words, DNN setting information may be obtained independently for each of the first, second, and third frames. DNN setting information may be independently obtained for each frame included in the second image 135, according to a method of obtaining DNN setting information based on information (prediction mode information, motion information, quantization parameter information, or the like) provided from the first decoder 234 and information related to the first image 115 included in the AI data. This is because the mode information, the quantization parameter information, or the like may be determined independently for each frame included in the second image 135.

According to another embodiment, the AI data may include information indicating for up to which frame is DNN setting information valid, the DNN setting information being obtained based on the AI data. For example, when the AI data includes information indicating that DNN setting information is valid for up to the frame ta, the AI setter 238 may obtain DNN setting information, based on the AI data, and the AI up-scaler 236 may perform AI upscaling on the frames t0 through ta by using the obtained DNN setting information. Also, when another piece of AI data includes information indicating that DNN setting information is valid for up to the frame tn, the AI setter 238 may obtain DNN setting information, based on the other piece of AI data, and the AI up-scaler 236 may perform AI upscaling on the frames ta+1 through tn by using the obtained DNN setting information.

The AI encoding apparatus 700 for performing AI encoding on the original image 105 will now be described with reference to FIG. 7.

FIG. 7 is a block diagram of a configuration of the AI encoding apparatus 700 according to an embodiment.

Referring to FIG. 7, the AI encoding apparatus 700 may include an AI encoder 710 and a transmitter 730. The AI encoder 710 may include an AI down-scaler 712, a first encoder 714, a data processor 716, and an AI setter 718.

In FIG. 7, the AI encoder 710 and the transmitter 730 are illustrated as separate devices. However, the AI encoder 710 and the transmitter 730 may be implemented through one processor. In this case, the AI encoder 710 and the transmitter 730 may be implemented through a dedicated processor or through a combination of software and a general-purpose processor such as an AP, a CPU or a GPU. The dedicated processor may include a memory for implementing an embodiment (e.g., for storing instructions executable by the processor to perform a method according to an embodiment) or may include a memory processor for using an external memory.

Also, the AI encoder 710 and the transmitter 730 may be configured by a plurality of processors. In this case, the AI encoder 710 and the transmitter 730 may be implemented through a combination of dedicated processors or through a combination of software and a plurality of general-purpose processors such as an AP, a CPU, or a GPU.

According to an embodiment, the first encoder 714 may be configured by a first processor, the AI down-scaler 712, the data processor 716, and the AI setter 718 may be implemented using a second processor different from the first processor, and the transmitter 730 may be implemented using a third processor different from the first and second processors. It is understood that this is just an example, and one or more other embodiments may implement the various components via any combination of one or more processors. The AI encoder 710 performs AI downscaling on the original image 105 and first encoding on the first image 115, and transmits AI encoding data to the transmitter 730. The transmitter 730 transmits the AI encoding data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes pieces of information used during a first encoding process of the first image 115. For example, the image data may include prediction mode information, motion information, and quantization parameter information used to perform the first encoding on the first image 115, for example.

The AI data includes pieces of information enabling the AI up-scaler 236 to perform AI upscaling on the second image 135 to an upscaling target corresponding to a downscaling target of a first DNN. According to an embodiment, the AI data may include difference information between the original image 105 and the first image 115. According to an embodiment, the AI data may include information related to the first image 115. The information related to the first image 115 may include information about at least one of a resolution of the first image 115, a bitrate of the image data obtained as the result of performing first encoding on the first image 115, or a codec type used during the first encoding of the first image 115.

According to an embodiment, the AI data may include an identifier of mutually agreed DNN setting information such that the AI upscaling is performed on the second image 135 to the upscaling target corresponding to the downscaling target of the first DNN.

Also, according to an embodiment, the AI data may include DNN setting information settable in a second DNN.

The AI down-scaler 712 may obtain the first image 115 obtained by performing the AI downscaling on the original image 105 through the first DNN. The AI down-scaler 712 may perform AI downscaling on the original image 105 by using DNN setting information provided by the AI setter 718. The AI setter 718 may determine the downscaling target of the original image 105, based on a pre-determined standard.

In order to obtain the first image 115 matching the downscaling target, the AI setter 718 may store a plurality of pieces of DNN setting information settable in the first DNN. The AI setter 718 obtains DNN setting information corresponding to the downscaling target from among the plurality of pieces of DNN setting information, and provides the obtained DNN setting information to the AI down-scaler 712.

Each of the plurality of pieces of DNN setting information may be trained to obtain the first image 115 of pre-determined resolution and/or pre-determined quality. For example, any one piece of DNN setting information among the plurality of pieces of DNN setting information may include pieces of information for obtaining the first image 115 of resolution that is half resolution of the original image 105, for example, the first image 115 of 2K (2048×1080) that is half of 4K (4096×2160) of the original image 105, and another piece of DNN setting information may include pieces of information for obtaining the first image 115 of resolution that is quarter resolution of the original image 105, for example, the first image 115 of 2K (2048×1080) that is quarter of 8K (8192×4320) of the original image 105.

According to an embodiment, when pieces of information (for example, the number of convolution layers, the number of filter kernels for each convolution layer, a parameter of each filter kernel, and the like) constituting the DNN setting information are stored in a form of a lookup table, the AI setter 718 may provide, to the AI down-scaler 712, the DNN setting information obtained by combining some values selected from the values in the lookup table, based on the downscaling target.

According to an embodiment, the AI setter 718 may determine a structure of a DNN corresponding to the downscaling target, and obtain DNN setting information corresponding to the determined structure of the DNN, for example, obtain parameters of a filter kernel.

The plurality of pieces of DNN setting information for performing the AI downscaling on the original image 105 may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 712 may obtain the first image 115 of certain resolution and/or certain quality through the first DNN by setting the first DNN with the DNN setting information selected to perform the AI downscaling on the original image 105. When the DNN setting information for performing the AI downscaling on the original image 105 is obtained from the plurality of pieces of DNN setting information, each layer in the first DNN may process input data, based on pieces of information included in the DNN setting information.

A method, performed by the AI setter 718, of determining the downscaling target will now be described. The downscaling target may indicate, for example, by how much the resolution is decreased from the original image 105 to obtain the first image 115.

The AI setter 718 obtains one or more pieces of input information. According to an embodiment, the input information may include at least one of target resolution of the first image 115, a target bitrate of the image data, a bitrate type of the image data (for example, a variable bitrate type, a constant bitrate type, or an average bitrate type), a color format (luminance component, chrominance component, red component, green component, and/or blue component, by way of example) to which AI downscaling is applied, a codec type for first encoding, compression history information, resolution of the original image 105, or a type of the original image 105.

The one or more pieces of input information may include information pre-stored in the AI encoding apparatus 700 or information received from a user.

The AI setter 718 controls an operation of the AI up-scaler 712, based on the input information. According to an embodiment, the AI setter 718 may determine a downscaling target according to the input information, and may provide DNN setting information corresponding to the determined downscaling target to the AI down-scaler 712.

According to an embodiment, the AI setter 718 transmits at least a part of the input information to the first encoder 714, and thus the first encoder 714 may perform first encoding on the first image 115 via a bitrate of a certain value, a bitrate of a certain type, and a certain codec.

According to an embodiment, the AI setter 718 may determine the downscaling target, based on at least one of a compression ratio (for example, a resolution difference between the original image 105 and the first image 115, a target bitrate, or the like), a compression quality (for example, a type of bitrate), compression history information, or a type of the original image 105.

For example, the AI setter 718 may determine the downscaling target, based on the compression ratio, the compression quality, or the like, which is pre-set or received from a user.

As another example, the AI setter 718 may determine the downscaling target by using the compression history information stored in the AI encoding apparatus 700. For example, according to the compression history information usable by the AI encoding apparatus 700, an encoding quality, a compression ratio, or the like preferred by the user may be determined, and the downscaling target may be determined according to the encoding quality determined based on the compression history information. For example, the resolution, quality, or the like of the first image 115 may be determined according to the encoding quality that has been used most often according to the compression history information.

As another example, the AI setter 718 may determine the downscaling target based on the encoding quality that has been used more frequently than a certain (e.g., pre-determined) threshold value (for example, an average quality of the encoding qualities that have been used more frequently than the certain threshold value), according to the compression history information.

As another example, the AI setter 718 may determine the downscaling target, based on the resolution, type (for example, a file format), or the like of the original image 105.

According to an embodiment, when the original image 105 includes a plurality of frames, the AI setter 718 may independently obtain DNN setting information in units of a certain number of frames (where the certain number is one or an integer greater than one), or may provide the independently-obtained DNN setting information to the AI down-scaler 712.

According to an embodiment, the AI setter 718 may divide the frames included in the original image 105 into a certain number of groups, and independently determine the downscaling target for each group. The same or different pieces of DNN setting information may be obtained for each group. The numbers of frames included in the groups may be the same or different according to each group.

According to another embodiment, the AI setter 718 may independently determine DNN setting information for each of the frames included in the original image 105. The same or different pieces of DNN setting information may be obtained for each frame.

An example of a structure of a first DNN 800 on which AI downscaling is based will now be described.

Figure 8:
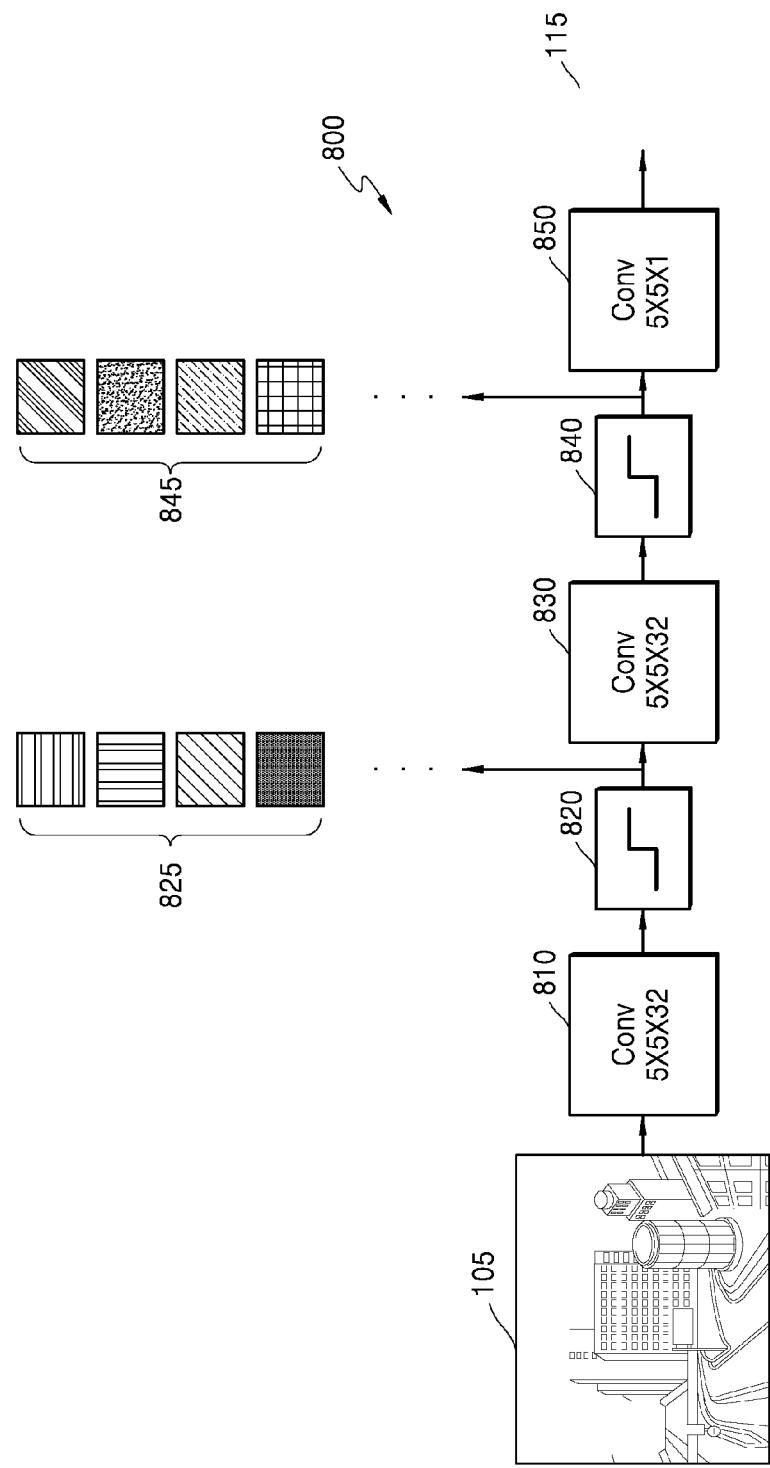
FIG. 8 is a diagram showing a first DNN for performing AI downscaling on an original image according to an embodiment.

FIG. 8 is a diagram showing the first DNN 800 for performing AI downscaling on the original image 105 according to an embodiment.

As shown in FIG. 8, the original image 105 is input to a first convolution layer 810. The first convolution layer 810 performs a convolution process on the original image 105 by using 32 filter kernels having a size of 5×5. 32 feature maps generated as a result of the convolution process are input to a first activation layer 820. The first activation layer 820 may assign a non-linear feature to the 32 feature maps.

The first activation layer 820 determines whether to transmit sample values of the feature maps output from the first convolution layer 810 to a second convolution layer 830. For example, some of the sample values of the feature maps are activated by the first activation layer 820 and transmitted to the second convolution layer 830, and some of the sample values are deactivated by the first activation layer 820 and not transmitted to the second convolution layer 830. Information represented by the feature maps output from the first convolution layer 810 is emphasized by the first activation layer 820.

An output 825 of the first activation layer 820 is input to a second convolution layer 830. The second convolution layer 830 performs a convolution process on input data by using 32 filter kernels having a size of 5×5. 32 feature maps output as a result of the convolution process may be input to a second activation layer 840, and the second activation layer 840 may assign a non-linear feature to the 32 feature maps.

An output 845 of the second activation layer 840 is input to a third convolution layer 850. The third convolution layer 850 performs a convolution process on input data by using one filter kernel having a size of 5×5. As a result of the convolution process, one image may be output from the third convolution layer 850. The third convolution layer 850 is a layer for outputting a final image, and obtains one output by using one filter kernel. According to an embodiment, the third convolution layer 850 may output the first image 115 as a result of a convolution operation.

There may be a plurality of pieces of DNN setting information indicating the numbers of filter kernels of the first, second, and third convolution layers 810, 830, and 850 of the first DNN 800, parameters of the filter kernels of the first, second, and third convolution layers 810, 830, and 850 of the first DNN 800, and the like, and the plurality of pieces of DNN setting information are connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 8, the first DNN 800 includes three convolution layers, namely, the first, second, and third convolution layers 810, 830, and 850, and two activation layers, namely, the first and second activation layers 820 and 840, but this is only an example. According to an embodiment, the numbers of convolution layers and activation layers may vary. Also, according to an embodiment, the first DNN 800 may be implemented as an RNN. In this case, a CNN structure of the first DNN 800 according to an embodiment is changed to an RNN structure.

According to an embodiment, the AI down-scaler 712 may include at least one ALU for the convolution operation and the operation of the activation layer. The ALU may be implemented as a processor. For the convolution operation, the ALU may include a multiplier that performs multiplication between sample values of the original image 105 or the feature map output from a previous layer and sample values of the filter kernel, and an adder that adds result values of the multiplication. Also, for the operation of the activation layer, the ALU may include a multiplier that multiplies an input sample value by a weight used in a pre-determined sigmoid function, a Tan h function, or an ReLU function, and a comparator that compares a multiplication result and a certain value to determine whether to transmit the input sample value to a next layer.

Referring back to FIG. 7, the AI setter 718 transmits AI data to the data processor 716. The AI data includes pieces of information enabling the AI up-scaler 236 to perform AI upscaling on the second image 135 to an upscaling target corresponding to a downscaling target of a first DNN. Upon receiving the first image 115 from the AI down-scaler 712, the first encoder 714 may reduce an information amount of the first image 115 by performing first encoding on the first image 115 according to an image compression method based on frequency transformation. Image data is obtained as a result of the first encoding via a certain codec (for example, MPEG-2, H.264 AVC, MPEG-4, HEVC, VC-1, VP8, VP9, AV1, etc.). The image data is generated according to the rule, namely, the syntax, of the certain codec. For example, the image data may include residual data that is a difference between the first image 115 and prediction data of the first image 115, and prediction mode information, motion information, and quantization parameter information used to perform the first encoding on the first image 115. The image data obtained as a result of the first encoding by the first encoder 714 is provided to the data processor 716.

The data processor 716 generates AI encoding data including the image data received from the first encoder 714 and the AI data received from the AI setter 718.

According to an embodiment, the data processor 716 may generate AI encoding data including the image data and the AI data separate from each other. For example, the AI data may be included in a VSIF within an HDMI stream.

According to another embodiment, the data processor 716 may include AI data within the image data obtained as a result of the first encoding by the first encoder 714, and may generate AI encoding data including the image data. For example, the data processor 716 may combine a bitstream corresponding to the image data with a bitstream corresponding to the AI data to generate image data in a form of one bitstream. To this end, the data processor 716 may express the AI data in a form of bits each having a value of 0 or 1, namely, a bitstream. According to an embodiment, the data processor 716 may include the bitstream corresponding to the AI data in supplemental enhancement information (SEI) that is an additional information region of a bitstream obtained as a result of the first encoding.

The AI encoding data is transmitted to the transmitter 730. The transmitter 730 transmits the AI encoding data obtained as the result of AI encoding through a network. According to an embodiment, the AI encoding data may be stored in a data storage medium including a magnetic medium (such as a hard disk, a floppy disk, or a magnetic tape), an optical recording medium (such as CD-ROM or DVD), or a magneto-optical medium (such as a floptical disk).

Figure 9:
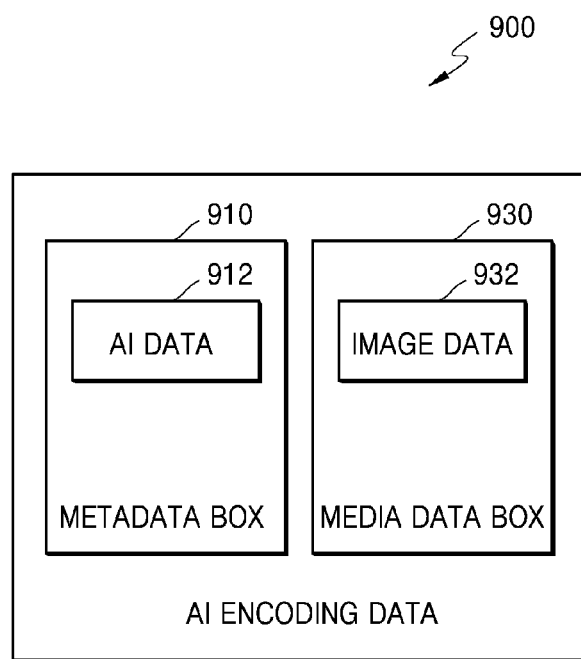
FIG. 9 is a block diagram of a configuration of AI encoding data according to an embodiment.

FIG. 9 is a block diagram of a configuration of AI encoding data 900 according to an embodiment.

As described above, the AI encoding data 900 may include AI data 912 and image data 932 separate from each other. The AI encoding data 900 may be a container format such as MP4, AVI, MKV, or FLV. The AI encoding data 900 may be configured with a metadata box 910 and a media data box 930.

The metadata box 910 includes information about the image data 932 included in the media data box 930. For example, the metadata box 910 may include information about at least one of the type of the first image 115, the type of a codec used to encode the first image 115, or a reproduction duration of the first image 115. The metadata box 910 may include the AI data 912. The AI data 912 may be encoded according to an encoding method provided in a certain container format and may be stored in the metadata box 910.

The media data box 930 may include the image data 932 generated according to the syntax of a certain image compression method.

Figure 10:
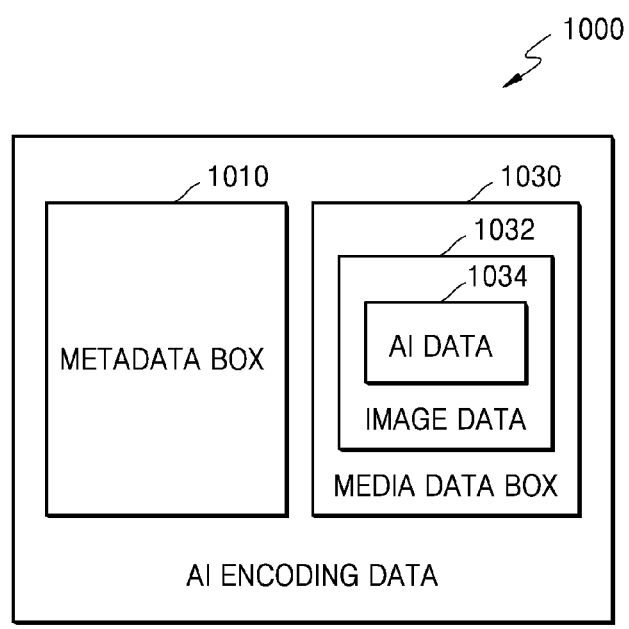
FIG. 10 is a block diagram of a configuration of AI encoding data according to another embodiment.

FIG. 10 is a block diagram of a configuration of AI encoding data 1000 according to another embodiment.

Referring to FIG. 10, AI data 1034 may be included in image data 1032. The AI encoding data 1000 may include a metadata box 1010 and a media data box 1030. When the AI data 1034 is included in the image data 1032, the metadata box 1010 may not include the AI data 1034.

The media data box 1030 may include the image data 1032 including the AI data 1034. For example, the AI data 1034 may be included in an additional information region of the image data 1032.

A method of jointly training the first DNN 800 and the second DNN 300 will now be described with reference to FIG. 11.

Figure 11:
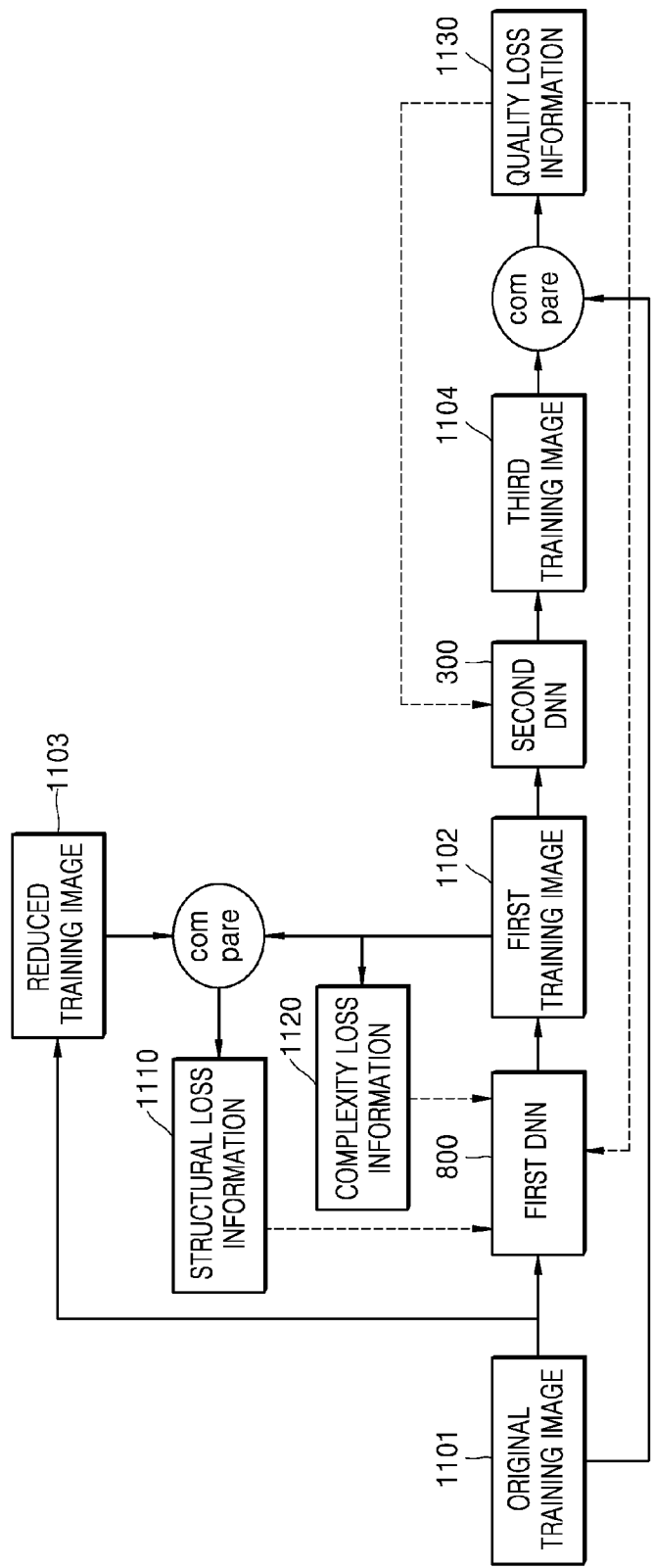
FIG. 11 is a diagram for describing a method of training a first DNN and a second DNN according to an embodiment.

FIG. 11 is a diagram for describing a method of training the first DNN 800 and the second DNN 300.

According to an embodiment, the original image 105 on which AI encoding is performed through an AI encoding process is reconstructed to the third image 145 via an AI decoding process, and, in order to maintain similarity between the third image 145 obtained as a result of AI decoding and the original image 105, connectivity between the AI encoding process and the AI decoding process is required. In other words, information lost in the AI encoding process is to be reconstructed during the AI decoding process, and, to this end, the first DNN 800 and the second DNN 300 are jointly trained.

For accurate AI decoding, ultimately, quality loss information 1130 corresponding to a result of comparing a third training image 1104 and an original training image 1101 shown in FIG. 11 is to be reduced. Accordingly, the quality loss information 1130 is used to train both of the first DNN 800 and the second DNN 300.

First, a training process shown in FIG. 11 will be described.

In FIG. 11, the original training image 1101 is an image on which AI downscaling is to be performed, and a first training image 1102 is an image obtained by performing AI downscaling on the original training image 1101. Also, the third training image 1104 is an image obtained by performing AI upscaling on the first training image 1102.

The original training image 1101 includes a still image or a moving image including a plurality of frames. According to an embodiment, the original training image 1101 may include a luminance image extracted from the still image or the moving image including the plurality of frames. According to an embodiment, the original training image 1101 may include a patch image extracted from the still image or the moving image including the plurality of frames. When the original training image 1101 includes the plurality of frames, the first training image 1102, a second training image, and the third training image 1104 also each include a plurality of frames. When the plurality of frames of the original training image 1101 are sequentially input to the first DNN 800, the plurality of frames of the first training image 1102, the second training image, and the third training image 1104 may be sequentially obtained through the first DNN 800 and the second DNN 300.

For joint training of the first DNN 800 and the second DNN 300, the original training image 1101 is input to the first DNN 800. The original training image 1101 input to the first DNN 800 is output as the first training image 1102 via the AI downscaling, and the first training image 1102 is input to the second DNN 300. The third training image 1104 is output as a result of performing the AI upscaling on the first training image 1102.

Referring to FIG. 11, the first training image 1102 is input to the second DNN 300. According to an embodiment, a second training image obtained as first encoding and first decoding are performed on the first training image 1102 may be input to the second DNN 300. In order to input the second training image to the second DNN 300, any one codec among MPEG-2, H.264, MPEG-4, HEVC, VC-1, VP8, VP9, AV1, etc., may be used. In detail, any one codec among MPEG-2, H.264, MPEG-4, HEVC, VC-1, VP8, VP9, AV1, etc., may be used to perform first encoding on the first training image 1102 and first decoding on image data corresponding to the first training image 1102.

Referring to FIG. 11, separate from the first training image 1102 being output through the first DNN 800, a reduced training image 1103 is obtained by performing legacy downscaling on the original training image 1101. Here, the legacy downscaling may include at least one of bilinear scaling, bicubic scaling, lanczos scaling, or stair step scaling.

In order to prevent a structural feature of the first image 115 from deviating greatly from a structural feature of the original image 105, the reduced training image 1103 is obtained to preserve the structural feature of the original training image 1101.

Before training is performed, the first DNN 800 and the second DNN 300 may be set with pre-determined DNN setting information. When the training is performed, structural loss information 1110, complexity loss information 1120, and the quality loss information 1130 may be determined.

The structural loss information 1110 may be determined based on a result of comparing the reduced training image 1103 and the first training image 1102. For example, the structural loss information 1110 may correspond to a difference between structural information of the reduced training image 1103 and structural information of the first training image 1102. Structural information may include various features extractable from an image, such as luminance, contrast, histogram, or the like of the image. The structural loss information 1110 indicates how much structural information of the original training image 1101 is maintained in the first training image 1102. When the structural loss information 1110 is small, the structural information of the first training image 1102 is similar to the structural information of the original training image 1101.

The complexity loss information 1120 may be determined based on spatial complexity of the first training image 1102. For example, a total variance value of the first training image 1102 may be used as the spatial complexity. The complexity loss information 1120 is related to a bitrate of image data obtained by performing first encoding on the first training image 1102. The bitrate of the image data is low when the complexity loss information 1120 is small.

The quality loss information 1130 may be determined based on a result of comparing the original training image 1101 with the third training image 1104. The quality loss information 1130 may include at least one of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multi-method Assessment Fusion (VMAF) value regarding the difference between the original training image 1101 and the third training image 1104. The quality loss information 1130 indicates how much the third training image 1104 is similar to the original training image 1101. The third training image 1104 is more similar to the original training image 1101 when the quality loss information 1130 is small.

Referring to FIG. 11, the structural loss information 1110, the complexity loss information 1120, and the quality loss information 1130 are used to train the first DNN 800, and the quality loss information 1130 is used to train the second DNN 300. In other words, the quality loss information 1130 is used to train both the first DNN 800 and the second DNN 300.

The first DNN 800 may update a parameter such that final loss information determined based on the structural loss information 1110, the complexity loss information 1120, and the quality loss information 1130 is reduced or minimized. Also, the second DNN 300 may update a parameter such that the quality loss information 1130 is reduced or minimized.

The final loss information for training the first DNN 800 and the second DNN 300 may be determined as Equation 1 below.

$$\text{Loss}DS = a*\text{Structural loss information} + b*\text{Complexity loss information} + c*\text{Quality loss information} \quad \text{Loss}US = d*\text{Quality loss information} \quad \text{[Equation 1]}$$

In Equation 1, LossDS indicates final loss information to be reduced or minimized to train the first DNN 800, and LossUS indicates final loss information to be reduced or minimized to train the second DNN 300. Also, a, b, c and d may correspond to pre-determined certain weights.

In other words, the first DNN 800 updates parameters in a direction where LossDS of Equation 1 is reduced, and the second DNN 300 updates parameters in a direction where LossUS is reduced. When the parameters of the first DNN 800 are updated according to LossDS derived during the training, the first training image 1102 obtained based on the updated parameters becomes different from a previous first training image 1102 obtained during previous training, and accordingly, the third training image 1104 also becomes different from a previous third training image 1104 obtained during the previous training. When the third training image 1104 becomes different from the previous third training image 1104, the quality loss information 1130 is also newly determined, and the second DNN 300 updates the parameters accordingly. When the quality loss information 1130 is newly determined, LossDS is also newly determined, and thus the first DNN 800 updates the parameters according to the newly determined LossDS. In other words, updating of the parameters of the first DNN 800 leads to updating of the parameters of the second DNN 300, and the updating of the parameters of the second DNN 300 leads to updating of the parameters of the first DNN 800. Thus, because the first DNN 800 and the second DNN 300 are jointly trained by sharing the quality loss information 1130, the parameters of the first DNN 800 and the parameters of the second DNN 300 may be jointly optimized.

Referring to Equation 1, it is verified that LossUS is determined according to the quality loss information 1130, but this is only an example. LossUS may be determined based on at least one of the structural loss information 1110 or the complexity loss information 1120, and the quality loss information 1130.

It has been described above that the AI setter 238 of the AI decoding apparatus 200 and the AI setter 718 of the AI encoding apparatus 700 store the plurality of pieces of DNN setting information. Methods of training each of the plurality of pieces of DNN setting information stored in the AI setter 238 and the AI setter 718 will now be described.

As described with reference to Equation 1, the first DNN 800 updates the parameters, based on the similarity (the structural loss information 1110) between the structural information of the first training image 1102 and the structural information of the original training image 1101, the bitrate (the complexity loss information 1120) of the image data obtained as a result of performing first encoding on the first training image 1102, and the difference (the quality loss information 1130) between the third training image 1104 and the original training image 1101.

In detail, the parameters of the first DNN 800 may be updated such that the first training image 1102 having similar structural information as the original training image 1101 is obtained and the image data having a small bitrate is obtained when first encoding is performed on the first training image 1102 and also such that the second DNN 300 performing AI upscaling on the first training image 802 may obtain the third training image 1104 similar to the original training image 1101.

A direction in which the parameters of the first DNN 800 are optimized varies by adjusting the weights a, b, and c of Equation 1. For example, when the weight b is determined to be high, the parameters of the first DNN 800 may be updated by prioritizing a low bitrate over the high quality of the third training image 1104. Also, when the weight c is determined to be high, the parameters of the first DNN 800 may be updated by prioritizing high quality of the third training image 1104 over a high bitrate or maintenance of the structural information of the original training image 1101.

Also, the direction in which the parameters of the first DNN 800 are optimized may vary according to a type of codec used to perform first encoding on the first training image 1102. This is because the second training image to be input to the second DNN 300 may vary according to the type of codec.

In other words, the parameters of the first DNN 800 and the parameters of the second DNN 300 may be jointly updated based on the weights a, b, and c, and the type of codec for performing first encoding on the first training image 1102. Accordingly, when the first DNN 800 and the second DNN 300 are trained after determining the weights a, b, and c each to be a certain value and determining the type of codec to be a certain type, the parameters of the first DNN 800 and the parameters of the second DNN 300 connected and optimized to each other may be determined.

Also, when the first DNN 800 and the second DNN 300 are trained after changing the weights a, b, and c, and the type of codec, the parameters of the first DNN 800 and the parameters of the second DNN 300 connected to each other and optimized may be determined. In other words, the plurality of pieces of DNN setting information jointly trained with each other may be determined in the first DNN 800 and the second DNN 300, when the first DNN 800 and the second DNN 300 are trained while changing values of the weights a, b, and c, and the value of each type of codec.

As described above with reference to FIG. 5, the plurality of pieces of DNN setting information of the first DNN 800 and the second DNN 300 may be mapped to pieces of information related to a first image. To set such a mapping relationship, first encoding may be performed on the first training image 1102 output from the first DNN 800, via a certain codec according to a certain bitrate, and the second training image obtained by performing first decoding on a bitstream obtained as a result of performing the first encoding may be input to the second DNN 300. In other words, a DNN setting information pair mapped to the resolution of the first training image 1102, a type of the codec used to perform the first encoding on the first training image 1102, and the bitrate of the bitstream obtained as a result of performing the first encoding on the first training image 1102 may be determined by training the first DNN 800 and the second DNN 300 after setting an environment such that the first encoding is performed on the first training image 1102 of a certain resolution via the certain codec according to the certain bitrate. The mapping relationships between the plurality of pieces of DNN setting information of the first DNN 800 and the second DNN 300 and the pieces of information related to the first image may be determined by variously changing the resolution of the first training image 1102, the type of codec used to perform the first encoding on the first training image 1102, and the bitrate of the bitstream obtained according to the first encoding of the first training image 1102.

Figure 12:
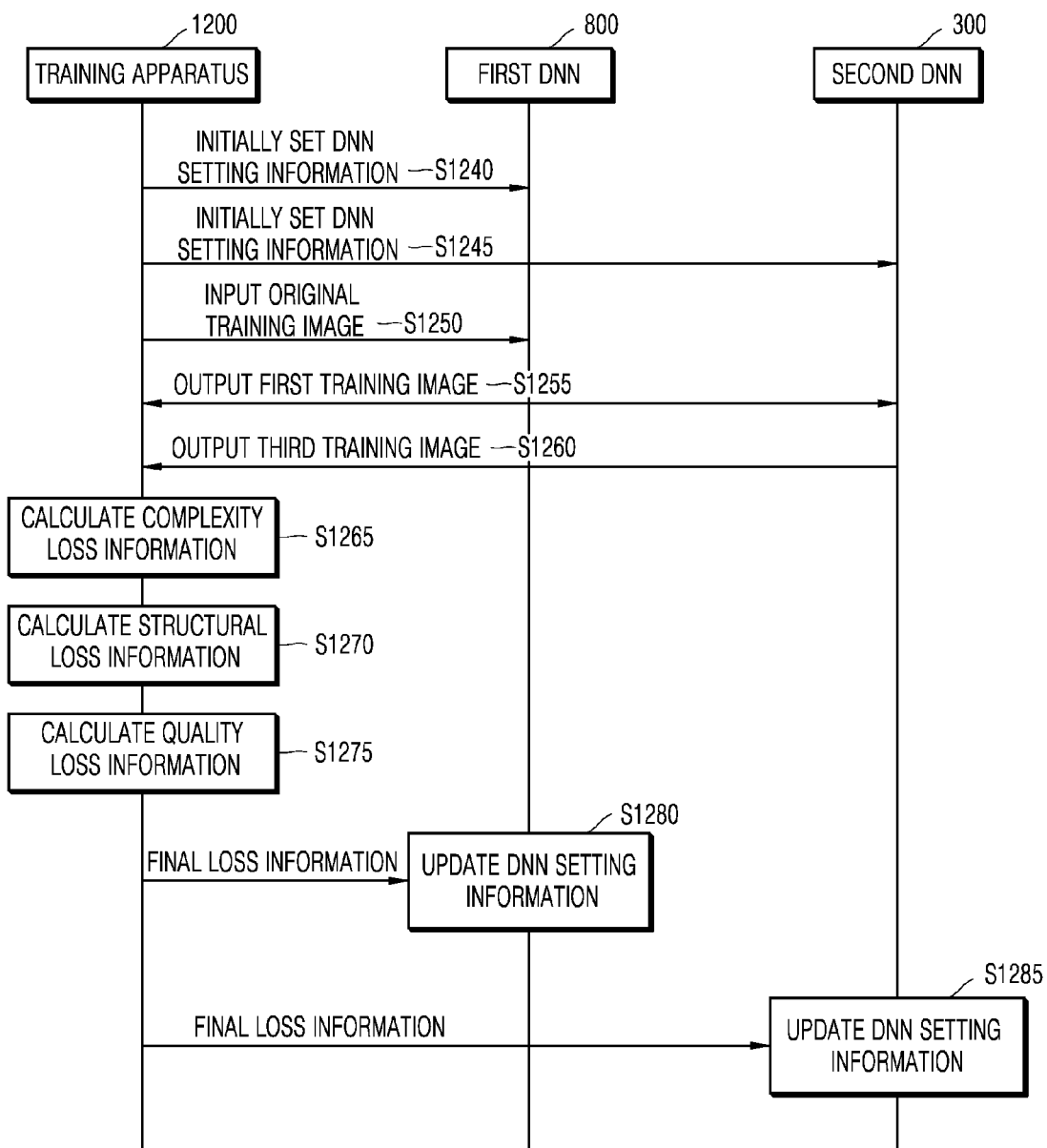
FIG. 12 is a diagram for describing training processes of a first DNN and a second DNN by a training apparatus according to an embodiment.

FIG. 12 is a diagram for describing training processes of the first DNN 800 and the second DNN 300 by a training apparatus 1200 according to an embodiment.

The training of the first DNN 800 and the second DNN 300 described above with reference FIG. 11 may be performed by the training apparatus 1200. The training apparatus 1200 includes the first DNN 800 and the second DNN 300. The training apparatus 1200 may be, for example, the AI encoding apparatus 700 or a separate server. The pieces of DNN setting information of the second DNN 300 obtained as the training result are stored in the AI decoding apparatus 200.

Referring to FIG. 12, the training apparatus 1200 initially sets DNN setting information of the first DNN 800 and the second DNN 300, in operations S1240 and S1245. Accordingly, the first DNN 800 and the second DNN 300 may operate according to pre-determined DNN setting information. The DNN setting information may include information about at least one of the number of convolution layers included in the first DNN 800 and the second DNN 300, the number of filter kernels for each convolution layer, the size of a filter kernel for each convolution layer, or a parameter of each filter kernel.

The training apparatus 1200 inputs the original training image 1101 into the first DNN 800, in operation S1250. The original training image 1101 may include a still image or at least one frame included in a moving image.

The first DNN 800 processes the original training image 1101 according to the initially set DNN setting information and outputs the first training image 1102 obtained by performing AI downscaling on the original training image 1101, in operation S1255. In FIG. 12, the first training image 1102 output from the first DNN 800 is directly input to the second DNN 300. However, the first training image 1102 output from the first DNN 800 may be input to the second DNN 300 by the training apparatus 1200. Also, the training apparatus 1200 may perform first encoding and first decoding on the first training image 1102 via a certain codec, and then input the second training image to the second DNN 300.

The second DNN 300 processes the first training image 1102 or the second training image according to the initially set DNN setting information and outputs the third training image 1104 obtained by performing AI upscaling on the first training image 1102 or the second training image, in operation S1260.

The training apparatus 1200 calculates the complexity loss information 1120, based on the first training image 1102, in operation S1265.

The training apparatus 1200 calculates the structural loss information 1110 by comparing the reduced training image 1103 with the first training image 1102, in operation S1270.

The training apparatus 1200 calculates the quality loss information 1130 by comparing the original training image 1101 with the third training image 1104, in operation S1275.

The first DNN 800 updates the initially-set DNN setting information via a back propagation process based on final loss information, in operation S1280. The training apparatus 1200 may calculate the final loss information for training the first DNN 800, based on the complexity loss information 1120, the structural loss information 1110, and the quality loss information 1130.

The second DNN 300 updates the initially set DNN setting information via a back propagation process based on the quality loss information 1130 or the final loss information, in operation S1285. The training apparatus 1200 may calculate the final loss information for training the second DNN 300, based on the quality loss information 1130.

Then, the training apparatus 1200, the first DNN 800, and the second DNN 300 repeat operations S1250 through S1285 until pieces of final loss information are minimized, to update the DNN setting information. At this time, during each repetition, the first DNN 800 and the second DNN 300 operate according to the DNN setting information updated in the previous operation.

Table 1 below shows effects when AI encoding and AI decoding are performed on the original image 105 according to an embodiment and when encoding and decoding are performed on the original image 105 via HEVC.

one from a plurality of downscaling models, based on upscaling model information of the opposite user terminal and communication environment information. Here, the opposite user terminal refers to an other user terminal involved in the video telephone call.

Figure 13:
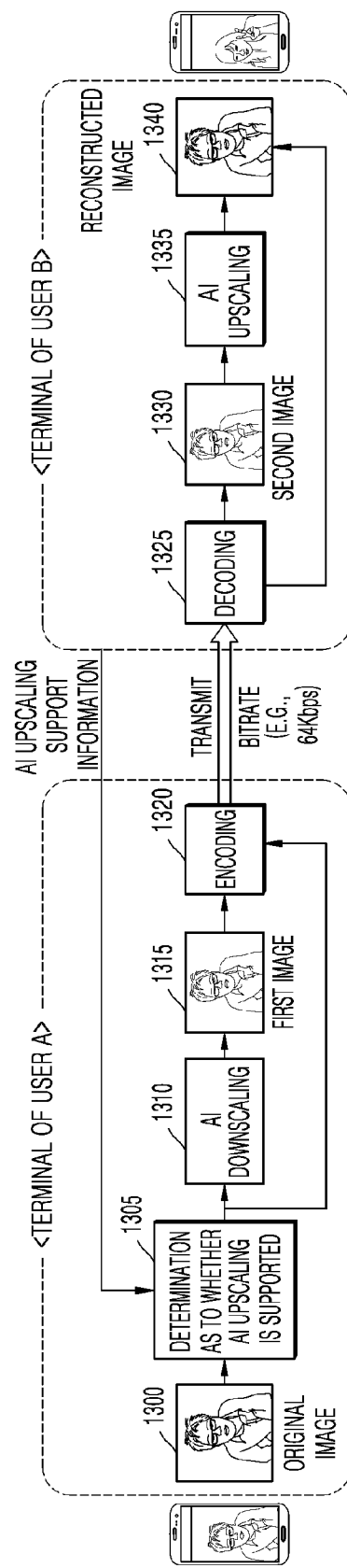
FIG. 13 is a block diagram for explaining a video telephone call between mobile communication terminals that adaptively perform AI downscaling according to whether AI upscaling is supported, according to an embodiment.

FIG. 13 is a block diagram for explaining a video telephone call between mobile communication terminals that adaptively perform AI downscaling according to whether AI upscaling is supported, according to an embodiment.

Referring to FIG. 13, when a terminal of a current user A transmits an original image 1300 during a video telephone call between two terminals, the terminal of the current user A receives information about whether a terminal of an opposite user B supports AI upscaling, and determines (1305) whether AI upscaling is supported, according to AI upscaling support information. When the information about whether the terminal of the opposite user B supports AI upscaling indicates that the terminal of the opposite user B supports AI upscaling, a first image 1315 obtained by performing AI downscaling 1310 on the original image 1300 is encoded (1320) and transmitted to the terminal of the opposite user B, and the terminal of the opposite user B obtains a second image 1330 by decoding (1325) the received image, and reconstructs (1340) an image by performing AI upscaling 1335 on the second image 1330. On the other hand, when the information about whether the terminal of the opposite user B supports AI upscaling indicates that the terminal of the opposite user B does not support AI upscaling, the original image 1300 is encoded (1320) without undergoing the AI downscaling 1310, and

TABLE 1

| Content | Resolution | Number of frames | Information amount (Bitrate) (Mbps) | | Subjective image quality score (VMAF) | |
| --- | --- | --- | --- | --- | --- | --- |
| | | | HEVC | AI encoding/ AI decoding | HEVC | AI encoding/ AI decoding |
| Content_01 | 8K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, even when a subjective quality of image when AI encoding and AI decoding are performed on content including 300 frames of 8K resolution according to an embodiment is higher than a subjective quality of image when encoding and decoding are performed via HEVC, a bitrate is reduced by 50% or more.

Methods of adaptively AI-downscaling a video call image according to an upscaling method of an opposite mobile communication terminal during a video telephone call of a mobile communication terminal that supports the AI-based upscaling and the AI-based downscaling each described above with reference to FIGS. 1 through 12 will now be described.

In detail, a method of AI downscaling to be described below with reference to FIGS. 13 through 18 relates to a method of adaptively AI-downscaling an original image according to whether AI upscaling of the opposite user terminal is supported during a video telephone call, and a method of AI downscaling to be described below with reference to FIGS. 19 through 28 relates to a method of adaptively AI-downscaling an original image by selecting then transmitted to the terminal of the opposite user B, and the terminal of the opposite user B reconstructs (1340) an image by decoding (1325) the received image.

In detail, the terminal of the current user A obtains the information about whether the terminal of the opposite user B supports AI upscaling, from the terminal of the opposite user B through, for example, a real-time transport control protocol. The real-time transport control protocol is a protocol for periodically reporting the transmission/reception status of a real-time transport protocol on both a sender and a receiver, and the real-time transport protocol is a protocol for streaming audio/video packets. In other words, two terminals transmit/receive an image during a video telephone call through, for example, the real-time transport protocol, and send and receive several pieces of information necessary for transmitting the image during a video telephone call through the real-time transport control protocol, for example, pieces of information such as the location of a terminal, a device ID, specifications of the terminal, and an upscale method of the terminal. The AI upscaling support information indicates whether the terminal of the opposite user B supports AI upscaling corresponding to AI downscaling that the terminal of the current user A supports. Based on this AI upscaling support information, the terminal of the current user A may perform AI downscaling corresponding to AI upscaling of the terminal of the opposite user B. When it is determined that the terminal of the opposite user B supports AI upscaling, the terminal of the current user A may perform the AI downscaling 1310 on the original image 1300 to obtain a first image 1315, may perform encoding 1320 on the first image 1315, and may transmit an image corresponding to a result of the encoding 1320 to the terminal of the opposite user B. The terminal of the opposite user B may perform decoding 1325 on the received image to obtain a second image 1330, and may perform the AI upscaling 1335 on the second image 1330 to reconstruct (1340) an image.

On the other hand, when it is determined that the terminal of the opposite user B does not support AI upscaling, the terminal of the current user A performs the encoding 1320 on the original image 1300 and transmits an image corresponding to a result of the encoding 1320 to the terminal of the opposite user B. The terminal of the opposite user B performs the decoding 1325 on the received image to reconstruct (1340) an image corresponding to the original image 1300.

Even when both the two user terminals do not support AI upscaling, the terminal of the current user A performs the encoding 1320 on the original image 1300 and transmits an image corresponding to a result of the encoding 1320 to the terminal of the opposite user B, and the terminal of the opposite user B performs the decoding 1325 on the received image and reconstructs (1340) the image corresponding to the original image 1300.

According to an embodiment, the AI upscaling support information may be AI data associated with AI downscaling of the video call image by the opposite user terminal. In detail, the terminal of the current user A may obtain AI data associated with AI downscaling of the video call image by the terminal of the opposite user B from the terminal of the opposite user B, and, when the terminal of the current user A receives the AI data from the terminal of the opposite user B, the terminal of the current user A may determine that the terminal of the opposite user B supports AI upscaling. In other words, AI data associated with AI downscaling of the video call image being transmitted by the terminal of the opposite user B during a video telephone call refers to the terminal of the opposite user B supporting AI upscaling and AI downscaling. Accordingly, it is determined whether AI upscaling is supported, according to presence or absence of the AI data. In this case, when the AI data is transmitted by the terminal of the opposite user B, it is determined that the terminal of the opposite user B supports AI upscaling. Therefore, the terminal of the current user A may perform the AI downscaling 1310 on the original image 1300 to obtain the first image 1315, may perform the encoding 1320 on the first image 1315, and may transmit an image corresponding to a result of the encoding 1320 to the terminal of the opposite user B. The terminal of the opposite user B may perform the decoding 1325 on the received image to obtain the second image 1330, and may perform the AI upscaling 1335 on the second image 1330 to reconstruct (1340) an image. On the other hand, when no AI data is transmitted by the terminal of the opposite user B, it is determined that the terminal of the opposite user B does not support AI upscaling. Accordingly, the terminal of the current user A performs the encoding 1320 on the original image 1300 and transmits an image corresponding to a result of the encoding 1320 to the terminal of the opposite user B (i.e., without performing an AI downscaling). The terminal of the opposite user B performs the decoding 1325 on the received image to reconstruct (1340) an image corresponding to the original image 1300 (i.e., without performing an AI upscaling).

According to an embodiment, the AI upscaling support information may be flag information included in AI data associated with AI downscaling of the video call image by the opposite user terminal. In detail, the terminal of the current user A may obtain flag information included in AI data associated with AI downscaling of the video call image by the terminal of the opposite user B from the terminal of the opposite user B, and the terminal of the current user A may determine that the terminal of the opposite user B supports AI upscaling, according to the flag information. In other words, according to the flag information included in the AI data obtained from the terminal of the opposite user B, the terminal of the current user A may determine whether the original image is AI-downscaled. When the flag information indicates that the terminal of the opposite user B supports AI upscaling, the terminal of the current user A may perform the AI downscaling 1310 on the original image 1300 to obtain the first image 1315, may perform the encoding 1320 on the first image 1315, and may transmit an image corresponding to a result of the encoding 1320 to the terminal of the opposite user B. The terminal of the opposite user B may perform the decoding 1325 on the received image to obtain the second image 1330, and may perform the AI upscaling 1335 on the second image 1330 to reconstruct (1340) an image. On the other hand, when the flag information indicates that the terminal of the opposite user B does not support AI upscaling (or when no flag information is received), the terminal of the current user A performs the encoding 1320 on the original image 1300 and transmits an image corresponding to a result of the encoding 1320 to the terminal of the opposite user B (i.e., without AI downscaling). The terminal of the opposite user B performs the decoding 1325 on the received image to reconstruct (1340) an image corresponding to the original image 1300 (i.e., without AI upscaling).

A training method of an AI-downscaling DNN and a training method of an AI-upscaling DNN have been described above in detail with reference to FIGS. 11 and 12, and thus descriptions thereof may not be repeated below. However, each of the AI-downscaling DNN and the AI-upscaling DNN may be trained considering a communication environment that may be generated during a video telephone call. For example, a bitrate when a cloud server transmits data to a TV is 15 Mbps, but a bitrate between two terminals during a video telephone call may be 64 Kbps. Thus, considering this situation, a DNN may be trained.

Figure 14:
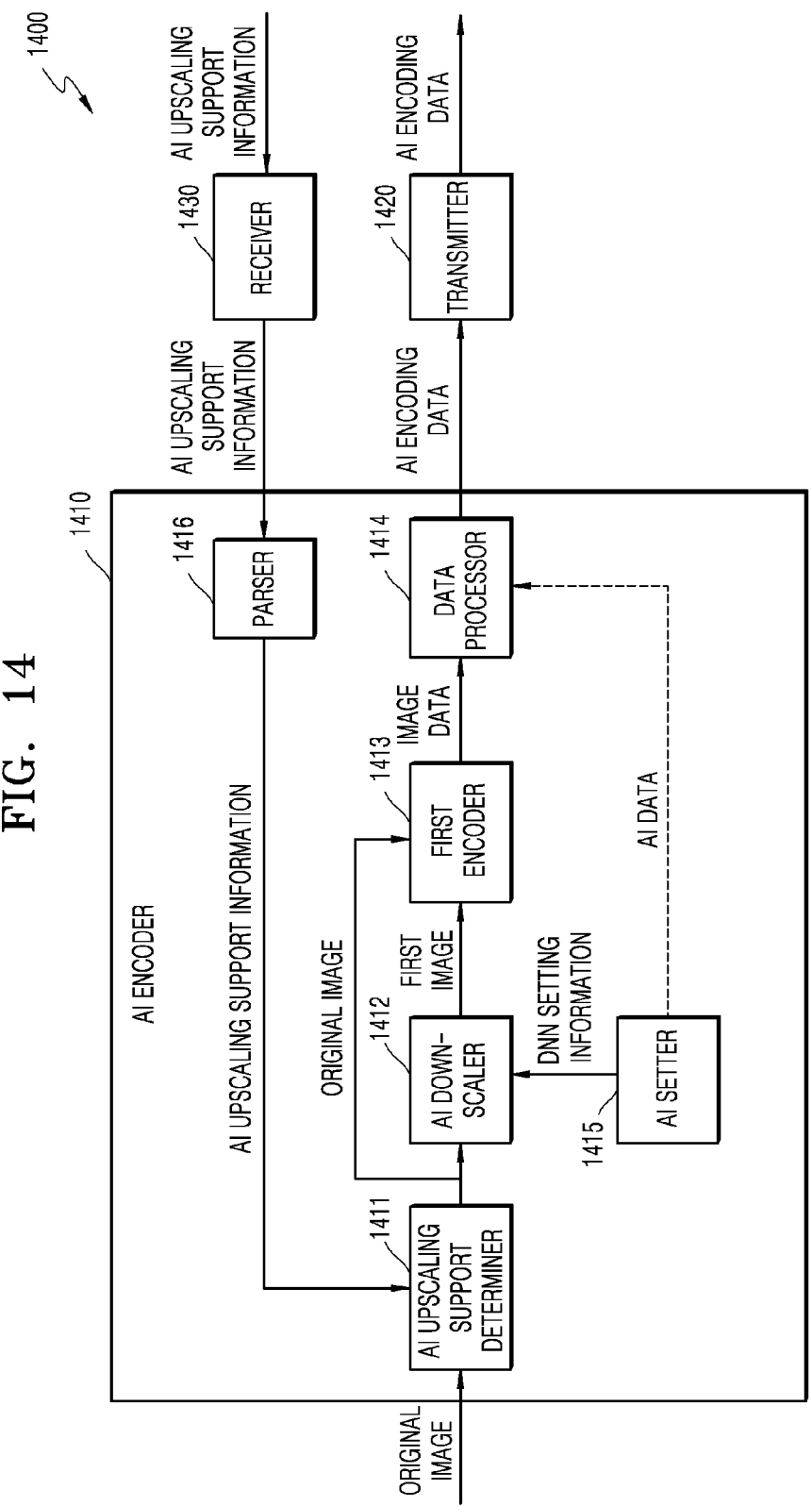
FIG. 14 is a block diagram of a configuration of a mobile communication terminal supporting AI downscaling during a video telephone call, according to an embodiment.

FIG. 14 is a block diagram of a configuration of a mobile communication terminal 1400 supporting AI downscaling during a video telephone call, according to an embodiment.

Referring to FIG. 14, the mobile communication terminal 1400 may include an AI encoder 1410, a transmitter 1420, and a receiver 1430. The AI encoder 1410 may include an AI upscaling support determiner 1411, an AI down-scaler 1412, a first encoder 1413, a data processor 1414, an AI setter 1415, and a parser 1416.

In FIG. 14, the AI encoder 1410, the transmitter 1420, and the receiver 1430 are illustrated as separate devices. However, the AI encoder 1410, the transmitter 1420, and the receiver 1430 may be implemented through one processor. In this case, the AI encoder 1410, the transmitter 1420, and the receiver 1430 may be implemented through a dedicated processor or through a combination of software and a general-purpose processor such as an AP, a CPU or a GPU. The dedicated processor may include a memory for implementing an embodiment (e.g., for storing instructions executable by the processor to perform a method according to an embodiment) or may include a memory processor for using an external memory.

Also, the AI encoder 1410, the transmitter 1420, and the receiver 1430 may be configured by a plurality of processors. In this case, the AI encoder 1410, the transmitter 1420, and the receiver 1430 may be implemented through a combination of dedicated processors or through a combination of software and a plurality of general-purpose processors such as an AP, a CPU, or a GPU.

According to an embodiment, the first encoder 1413 may be configured by a first processor, the AI upscaling support determiner 1411, the AI down-scaler 1412, the data processor 1414, and the AI setter 1415 may be implemented using a second processor different from the first processor, the transmitter 1420 may be implemented using a third processor different from the first and second processors, and the parser 1416 and the receiver 1430 may be implemented using a fourth processor different from the first, second, and third processors. It is understood that this is just an example, and one or more other embodiments may implement the various components via any combination of one or more processors.

During a video telephone call of the mobile communication terminal 1400, the receiver 1430 may receive AI upscaling support information of an opposite terminal from the opposite terminal through a communication network.

According to an embodiment, the AI upscaling support information may be transmitted through a real time transport control protocol.

According to an embodiment, the AI upscaling support information may be the AI data associated with AI downscaling of a video call image of a mobile communication terminal 1500 of an opposite user. In detail, when (or based on) the current mobile communication terminal 1400 obtains the AI data from the mobile communication terminal 1500 of the opposite user, the current mobile communication terminal 1400 may determine that a terminal of the opposite user supports AI upscaling. In other words, the current mobile communication terminal 1400 may determine whether AI upscaling is supported, according to presence or absence of the AI data, and, when there is the AI data transmitted by the terminal of the opposite user, the current mobile communication terminal 1400 may determine that the terminal of the opposite user B supports AI upscaling.

According to an embodiment, the AI upscaling support information may be flag information included in the AI data associated with AI downscaling of the video call image of the mobile communication terminal 1500 of the opposite user. In detail, the current mobile communication terminal 1400 may determine that the mobile communication terminal 1500 of the opposite user supports AI upscaling, according to the flag information included in the AI data associated with AI downscaling of the video call image of the user of the opposite user from the mobile communication terminal 1500 of the opposite user. In other words, according to the flag information included in the AI data obtained from the mobile communication terminal 1500 of the opposite user, the current mobile communication terminal 1400 may determine whether the original image is AI-downscaled.

The receiver 1430 outputs the AI upscaling support information of the opposite terminal to the parser 1416.

The parser 1416 parses the AI upscaling support information and transmits parsed AI upscaling support information to the AI upscaling support determiner 1411.

The AI upscaling support determiner 1411 determines whether the opposite user terminal supports AI upscaling, based on the parsed AI upscaling support information (or presence thereof). When it is determined that the opposite user terminal supports AI upscaling, the AI upscaling support determiner 1411 transmits the original image to the AI down-scaler 1412. When it is determined that the opposite user terminal does not support AI upscaling, the AI upscaling support determiner 1411 transmits the original image to the first encoder 1413. It is understood that, even if the opposite user terminal does support AI upscaling, it may be configured (e.g., via setting information or some predetermined criteria such as battery level, operational mode, etc.) not to perform AI upscaling. In this case, the AI upscaling support information may indicate that the opposite user terminal does not support AI upscaling.

When the AI upscaling support determiner 1411 determines that the opposite user terminal supports AI upscaling, the AI encoder 1410 performs AI downscaling on the original image 1300 and first encoding on the first image 1315, and transmits AI encoding data to the transmitter 1420. The transmitter 1420 transmits the AI encoding data to the opposite terminal. When the AI upscaling support determiner 1411 determines that the opposite user terminal does not support AI upscaling, the AI encoder 1410 performs first encoding on the original image 1300 and transmits AI encoding data to the transmitter 1420. The transmitter 1420 transmits the AI encoding data to the opposite terminal.

The image data includes data obtained as a result of performing the first encoding on the original image 1300 or the first image 1315. The image data may include data obtained based on pixel values in the original image 1300 or the first image 1315, for example, residual data that is a difference between the original image 1300 and prediction data of the original image 1300 or residual data that is a difference between the first image 1315 and prediction data of the first image 1315. The image data also includes pieces of information used during a first encoding process of the original image 1300 or the first image 1315. For example, the image data may include prediction mode information, motion information, and quantization parameter-related information each used to perform the first encoding on the original image 1300 or the first image 1315, for example.

The AI data includes pieces of information enabling an AI up-scaler 1536 of the mobile communication terminal 1500, which will be described below with reference to FIG. 15, to perform AI upscaling on the second image 1330 to an upscaling target corresponding to a downscaling target of a first DNN. According to an embodiment, the AI data may include difference information between the original image 1300 and the first image 1315. According to an embodiment, the AI data may include information related to the first image 1315. The information related to the first image 1315 may include information about at least one of a resolution of the first image 1315, a bitrate of the image data obtained as the result of performing first encoding on the first image 1315, or a codec type used during the first encoding of the first image 1315.

According to an embodiment, the AI data may include an identifier of mutually agreed DNN setting information such that the AI upscaling is performed on the second image 1330 to the upscaling target corresponding to the downscaling target of the first DNN.

Also, according to an embodiment, the AI data may include DNN setting information settable in a second DNN.

According to an embodiment, when the AI upscaling support information indicates that the opposite terminal does not support AI upscaling, the AI data is not transmitted, downscaling is not performed, and image data for the original image is transmitted.

When (or based on) the AI upscaling support determiner 1411 determines that the opposite user terminal supports AI upscaling, the AI down-scaler 1412 may obtain the first image 1315 by performing the AI downscaling 1310 on the original image 1300 through a first DNN. The AI down-scaler 1412 may perform AI downscaling on the original image 1300 by using DNN setting information provided by the AI setter 1415.

When (or based on) the AI upscaling support determiner 1411 determines that the opposite user terminal does not support AI upscaling, the AI down-scaler 1412 does not perform the AI downscaling 1310 on the original image 1300.

The AI setter 1415 may determine the downscaling target of the original image 1300, based on a pre-determined standard according to the AI upscaling support information obtained from the parser 1416.

In order to obtain the first image 1310 matching the downscaling target, the AI setter 1415 may store a plurality of pieces of DNN setting information settable in the first DNN. The AI setter 1415 obtains DNN setting information corresponding to the downscaling target from among the plurality of pieces of DNN setting information, and provides the obtained DNN setting information to the AI down-scaler 1412.

Each of the plurality of pieces of DNN setting information may be trained to obtain the first image 1315 of pre-determined resolution and/or pre-determined quality. For example, one piece of DNN setting information from among the plurality of pieces of DNN setting information may include pieces of information for obtaining the first image 1315 having a resolution that is ¼ the resolution of the original image 1300, for example, the first image 1315 of QVGA (320×240) that is ¼ the original image 1300 of VGA(640×480).

According to an embodiment, when pieces of information (for example, the number of convolution layers, the number of filter kernels for each convolution layer, a parameter of each filter kernel, and the like) constituting the DNN setting information are stored in a form of a lookup table, the AI setter 1415 may obtain the DNN setting information by combining some values selected from the values in the lookup table, based on the downscaling target, and provide the obtained DNN setting information to the AI down-scaler 1412.

According to an embodiment, the AI setter 1415 may determine a structure of a DNN corresponding to the downscaling target, and obtain DNN setting information corresponding to the determined structure of the DNN, for example, obtain parameters of a filter kernel.

The plurality of pieces of DNN setting information for performing the AI downscaling on the original image 1300 may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 1412 may obtain the first image 1310 of certain resolution and/or certain quality through the first DNN by setting the first DNN with the DNN setting information selected to perform the AI downscaling on the original image 1300. When the DNN setting information for performing the AI downscaling on the original image 1300 is obtained from the plurality of pieces of DNN setting information, each layer in the first DNN may process input data, based on pieces of information included in the DNN setting information.

A method, performed by the AI setter 1415, of determining the downscaling target will now be described. The downscaling target may indicate, for example, by how much is a resolution decreased from the original image 1300 to obtain the first image 1315.

The AI setter 1415 obtains one or more pieces of input information. According to an embodiment, the one or more pieces of input information may include at least one of target resolution of the first image 1315, a target bitrate of the image data, a bitrate type of the image data (for example, a variable bitrate type, a constant bitrate type, or an average bitrate type), a color format (luminance component, chrominance component, red component, green component, and/or blue component) to which AI downscaling is applied, a codec type for first encoding, compression history information, resolution of the original image 1300, or a type of the original image 1300.

The one or more pieces of input information may include information pre-stored in the mobile communication terminal 1400 or information received from a user.

The AI setter 1415 controls an operation of the AI up-scaler 1412, based on the input information. According to an embodiment, the AI setter 1415 may determine a downscaling target according to the input information, and may provide DNN setting information corresponding to the determined downscaling target to the AI down-scaler 1412.

According to an embodiment, the AI setter 1415 transmits at least a part of the input information to the first encoder 1413, and thus the first encoder 1413 may perform first encoding on the first image 1315 via a bitrate of a certain value, a bitrate of a certain type, and a certain codec.

According to an embodiment, the AI setter 1415 may determine the downscaling target, based on at least one of a compression ratio (for example, a resolution difference between the original image 1300 and the first image 1315, a target bitrate, or the like), a compression quality (for example, a type of bitrate), compression history information, or a type of the original image 1300.

For example, the AI setter 1415 may determine the downscaling target, based on the compression ratio, the compression quality, or the like, which is pre-set or received from a user.

As another example, the AI setter 1415 may determine the downscaling target by using the compression history information stored in the mobile communication terminal 1400. For example, according to the compression history information usable by the mobile communication terminal 1400, an encoding quality, a compression ratio, or the like preferred by the user may be determined, and the downscaling target may be determined according to the encoding quality determined based on the compression history information. For example, the resolution, quality, or the like of the first image 1315 may be determined according to the encoding quality that has been used most often according to the compression history information.

As another example, the AI setter 1415 may determine the downscaling target based on the encoding quality that has been used more frequently than a certain threshold value (for example, an average quality of the encoding qualities that have been used more frequently than the certain threshold value), according to the compression history information.

As another example, the AI setter 1415 may determine the downscaling target, based on the resolution, type (for example, a file format), or the like of the original image 1300.

According to an embodiment, when the original image 1300 includes a plurality of frames, the AI setter 1415 may independently obtain DNN setting information in units of a certain number of frames (where the certain number is one or an integer greater than one), or may provide the independently-obtained DNN setting information to the AI down-scaler 1412.

According to an embodiment, the AI setter 1415 may divide the frames included in the original image 1300 into a certain number of groups, and independently determine the downscaling target for each group. The same or different pieces of DNN setting information may be obtained for each group. The numbers of frames included in the groups may be the same or different according to each group.

According to another embodiment, the AI setter 1415 may independently determine DNN setting information for each of the frames included in the original image 1300. The same or different pieces of DNN setting information may be obtained for each frame.

According to an embodiment, when (or based on) the AI upscaling support determiner 1411 determines that the opposite user terminal does not support AI upscaling, the AI setter 1415 does not transmit DNN setting information to the AI down-scaler 1412.

Figure 15:
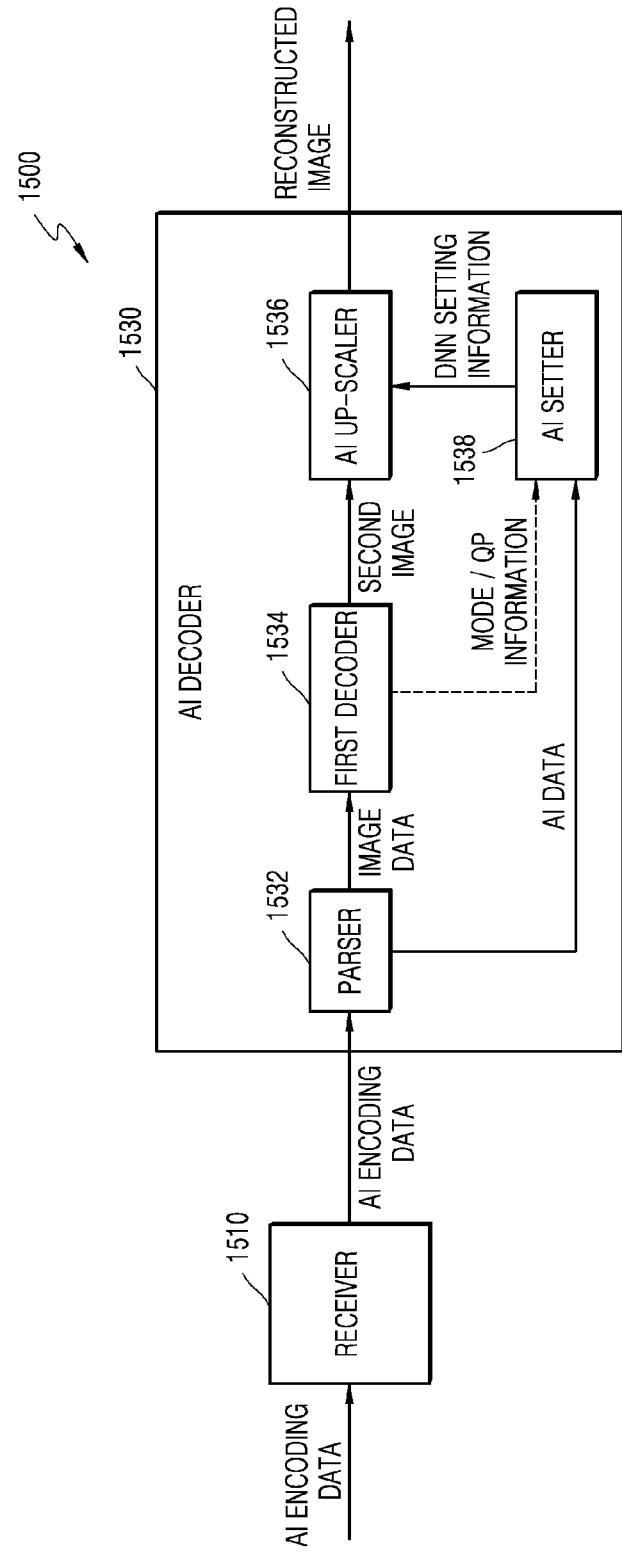
FIG. 15 is a block diagram of a configuration of a mobile communication terminal supporting AI upscaling during a video telephone call, according to an embodiment.

FIG. 15 is a block diagram of a configuration of a mobile communication terminal 1500 supporting AI upscaling during a video telephone call, according to an embodiment.

Referring to FIG. 15, the mobile communication terminal 1500 includes a receiver 1510 and an AI decoder 1530. The AI decoder 1530 may include a parser 1532, a first decoder 1534, an AI up-scaler 1536, and an AI setter 1538.

In FIG. 15, the receiver 1510 and the AI decoder 1530 are illustrated as separate devices. However, the receiver 1510 and the AI decoder 1530 may be implemented through one processor. In this case, the receiver 1510 and the AI decoder 1530 may be implemented through a dedicated processor or through a combination of software and a general-purpose processor such as an application processor (AP), a central processing unit (CPU), or a graphic processing unit (GPU). The dedicated processor may include a memory for implementing an embodiment (e.g., for storing instructions executable by the processor to perform a method according to an embodiment) or may include a memory processor for using an external memory.

The receiver 1510 and the AI decoder 1530 may be configured by a plurality of processors. In this case, the receiver 1510 and the AI decoder 1530 may be implemented through a combination of dedicated processors or through a combination of software and a plurality of general-purpose processors such as an AP, a CPU, or a GPU. According to an embodiment, the receiver 1510 may be implemented using a first processor, the first decoder 1534 may be implemented using a second processor different from the first processor, and the parser 1532, the AI up-scaler 1536, and the AI setter 1538 may be implemented using a third processor different from the first and second processors. It is understood that this is just an example, and one or more other embodiments may implement the various components via any combination of one or more processors.

The receiver 1510 receives AI encoding data obtained as a result of AI encoding. For example, the AI encoding data may be a video file having a file format such as mp4 or mov.

The receiver 1510 may receive AI encoding data transmitted through a communication network. The receiver 1510 outputs the AI encoding data to the AI decoder 1530.

The parser 1532 parses the AI encoding data to transmit image data obtained through first encoding on the first image 1315 to the first decoder 1534 and transmit AI data to the AI setter 1538.

According to an embodiment, the parser 1532 may parse the AI encoding data including the image data and the AI data separate from each other. The parser 1532 may distinguish the AI data from the image data by reading a header within the AI encoding data.

A structure of the AI encoding data including the AI data and the image data separate from each other will be described below with reference to FIG. 9.

According to another embodiment, the parser 1532 may parse the AI encoding data to obtain image data, may extract AI data from the image data, and then may transmit the AI data to the AI setter 1538 and the remaining image data to the first decoder 1534. In other words, the AI data may be included in the image data. For example, the AI data may be included in supplemental enhancement information (SEI) that is an additional information region of a bitstream corresponding to the image data. A structure of the AI encoding data including the image data including the AI data has been described above with reference to FIG. 10, and thus a description thereof may not be repeated below.

According to another embodiment, the parser 1532 may split the bitstream corresponding to the image data into a bitstream to be processed by the first decoder 1534 and a bitstream corresponding to the AI data, and may output the split two bitstreams to the first decoder 1534 and the AI setter 1538, respectively.

The parser 1532 may verify that the image data included in the AI encoding data is image data obtained via a certain codec (for example, MPEG-2, H.264 AVC, MPEG-4, HEVC, VC-1, VP8, VP9, AV1, etc.). In this case, the parser 1532 may transmit corresponding information to the first decoder 1534 such that the image data is processed via the verified codec.

The first decoder 1534 reconstructs the second image 1330 corresponding to the first image 1315, based on the image data received from the parser 1532. The second image 1330 obtained by the first decoder 1534 is provided to the AI up-scaler 1536.

According to embodiments, first decoding related information, such as prediction mode information, motion information, and quantization parameter information, may be provided by the first decoder 1534 to the AI setter 1538. The first decoding related information may be used to obtain DNN setting information.

The AI data provided to the AI setter 1538 includes pieces of information enabling the second image 1330 to undergo AI upscaling. Here, an upscaling target of the second image 1330 should correspond to a downscaling target of a first DNN. Accordingly, the AI data includes information for verifying the downscaling target of the first DNN.

Examples of the information included in the AI data include difference information between resolution of the original image 1300 and resolution of the first image 1315, and information related to the first image 1315.

The difference information may be expressed as information about a resolution conversion degree of the first image 1315 compared to the original image 1300 (for example, resolution conversion rate information). Also, because the resolution of the first image 1315 is ascertained through the resolution of the reconstructed second image 1330 and the resolution conversion degree is verified accordingly, the difference information may be expressed only as resolution information of the original image 1300. Here, the resolution information may be expressed as vertical/horizontal screen sizes or as a ratio (16:9, 4:3, or the like) and a size of one axis. Also, when there is pre-set resolution information, the resolution information may be expressed in the form of an index or flag.

The information related to the first image 1315 may include information about at least one of a resolution of the first image 1315, a bitrate of the image data obtained as the result of performing first encoding on the first image 1315, or a codec type used during the first encoding of the first image 1315.

The AI setter 1538 may determine the upscaling target of the second image 1330, based on at least one of the difference information or the information related to the first image 1315, which are included in the AI data. The upscaling target may indicate, for example, to what degree resolution is to be upscaled for the second image 1330. When the upscaling target is determined, the AI up-scaler 1536 performs AI upscaling on the second image 1330 through a second DNN in order to obtain the reconstructed image 1340 corresponding to the upscaling target.

A method in which the AI setter 1538 determines the upscaling target of the second image 1330 and the AI up-scaler 1536 performs the AI upscaling on the second image 1330 according to the upscaling target will now be described.

According to an embodiment, the AI setter 1538 may store a plurality of pieces of DNN setting information settable in a second DNN.

Here, the DNN setting information may include information about at least one of the number of convolution layers included in the second DNN, the number of filter kernels for each convolution layer, or a parameter of each filter kernel. The plurality of pieces of DNN setting information may respectively correspond to various upscaling targets, and the second DNN may operate based on DNN setting information corresponding to a certain upscaling target. The second DNN may have different structures based on the DNN setting information. For example, the second DNN may include three convolution layers according to any piece of DNN setting information, or may include four convolution layers according to another piece of DNN setting information.

According to an embodiment, the DNN setting information may only include a parameter of a filter kernel used in the second DNN. In this case, rather than the structure of the second DNN changing, only the parameter of the internal filter kernel may change based on the DNN setting information.

The AI setter 1538 may obtain the DNN setting information for performing AI upscaling on the second image 1330, among the plurality of pieces of DNN setting information. Each of the plurality of pieces of DNN setting information used at this time is information for obtaining the reconstructed image 1340 of a pre-determined resolution and/or pre-determined quality, and is trained jointly with a first DNN.

For example, one piece of DNN setting information from among the plurality of pieces of DNN setting information may include pieces of information for obtaining the reconstructed image 1340 having a resolution that is 4 times greater than the resolution of the second image 1330, for example, the reconstructed image 1340 of VGA (640×480) that is 4 times greater than the second image 1330 of QVGA(320×240).

Each of the plurality of pieces of DNN setting information is obtained jointly with DNN setting information of the first DNN of the mobile communication terminal 1400, and the AI setter 1538 obtains one piece of DNN setting information among the plurality of pieces of DNN setting information according to an enlargement ratio corresponding to a reduction ratio of the DNN setting information of the first DNN. To this end, the AI setter 1538 verifies information of the first DNN. In order for the AI setter 1538 to verify the information of the first DNN, the mobile communication terminal 1500 according to an embodiment receives AI data including the information of the first DNN from the mobile communication terminal 1400.

In other words, the AI setter 1538 may verify information targeted by DNN setting information of the first DNN used to obtain the first image 1315 and obtain the DNN setting information of the second DNN trained jointly with the DNN setting information of the first DNN, by using pieces of information received from the mobile communication terminal 1400.

When (or based on) DNN setting information for performing the AI upscaling on the second image 1330 is obtained from among the plurality of pieces of DNN setting information, the DNN setting information may be transmitted to the AI up-scaler 1536, and input data may be processed based on the second DNN operating according to the DNN setting information.

For example, when any one piece of DNN setting information is obtained, the AI up-scaler 1536 sets the number of filter kernels included in each of the first, second, and third convolution layers 310, 330, and 350 of the second DNN 300 of FIG. 3, and the parameters of the filter kernels, as values included in the obtained DNN setting information.

In detail, when parameters of a filter kernel of 3×3 used in any one convolution layer of the second DNN 300 of FIG. 3 are {1, 1, 1, 1, 1, 1, 1, 1, 1} and DNN setting information is changed, the AI up-scaler 1536 may replace the parameters of the filter kernel with {2, 2, 2, 2, 2, 2, 2, 2, 2} that are parameters included in the changed DNN setting information.

The AI setter 1538 may obtain the DNN setting information for upscaling on the second image 1330 from among the plurality of pieces of DNN setting information, based on information included in the AI data, and the AI data used to obtain the DNN setting information will now be described.

According to an embodiment, the AI setter 1538 may obtain the DNN setting information for upscaling the second image 1330 from among the plurality of pieces of DNN setting information, based on difference information included in the AI data. For example, when it is verified that the resolution (for example, VGA (640×480)) of the original image 1300 is 4 times higher than the resolution (for example, QVGA (320×240)) of the first image 1315, based on the difference information, the AI setter 1538 may obtain the DNN setting information for increasing the resolution of the second image 1330 by 4 times.

According to another embodiment, the AI setter 1538 may obtain the DNN setting information for AI upscaling on the second image 1330 from among the plurality of pieces of DNN setting information, based on information related to the first image 1315 included in the AI data. The AI setter 1538 may pre-determine a mapping relationship between pieces of image-related information and pieces of DNN setting information, and obtain the DNN setting information mapped to the information related to the first image 1315.

Figure 16:
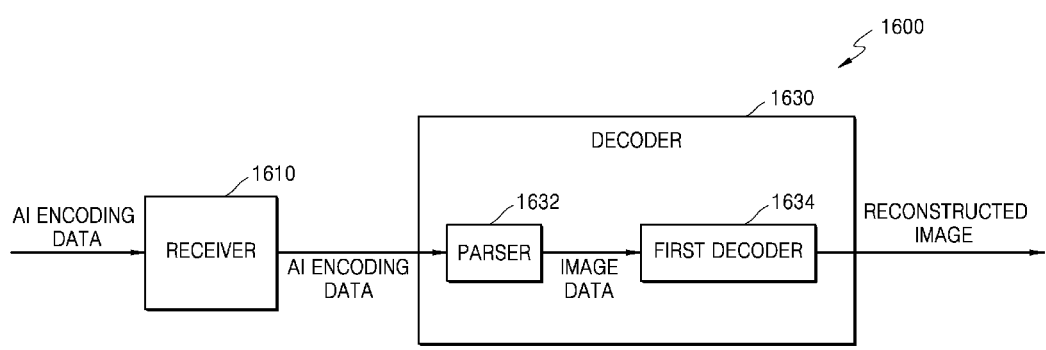
FIG. 16 is a block diagram of a configuration of a mobile communication terminal not supporting AI upscaling during a video telephone call, according to an embodiment.

FIG. 16 is a block diagram of a configuration of a mobile communication terminal 1600 not supporting (or not implementing) AI upscaling during a video telephone call, according to an embodiment.

Referring to FIG. 16, the mobile communication terminal 1600 includes a receiver 1610 and a decoder 1630. The decoder 1630 may include a parser 1632 and a first decoder 1634.

In FIG. 16, the receiver 1610 and the decoder 1630 are illustrated as separate devices. However, the receiver 1610 and the decoder 1630 may be implemented through one processor. In this case, the receiver 1610 and the decoder 1630 may be implemented through a dedicated processor or through a combination of software and a general-purpose processor such as an application processor (AP), a central processing unit (CPU), or a graphic processing unit (GPU). The dedicated processor may include a memory for implementing an embodiment (e.g., for storing instructions executable by the processor to perform a method according to an embodiment) or may include a memory processor for using an external memory.

The receiver 1610 and the decoder 1630 may be configured by a plurality of processors. In this case, the receiver 1610 and the decoder 1630 may be implemented through a combination of dedicated processors or through a combination of software and a plurality of general-purpose processors such as an AP, a CPU, or a GPU. According to an embodiment, the receiver 1610 may be implemented using a first processor, the first decoder 1634 may be implemented using a second processor different from the first processor, and the parser 1632 may be implemented using a third processor different from the first and second processors. It is understood that this is just an example, and one or more other embodiments may implement the various components via any combination of one or more processors.

The receiver 1610 receives AI encoding data obtained as a result of AI encoding from the mobile communication terminal 1400 of the opposite user. For example, the AI encoding data may be a video file having a file format such as mp4 or mov.

The receiver 1610 may receive AI encoding data transmitted through a communication network. The receiver 1610 outputs the AI encoding data to the decoder 1630.

The parser 1632 parses the AI encoding data to transmit image data obtained through first encoding on the original image 1300 to the first decoder 1634.

According to an embodiment, the parser 1632 may parse the AI encoding data including the image data.

The parser 1632 may verify that the image data included in the AI encoding data is image data obtained via a certain codec (for example, MPEG-2, H.264 AVC, MPEG-4, HEVC, VC-1, VP8, VP9, AV1, etc.). In this case, the parser 1632 may transmit corresponding information to the first decoder 1634 such that the image data is processed via the verified codec.

Because the mobile communication terminal 1600 does not support AI upscaling, the mobile communication terminal 1600 does not receive the AI data from the opposite mobile communication terminal 1400, in contrast with the mobile communication terminal 1500 of FIG. 15. In other words, the AI encoding data received from the opposite mobile communication terminal 1400 does not include the AI data and includes the image data.

The first decoder 1634 reconstructs (1340) the image corresponding to the original image 1300, based on the image data received from the parser 1632.

The image data may include information related to the original image 1300, and the information related to the original image 1300 may include information about at least one of a resolution of the original image 1300, a bitrate of the image data obtained as the result of performing first encoding on the original image 1300, or a codec type used during the first encoding of the original image 1300.

The first decoder 1634 may obtain the reconstructed image 1340 having resolution that is equal to the resolution of the original image 1300. For example, the first decoder 1634 may obtain the reconstructed image 1340 of VGA (640×480) corresponding to the original image 1300 of VGA(640×480).

Because the AI encoding data received from the opposite mobile communication terminal 1400 is generated based on the AI upscaling support information of the mobile communication terminal 1600, only the image data without the AI data may be transmitted, and the mobile communication terminal 1600 may obtain the reconstructed image 1340, based on the image data of the original image 1300.

Figure 17:
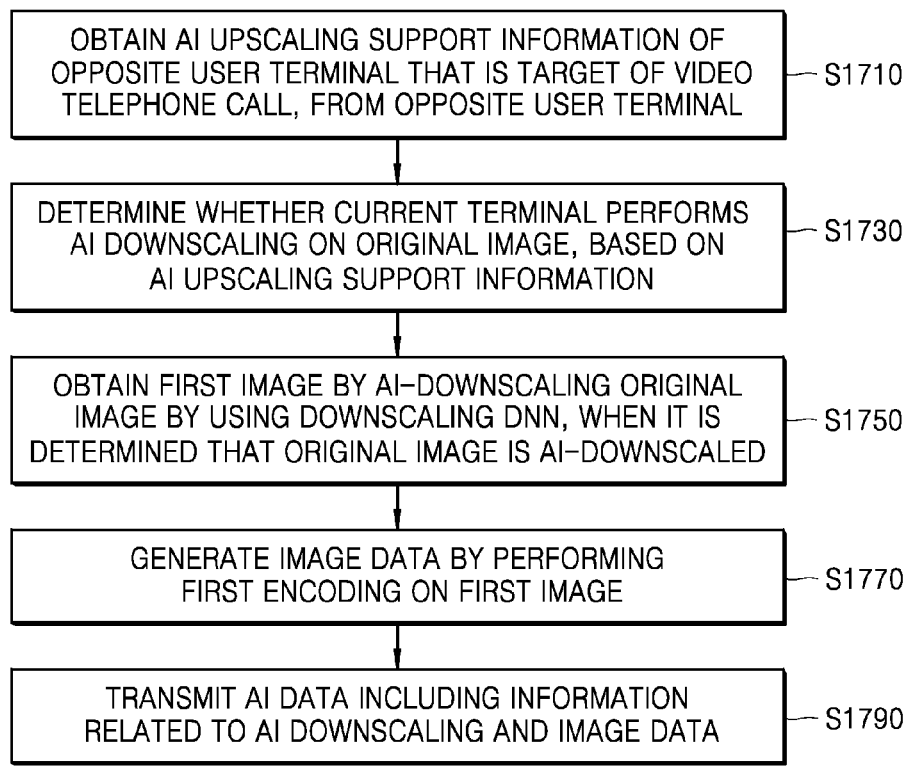
FIG. 17 is a flowchart of a method of adaptively AI-downscaling an image during a video telephone call of a terminal, according to an embodiment.

FIG. 17 is a flowchart of a method of adaptively AI-downscaling an image during a video telephone call of a terminal, according to an embodiment.

In operation S1710, the mobile communication terminal 1400 obtains AI upscaling support information of an opposite user terminal that is a target of a video telephone call, from the opposite user terminal. The AI upscaling support information indicates whether the opposite user terminal supports AI upscaling.

According to an embodiment, when the AI upscaling support information indicates that the opposite user terminal supports AI upscaling, it is determined that the original image is AI-downscaled.

According to an embodiment, the AI upscaling support information is transmitted through a real-time transport control protocol.

According to an embodiment, the AI upscaling support information is AI data associated with AI downscaling of a video call image of the opposite user terminal, and, when the AI data associated with AI downscaling of a video call image of the opposite user terminal is obtained, it is determined that the opposite user terminal supports AI upscaling.

According to an embodiment, the AI upscaling support information is flag information included in AI data associated with AI downscaling of a video call image of the opposite user terminal. In this case, according to the flag information, it is determined whether the opposite user terminal supports AI upscaling.

In operation S1730, the mobile communication terminal 1400 determines whether a current terminal performs AI downscaling on an original image, based on the AI upscaling support information.

In operation S1750, when it is determined that the original image is AI-downscaled, the mobile communication terminal 1400 obtains a first image by AI-downscaling the original image by using a downscaling DNN.

The mobile communication terminal 1400 determines a downscaling target, based on a certain criterion, obtains DNN setting information corresponding to the downscaling target from among a plurality of pieces of pre-stored DNN setting information, and performs AI downscaling on the original image 1300 through the first DNN operating according to the obtained DNN setting information.

According to an embodiment, DNN setting information of the downscaling DNN is obtained by jointly training the downscaling DNN with the upscaling DNN for AI-upscaling the second image.

In operation S1770, the mobile communication terminal 1400 generates image data by performing first encoding on the first image.

In operation S1790, the mobile communication terminal 1400 transmits AI data including information related to AI downscaling and the image data.

According to an embodiment, when the AI upscaling support information of the opposite user terminal indicates that the opposite user terminal does not support AI upscaling, the AI data including information related to AI downscaling is not transmitted. In other words, when the AI upscaling support information indicates that the opposite user terminal does not support AI upscaling, it is determined that the original image is not AI-downscaled and the original image undergoes first encoding to generate and transmit the image data.

The opposite user terminal reconstructs an image, based on the received AI data and the received image data.

Figure 18:
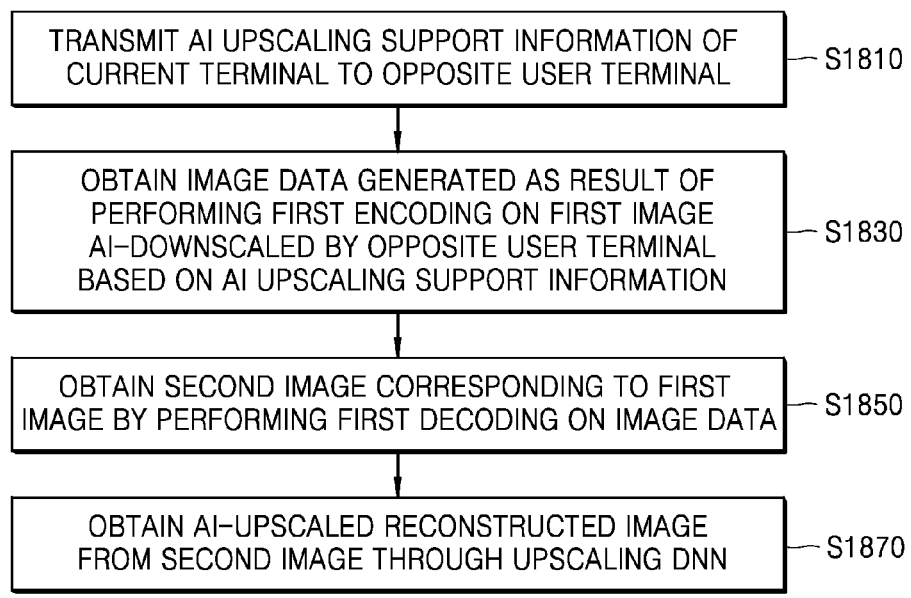
FIG. 18 is a flowchart of a method of AI-upscaling an image during a video telephone call of a terminal, according to an embodiment.

FIG. 18 is a flowchart of a method of AI-upscaling an image during a video telephone call of a terminal, according to an embodiment.

In operation S1810, the mobile communication terminal 1500 transmits AI upscaling support information of a current terminal to the opposite user terminal.

According to an embodiment, the AI upscaling support information indicates that the current terminal supports AI upscaling.

According to an embodiment, the AI upscaling support information is transmitted through a real-time transport control protocol.

According to an embodiment, the AI upscaling support information is AI data associated with AI downscaling of a video call image by the current terminal. When the opposite user terminal obtains the AI data associated with AI downscaling of the video call image by the current terminal, the opposite user terminal determines that the current terminal supports AI upscaling.

According to an embodiment, the AI upscaling support information is flag information included in AI data associated with AI downscaling of the video call image of the current terminal, and, according to the flag information, the opposite user terminal determines whether the current terminal supports AI upscaling.

In operation S1830, the mobile communication terminal 1500 obtains image data generated as a result of performing first encoding on a first image AI-downscaled by the opposite user terminal based on the AI upscaling support information. The mobile communication terminal 1500 may obtain the image data from the mobile communication terminal 1400 through a communication network.

In operation S1850, the mobile communication terminal 1500 obtains a second image corresponding to the first image by performing first decoding on the image data.

In operation S1870, the mobile communication terminal 1500 obtains an AI-upscaled reconstructed image from the second image through an upscaling DNN.

The mobile communication terminal 1500 supporting AI upscaling obtains AI data associated with AI downscaling from the original image to the first image, obtains DNN setting information for AI-upscaling the second image from among the plurality of pieces of DNN setting information, based on the AI data associated with AI downscaling, and reconstructs an image by performing AI upscaling, based on the obtained DNN setting information. The plurality of pieces of DNN setting information are obtained through joint training of the upscaling DNN and a downscaling DNN for use in AI downscaling of the original image.

As another example, the mobile communication terminal 1600 not supporting AI upscaling reconstructs an image, based on the image data corresponding to the original image without the AI data.

Figure 19:
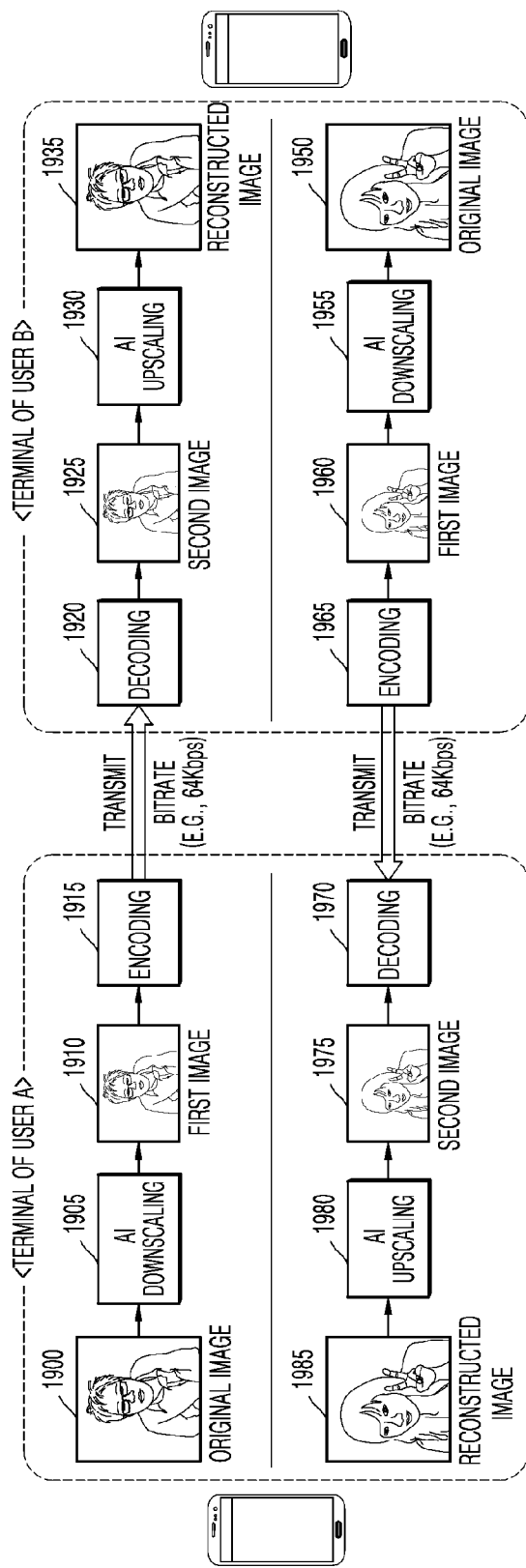
FIG. 19 is a block diagram for explaining a video telephone call between mobile communication terminals that support AI upscaling and AI downscaling, according to another embodiment.

FIG. 19 is a block diagram for explaining a video telephone call between mobile communication terminals that support AI upscaling and AI downscaling, according to another embodiment.

Referring to FIG. 19, when the terminal of the current user A supports AI downscaling and the terminal of the opposite user B supports AI upscaling, during a video telephone call between the two terminals, the terminal of the current user A performs encoding 1915 on a first image 1910 obtained by performing AI downscaling 1905 on an original image 1900 according to an AI downscaling model corresponding to AI upscaling 1930 supported by the terminal of the user B and transmits an image corresponding to a result of the encoding 1915 to the terminal of the opposite user B. Further, the terminal of the opposite user B obtains a second image 1925 by performing decoding 1920 on the received image and reconstructs (1935) an image by performing AI upscaling 1930 on the second image 1925.

In detail, the terminal of the current user A obtains upscaling information of the terminal of the opposite user B and current communication environment information from the terminal of the opposite user B through a real-time transport control protocol. The real-time transport control protocol is a protocol for periodically reporting the transmission/reception status of a real-time transport protocol on both a sender and a receiver, and the real-time transport protocol is a protocol for streaming audio/video packets. In other words, two terminals transmit/receive an image during a video telephone call through the real-time transport protocol, and sends and receives several pieces of information necessary for transmitting the image during a video telephone call through the real-time transport control protocol, for example, pieces of information such as the location of a terminal, a device ID, specifications of the terminal, and an upscale method of the terminal. The current communication environment information indicates a bandwidth, a bitrate, and the like allowable in a current communication environment, and the upscaling information indicates an upscaling method usable by the terminal of the user B. The terminal of the current user A may know a currently allowable bandwidth or bitrate from the current communication environment information, and may know whether the terminal of the user B supports AI upscaling, from the upscaling information. Based on this information, the terminal of the current user A may select an AI downscaling model corresponding to the currently allowable bandwidth or bitrate and the AI upscaling from among a plurality of AI downscaling models. The terminal of the current user A may perform the AI downscaling 1905 on the original image 1900 by using the selected AI downscaling model to obtain the first image 1910, may perform the encoding 1915 on the first image 1910, and may transmit an image corresponding to a result of the encoding 1915 to the terminal of the opposite user B.

The terminal of the opposite user B may perform the decoding 1920 on the received image to obtain the second image 1925, and may perform the AI upscaling 1930, which is supported by the terminal of the opposite user B, on the second image 1925 to reconstruct (1930) an image.

Moreover, the terminal of the opposite user B also obtains upscaling information of the terminal of the current user A and current communication environment information from the terminal of the current user A through a real-time transport control protocol. Based on this information, the terminal of the current user B may select the AI downscaling model corresponding to the currently allowable bandwidth or bitrate and the AI upscaling from among the plurality of AI downscaling models. The terminal of the current user B may perform AI downscaling 1955 on an original image 1950 by using the selected AI downscaling model to obtain a first image 1960, may perform encoding 1965 on the first image 1960, and may transmit an image corresponding to a result of the encoding 1965 to the terminal of the opposite user A.

The terminal of the opposite user A may perform decoding 1970 on the received image to obtain a second image 1975, and may perform AI upscaling 1980, which is supported by the terminal of the user A, on the second image 1975 to reconstruct (1985) an image.

As another example, when the current communication environment is not good, an opposite user terminal may transmit current communication environment information and upscaling model information to a current user terminal, and, when the current communication environment is good, the opposite user terminal may transmit only the current communication environment information to the current user terminal. In detail, when the current communication environment is not good (e.g., a communication environment metric, measurement, or parameter is below a predetermined threshold), the terminal of the current user A obtains the current communication environment information and the upscaling model information from the terminal of the opposite user B, and, based on this information, the terminal of the current user A may select an AI downscaling model corresponding to the currently allowable bandwidth or bitrate and the AI upscaling from among the plurality of AI downscaling models. The terminal of the current user A may perform the AI downscaling 1905 on the original image 1900 by using the selected AI downscaling model to obtain the first image 1910, may perform the encoding 1915 on the first image 1910, and may transmit an image corresponding to a result of the encoding 1915 to the terminal of the opposite user B. On the other hand, when the current communication environment is good, the terminal of the current user A may obtain the current communication environment information from the opposite user terminal B, and may transmit an original image to the opposite user terminal B, based on the current communication environment information. This is because, when the current communication environment is good, data of the original image may be sufficiently properly transmitted even when the original image is not downscaled.

A training method of an AI-downscaling DNN and a training method of an AI-upscaling DNN have been described above in detail with reference to FIGS. 11 and 12, and thus descriptions thereof may not be repeated below. However, each of the AI-downscaling DNN and the AI-upscaling DNN may be trained considering a communication environment that may be generated during a video telephone call. For example, a bitrate when a cloud server transmits data to a TV is 15 Mbps, but a bitrate between two terminals during a video telephone call may be 64 Kbps. Thus, considering this situation, a DNN may be trained.

Figure 20:
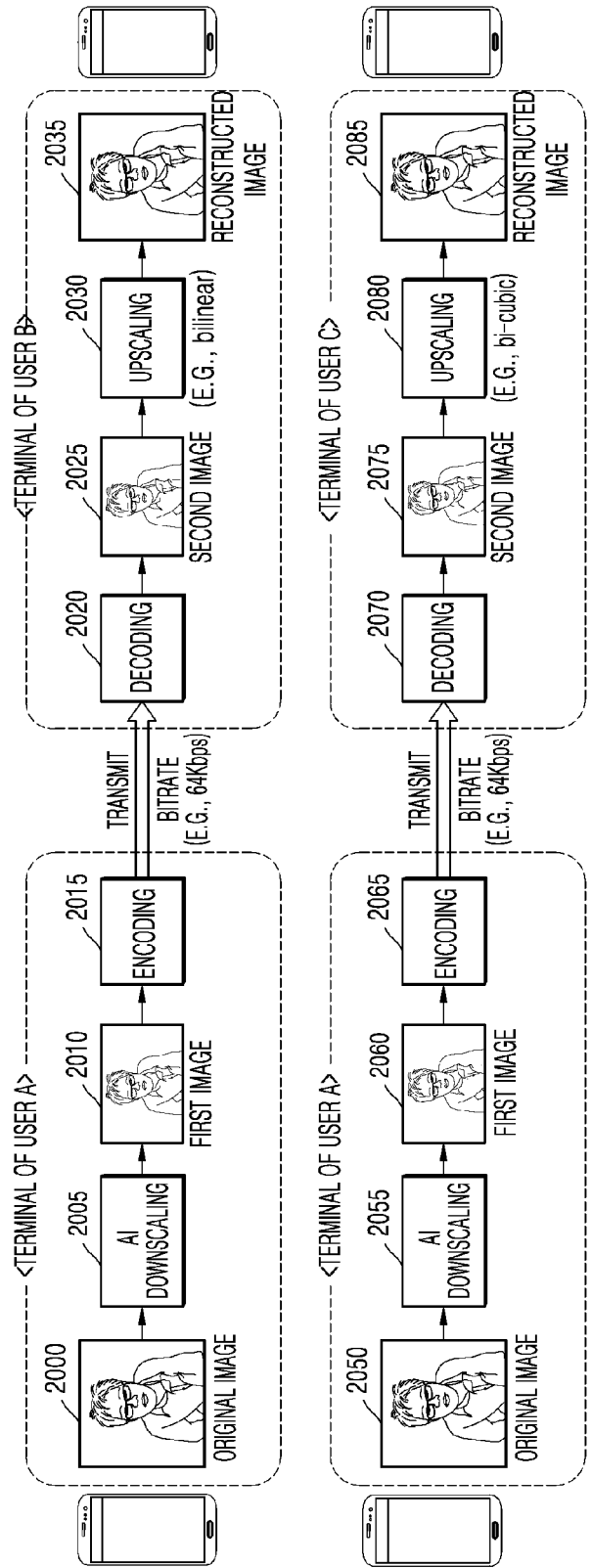
FIG. 20 is a block diagram for explaining a video telephone call between a mobile communication terminal that supports AI upscaling and AI downscaling and a mobile communication terminal that does not support AI upscaling and AI downscaling, according to another embodiment.

FIG. 20 is a block diagram for explaining a video telephone call between a mobile communication terminal that supports AI upscaling and AI downscaling and a mobile communication terminal that does not support AI upscaling and AI downscaling, according to another embodiment.

Referring to FIG. 20, when the terminal of the current user A supports AI downscaling and the terminal of the opposite user B does not support AI upscaling, during a video telephone call between the two terminals, the terminal of the current user A performs encoding 2015 on a first image 2010 obtained by performing AI downscaling 2005 on an original image 2000 according to an AI downscaling model corresponding to an upscaling method supported by the terminal of the opposite user B and transmits an image corresponding to a result of the encoding 2015 to the terminal of the opposite user B. Further, the terminal of the opposite user B obtains a second image 2025 by performing decoding 2020 on the received image and reconstructs (2035) an image by performing upscaling 2030 on the second image 2025 according to an upscaling method (for example, bilinear scaling) supported by the terminal of the opposite user B.

In detail, the terminal of the current user A obtains upscaling information of the terminal of the opposite user B and current communication environment information from the terminal of the opposite user B through a real-time transport control protocol. Based on this information, the terminal of the current user A may select an AI downscaling model corresponding to the currently allowable bandwidth or bitrate and the upscaling method supported by the terminal of the opposite user B from among a plurality of AI downscaling models. The terminal of the current user A may perform the AI downscaling 2005 on the original image 2000 by using the selected AI downscaling model to obtain the first image 2010, may perform the encoding 2015 on the first image 2010, and may transmit an image corresponding to a result of the encoding 2015 to the terminal of the opposite user B.

The terminal of the opposite user B may obtain the second image 2025 by performing the decoding 2020 on the received image, and may reconstruct (2035) an image by performing the upscaling 2030 on the second image 2025 according to the upscaling method (for example, bilinear scaling) supported by the terminal of the opposite user B.

As another example, the terminal of the current user A obtains upscaling information of a terminal of an opposite user C and current communication environment information from the terminal of the opposite user C through a real-time transport control protocol. Based on this information, the terminal of the current user A may select an AI downscaling model corresponding to the currently allowable bandwidth or bitrate and an upscaling method of the terminal of the opposite user C from among a plurality of AI downscaling models. The terminal of the current user A may perform AI downscaling 2055 on an original image 2050 by using the selected AI downscaling model to obtain a first image 2030, may perform encoding 2065 on the first image 2030, and may transmit an image corresponding to a result of the encoding 2065 to the terminal of the opposite user C.

The terminal of the opposite user C may obtain a second image 2075 by performing decoding 2070 on the received image, and may reconstruct (2085) an image by performing upscaling 2080 on the second image 2075 according to the upscaling method (for example, bicubic scaling) supported by the terminal of the opposite user C.

The upscaling method may include at least one of legacy upscaling methods such as bilinear scaling, bicubic scaling, lanczos scaling, and stair step scaling.

As another example, when the current communication environment is not good, an opposite user terminal may transmit current communication environment information and upscaling model information to a current user terminal, and, when the current communication environment is good, the opposite user terminal may transmit only the current communication environment information to the current user terminal. In detail, when the current communication environment is not good, the terminal of the current user A obtains the current communication environment information and the upscaling model information from the terminal of the opposite user B, and, based on this information, the terminal of the current user A may select an AI downscaling model corresponding to the currently allowable bandwidth or bitrate and the AI upscaling method of the terminal of the opposite user B from among the plurality of AI downscaling models. The terminal of the current user A may perform the AI downscaling 2005 on the original image 2000 by using the selected AI downscaling model to obtain the first image 2010, may perform the encoding 2015 on the first image 2010, and may transmit an image corresponding to a result of the encoding 2015 to the terminal of the opposite user B. On the other hand, when the current communication environment is good, the terminal of the current user A may obtain the current communication environment information from the opposite user terminal B, and may transmit an original image to the opposite user terminal B, based on the current communication environment information. This is because, when the current communication environment is good, data of the original image may be sufficiently properly transmitted even when the original image is not downscaled.

A training method of an AI-downscaling DNN according to a legacy upscaling method other than AI upscaling has been described above in detail, and thus a description thereof may not be repeated below.

As another example, when both terminals do not support (or are set not to implement) AI upscaling and AI downscaling, a current user terminal transmits an image with an existing original image size to an opposite user terminal during a video telephone call. This is because the current user terminal may not adaptively perform downscaling according to an upscaling method of the opposite user terminal.

Figure 21:
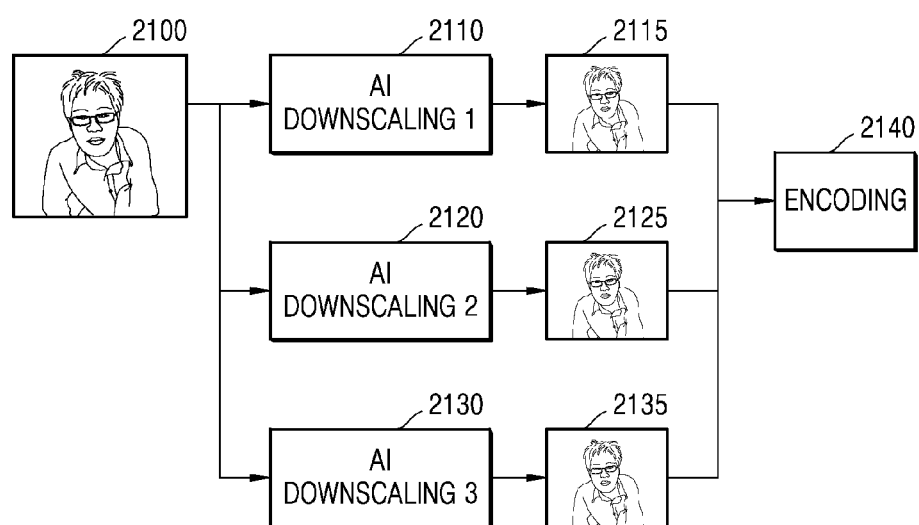
FIG. 21 is a block diagram for explaining an AI downscaling method that is adaptively selected according to specifications or processing power of an opposite mobile communication terminal, according to another embodiment.

FIG. 21 is a block diagram for explaining an AI downscaling method that is adaptively selected according to specifications or processing power of an opposite mobile communication terminal, according to another embodiment.

Referring to FIG. 21, a mobile communication terminal supporting AI downscaling has various AI downscaling models. The mobile communication terminal selects an AI downscaling model suitable for an upscaling method of the opposite user terminal from among various AI downscaling models according to upscaling information of the opposite user terminal, and downscales an input image, based on the selected AI downscaling model. However, when there are no AI downscaling models suitable for the opposite user terminal, the mobile communication terminal may download an AI downscaling model corresponding to the upscaling method supported by the opposite user terminal from a server, and may downscale the input image, based on the downloaded AI downscaling model.

For example, a plurality of AI downscaling models 2110, 2120, and 2130 for downscaling an original image 2100 may differ in a DNN structure for use in AI downscaling, or may have the same DNN structures but differ in parameters of a filter kernel. The DNN structure of AI downscaling 2 (2120) may be different from that of AI downscaling 1 (2110) in terms of the number of layers, the number of channels, the size of a filter, and the like, and the DNN structure of AI downscaling 3 (2130) may be the same as that of AI downscaling 1 (2110) but may be different therefrom in terms of the weight of a filter, the parameters of the filter kernel, and the like.

When streaming from a server (cloud server) to a client (e.g., TV) occurs, one AI-based downscaling and upscaling model having the best performance in the specifications of the server is mainly used (e.g., when the server transmits an image to the client in an environment where the bit rate is 15 Mbps) because the specifications of the server are similar to each other. However, in the case of a video telephone call, there may be various cases according to a communication environment (e.g., an environment with a bit rate of 64 Kbps) and the specifications of another terminal (e.g., a supported upscaling method varies depending on the models of SAMSUNG GALAXY S4, S6, S8, S20, N20, etc.), and thus various downscaling models may be needed for various situations. An image may be efficiently transmitted due to a reduction in its bandwidth caused by effectively downscaling the image by using an appropriate AI downscale model selected for each situation. A downscaled image with an improved image quality may be obtained by performing downscaling according to the specifications or processing power of the opposite user terminal. An image may be effectively restored in the opposite user terminal, and thus the overall performance of a video telephone call may be improved.

Figure 22:
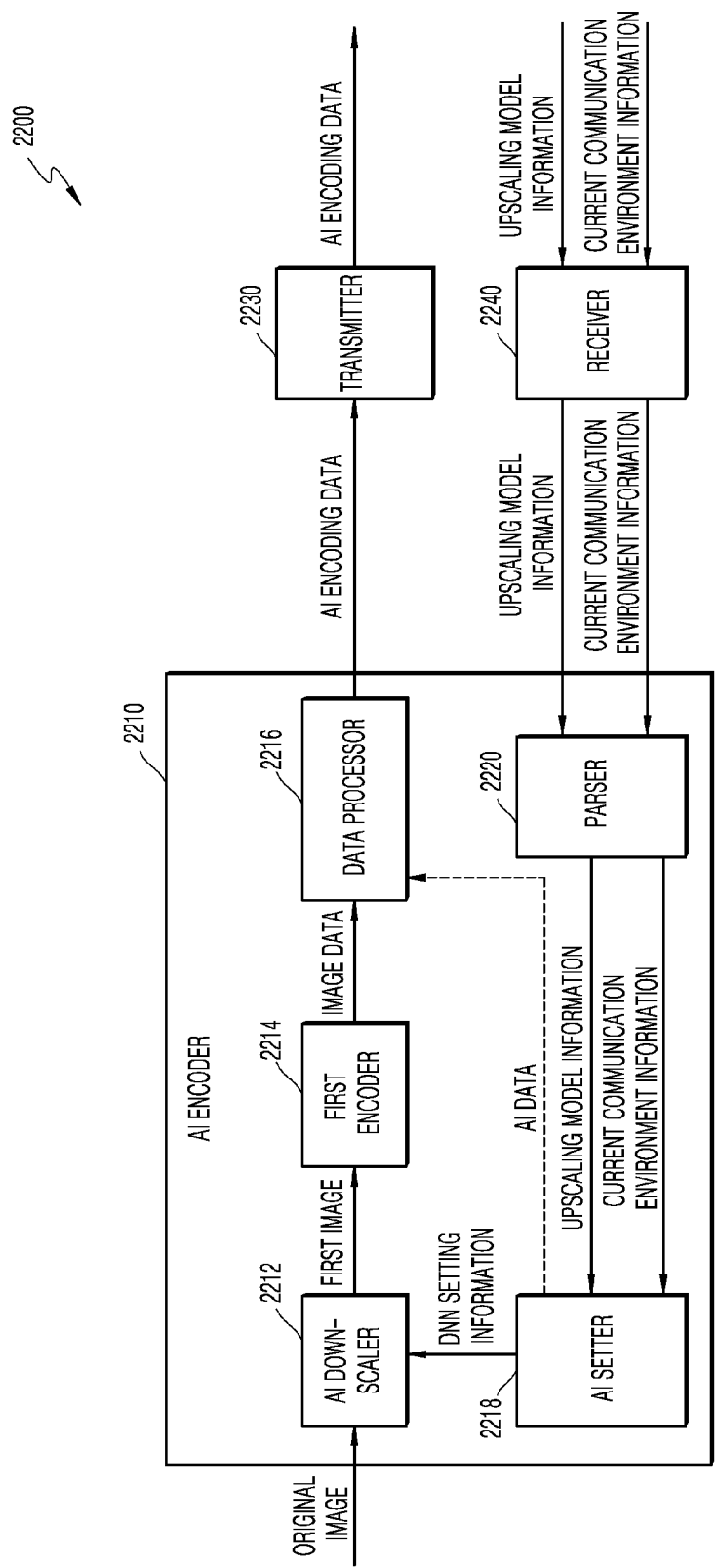
FIG. 22 is a block diagram of a configuration of a mobile communication terminal supporting AI downscaling during a video telephone call, according to another embodiment.

FIG. 22 is a block diagram of a configuration of a mobile communication terminal 2200 supporting AI downscaling during a video telephone call, according to another embodiment.

Referring to FIG. 22, the mobile communication terminal 2200 may include an AI encoder 2210, a transmitter 2230, and a receiver 2240. The AI encoder 2210 may include an AI down-scaler 2212, a first encoder 2214, a data processor 2216, an AI setter 2218, and a parser 2220.

In FIG. 22, the AI encoder 2210, the transmitter 2230, and the receiver 2240 are illustrated as separate devices. However, the AI encoder 2210, the transmitter 2230, and the receiver 2240 may be implemented through one processor. In this case, the AI encoder 2210, the transmitter 2230, and the receiver 2240 may be implemented through a dedicated processor or through a combination of software and a general-purpose processor such as an AP, a CPU or a GPU. The dedicated processor may include a memory for implementing an embodiment (e.g., for storing instructions executable by the processor to perform a method according to an embodiment) or may include a memory processor for using an external memory.

Also, the AI encoder 2210, the transmitter 2230, and the receiver 2240 may be configured by a plurality of processors. In this case, the AI encoder 2210, the transmitter 2230, and the receiver 2240 may be implemented through a combination of dedicated processors or through a combination of software and a plurality of general-purpose processors such as an AP, a CPU, or a GPU.

According to an embodiment, the first encoder 2214 may be configured by a first processor, the AI down-scaler 2212, the data processor 2216, and the AI setter 2218 may be implemented using a second processor different from the first processor, the transmitter 2230 may be implemented using a third processor different from the first and second processors, and the parser 2220 and the receiver 2240 may be implemented using a fourth processor different from the first, second, and third processors. It is understood that this is just an example, and one or more other embodiments may implement the various components via any combination of one or more processors.

During a video telephone call of the mobile communication terminal 2200, the receiver 2240 may receive upscaling model information of an opposite terminal and current communication environment information from the opposite terminal through a communication network. When the current communication environment is good (e.g., a bitrate, a measurement, a parameter, etc., is greater than a predetermined threshold), only the current communication environment information may be received.

The receiver 2240 outputs the upscaling model information of the opposite terminal and the current communication environment information to the parser 2220.

The parser 2220 parses the upscaling model information and the current communication environment information and transmits a result of the parsing to the AI setter 2218.

The AI encoder 2210 performs AI downscaling on the original image 1900 and first encoding on the first image 1910, and transmits AI encoding data to the transmitter 2230. The transmitter 2230 transmits the AI encoding data to the opposite terminal.

Image data includes data obtained as a result of performing the first encoding on the first image 1910. The image data may include data obtained based on pixel values in the first image 1910, for example, residual data that is a difference between the first image 1910 and prediction data of the first image 1910. Also, the image data includes pieces of information used during a first encoding process of the first image 1910. For example, the image data may include prediction mode information, motion information, and quantization parameter information used to perform the first encoding on the first image 1910, for example.

AI data includes pieces of information enabling an AI up-scaler 2336 of a mobile communication terminal 2300, which will be described below with reference to FIG. 23, to perform AI upscaling on the second image 1925 to an upscaling target corresponding to a downscaling target of a first DNN. According to an embodiment, the AI data may include difference information between the original image 1900 and the first image 1910. According to an embodiment, the AI data may include information related to the first image 1910. The information related to the first image 1910 may include information about at least one of a resolution of the first image 1910, a bitrate of the image data obtained as the result of performing first encoding on the first image 1910, or a codec type used during the first encoding of the first image 1910.

According to an embodiment, the AI data may include an identifier (e.g., an index value based on a lookup table) of mutually agreed DNN setting information such that the AI upscaling is performed on the second image 1925 to the upscaling target corresponding to the downscaling target of the first DNN.

Also, according to an embodiment, the AI data may include DNN setting information settable in a second DNN.

According to an embodiment, when the opposite terminal does not support AI upscaling, the AI data may not be transmitted.

The AI down-scaler 2212 may obtain the first image 1910 obtained by performing the AI downscaling 1905 on the original image 1900 through the first DNN. The AI down-scaler 2212 may perform AI downscaling on the original image 1900 by using DNN setting information provided by the AI setter 2218.

The AI setter 2218 may determine the downscaling target of the original image 1900, based on a pre-determined standard according to the AI upscaling support information obtained from the parser 2220.

In order to obtain the first image 1910 matching the downscaling target, the AI setter 2218 may store a plurality of pieces of DNN setting information settable in the first DNN. The AI setter 2218 obtains DNN setting information corresponding to the downscaling target from among the plurality of pieces of DNN setting information, and provides the obtained DNN setting information to the AI down-scaler 2212.

Each of the plurality of pieces of DNN setting information may be trained to obtain the first image 1910 of pre-determined resolution and/or pre-determined quality. For example, one piece of DNN setting information from among the plurality of pieces of DNN setting information may include pieces of information for obtaining the first image 1910 having a resolution that is ¼ the resolution of the original image 1900, for example, the first image 1910 of QVGA (320×240) that is ¼ the original image 1900 of VGA(640×480).

According to an embodiment, when pieces of information (for example, the number of convolution layers, the number of filter kernels for each convolution layer, a parameter of each filter kernel, and the like) constituting the DNN setting information are stored in a form of a lookup table, the AI setter 2218 may obtain the DNN setting information by combining some values selected from the values in the lookup table, based on the downscaling target, and provide the obtained DNN setting information to the AI down-scaler 2212.

According to an embodiment, the AI setter 2218 may determine a structure of a DNN corresponding to the downscaling target, based on the current communication environment information and the upscaling model information, and may obtain DNN setting information corresponding to the determined structure of the DNN, for example, obtain parameters of a filter kernel.

The plurality of pieces of DNN setting information for performing the AI downscaling on the original image 1900 may have an optimized value as the first DNN and the second DNN are jointly trained or only the first DNN is trained using a legacy upscaling method. Here, each piece of DNN setting information includes at least one of the number of convolution layers included in the first DNN, the number of filter kernels for each convolution layer, or a parameter of each filter kernel.

The AI down-scaler 2212 may obtain the first image 1910 of certain resolution and/or certain quality through the first DNN by setting the first DNN with the DNN setting information selected to perform the AI downscaling on the original image 1900. When the DNN setting information for performing the AI downscaling on the original image 1900 is obtained from the plurality of pieces of DNN setting information, each layer in the first DNN may process input data, based on pieces of information included in the DNN setting information.

A method, performed by the AI setter 2218, of determining the downscaling target will now be described. The downscaling target may indicate, for example, by how much a resolution is decreased from the original image 1900 to obtain the first image 1910.

The AI setter 2218 obtains one or more pieces of input information. According to an embodiment, the one or more pieces of input information may include at least one of target resolution of the first image 1910, a target bitrate of the image data, a bitrate type of the image data (for example, a variable bitrate type, a constant bitrate type, or an average bitrate type), a color format (luminance component, chrominance component, red component, green component, and/or blue component) to which AI downscaling is applied, a codec type for first encoding, compression history information, resolution of the original image 1900, or a type of the original image 1900, based on at least one of the current communication environment information or the upscaling model information.

The one or more pieces of input information may include information pre-stored in the mobile communication terminal 2200 or information received from a user.

The AI setter 2218 controls an operation of the AI up-scaler 2212, based on the input information. According to an embodiment, the AI setter 2218 may determine a downscaling target according to the input information, and may provide DNN setting information corresponding to the determined downscaling target to the AI down-scaler 2212.

According to an embodiment, the AI setter 2218 transmits at least a part of the input information to the first encoder 2214, and thus the first encoder 2214 may perform first encoding on the first image 1910 via a bitrate of a certain value, a bitrate of a certain type, and a certain codec.

According to an embodiment, the AI setter 2218 may determine the downscaling target, based on at least one of a compression ratio (for example, a resolution difference between the original image 1900 and the first image 1910, a target bitrate, or the like), a compression quality (for example, a type of bitrate), compression history information, or a type of the original image 1900.

For example, the AI setter 2218 may determine the downscaling target, based on the compression ratio, the compression quality, or the like, which is pre-set or received from a user.

As another example, the AI setter 2218 may determine the downscaling target by using the compression history information stored in the mobile communication terminal 2200. For example, according to the compression history information usable by the mobile communication terminal 2200, an encoding quality, a compression ratio, or the like preferred by a user may be determined, and the downscaling target may be determined according to the encoding quality determined based on the compression history information. For example, the resolution, quality, or the like of the first image 1910 may be determined according to the encoding quality that has been used most often according to the compression history information.

As another example, the AI setter 2218 may determine the downscaling target based on the encoding quality that has been used more frequently than a certain threshold value (for example, an average quality of the encoding qualities that have been used more frequently than the certain threshold value), according to the compression history information.

As another example, the AI setter 2218 may determine the downscaling target, based on the resolution, type (for example, a file format), or the like of the original image 1900.

According to an embodiment, when the original image 1900 includes a plurality of frames, the AI setter 2218 may independently obtain DNN setting information in units of a certain number of frames (where the certain number is one or an integer greater than one), or may provide the independently-obtained DNN setting information to the AI down-scaler 2212.

According to an embodiment, the AI setter 2218 may divide the frames included in the original image 1900 into a certain number of groups, and independently determine the downscaling target for each group. The same or different pieces of DNN setting information may be obtained for each group. The numbers of frames included in the groups may be the same or different according to each group.

According to another embodiment, the AI setter 2218 may independently determine DNN setting information for each of the frames included in the original image 1900. The same or different pieces of DNN setting information may be obtained for each frame.

Figure 23:
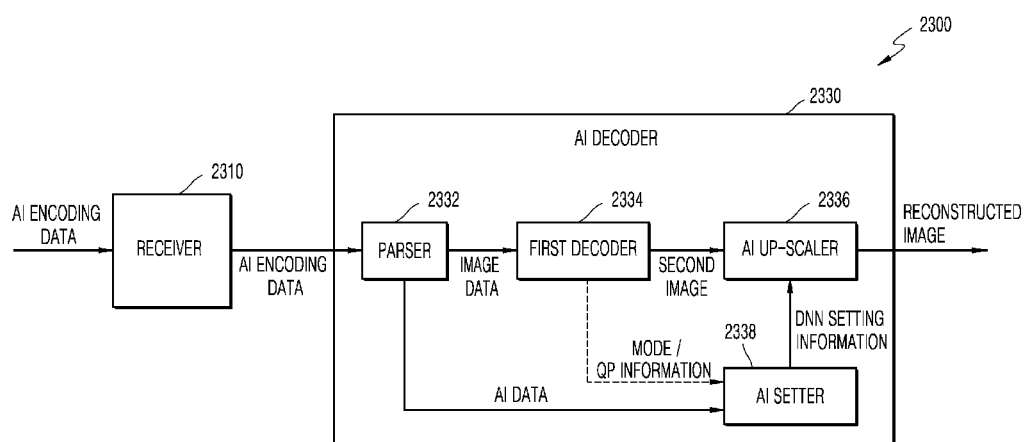
FIG. 23 is a block diagram of a configuration of a mobile communication terminal supporting AI upscaling during a video telephone call, according to another embodiment.

FIG. 23 is a block diagram of a configuration of a mobile communication terminal 2300 supporting AI upscaling during a video telephone call, according to another embodiment.

Referring to FIG. 23, the mobile communication terminal 2300 includes a receiver 2310 and an AI decoder 2330. The AI decoder 2330 may include a parser 2332, a first decoder 2334, an AI up-scaler 2336, and an AI setter 2338.

In FIG. 23, the receiver 2310 and the AI decoder 2330 are illustrated as separate devices. However, the receiver 2310 and the AI decoder 2330 may be implemented through one processor. In this case, the receiver 2310 and the AI decoder 2330 may be implemented through a dedicated processor or through a combination of software and a general-purpose processor such as an application processor (AP), a central processing unit (CPU), or a graphic processing unit (GPU). The dedicated processor may include a memory for implementing an embodiment (e.g., for storing instructions executable by the processor to perform a method according to an embodiment) or may include a memory processor for using an external memory.

The receiver 2310 and the AI decoder 2330 may be configured by a plurality of processors. In this case, the receiver 2310 and the AI decoder 2330 may be implemented through a combination of dedicated processors or through a combination of software and a plurality of general-purpose processors such as an AP, a CPU, or a GPU. According to an embodiment, the receiver 2310 may be implemented using a first processor, the first decoder 2334 may be implemented using a second processor different from the first processor, and the parser 2332, the AI up-scaler 2336, and the AI setter 2338 may be implemented using a third processor different from the first and second processors. It is understood that this is just an example, and one or more other embodiments may implement the various components via any combination of one or more processors.

The receiver 2310 receives AI encoding data obtained as a result of AI encoding. For example, the AI encoding data may be a video file having a file format such as mp4 or mov.

The receiver 2310 may receive AI encoding data transmitted through a communication network. The receiver 2310 outputs the AI encoding data to the AI decoder 2330.

The parser 2332 parses the AI encoding data to transmit image data obtained through first encoding on the first image 1910 to the first decoder 2334 and transmit AI data to the AI setter 2338.

According to an embodiment, the parser 2332 may parse the AI encoding data including the image data and the AI data separate from each other. The parser 2332 may distinguish the AI data from the image data by reading a header within the AI encoding data.

A structure of the AI encoding data including the AI data and the image data separate from each other has been described above with reference to FIG. 9, and thus a description thereof will be omitted.

According to another embodiment, the parser 2332 may parse the AI encoding data to obtain image data, may extract AI data from the image data, and then may transmit the AI data to the AI setter 2338 and the remaining image data to the first decoder 2334. In other words, the AI data may be included in the image data. For example, the AI data may be included in supplemental enhancement information (SEI) that is an additional information region of a bitstream corresponding to the image data. A structure of the AI encoding data including the image data including the AI data has been described above with reference to FIG. 10, and thus a description thereof may not be repeated below.

According to another embodiment, the parser 2332 may split the bitstream corresponding to the image data into a bitstream to be processed by the first decoder 2334 and a bitstream corresponding to the AI data, and may output the split two bitstreams to the first decoder 2334 and the AI setter 2338, respectively.

The parser 2332 may verify that the image data included in the AI encoding data is image data obtained via a certain codec (for example, MPEG-2, H.264 AVC, MPEG-4, HEVC, VC-1, VP8, VP9, AV1, etc.). In this case, the parser 2332 may transmit corresponding information to the first decoder 2334 such that the image data is processed via the verified codec.

The first decoder 2334 reconstructs the second image 1925 corresponding to the first image 1910, based on the image data received from the parser 2332. The second image 1925 obtained by the first decoder 2334 is provided to the AI up-scaler 2336.

According to embodiments, first decoding related information, such as prediction mode information, motion information, and quantization parameter information, may be provided by the first decoder 2334 to the AI setter 2338. The first decoding related information may be used to obtain DNN setting information.

The AI data provided to the AI setter 2338 includes pieces of information enabling the second image 1925 to undergo AI upscaling. Here, an upscaling target of the second image 1925 is to correspond to a downscaling target of a first DNN. Accordingly, the AI data includes information for verifying the downscaling target of the first DNN.

Examples of the information included in the AI data include difference information between resolution of the original image 1900 and resolution of the first image 1910, and information related to the first image 1910.

The difference information may be expressed as information about a resolution conversion degree of the first image 1910 as compared to the original image 1900 (for example, resolution conversion rate information). Also, because the resolution of the first image 1910 is ascertained through the resolution of the reconstructed second image 1925 and the resolution conversion degree is verified accordingly, the difference information may be expressed only as resolution information of the original image 1900. Here, the resolution information may be expressed as vertical/horizontal screen sizes or as a ratio (16:9, 4:3, or the like) and a size of one axis. Also, when there is pre-set resolution information, the resolution information may be expressed in the form of an index or flag.

The information related to the first image 1910 may include information about at least one of a resolution of the first image 1910, a bitrate of the image data obtained as the result of performing first encoding on the first image 1910, or a codec type used during the first encoding of the first image 1910.

The AI setter 2338 may determine the upscaling target of the second image 1925, based on at least one of the difference information or the information related to the first image 1910, which are included in the AI data. The upscaling target may indicate, for example, to what degree resolution is to be upscaled for the second image 1925. When the upscaling target is determined, the AI up-scaler 2336 performs AI upscaling on the second image 1925 through a second DNN in order to obtain the reconstructed image 1935 corresponding to the upscaling target.

A method in which the AI setter 2338 determines the upscaling target of the second image 1925 and the AI up-scaler 2336 performs the AI upscaling on the second image 135 according to the upscaling target will now be described.

According to an embodiment, the AI setter 2338 may store a plurality of pieces of DNN setting information settable in a second DNN.

Here, the DNN setting information may include information about at least one of the number of convolution layers included in the second DNN, the number of filter kernels for each convolution layer, or a parameter of each filter kernel. The plurality of pieces of DNN setting information may respectively correspond to various upscaling targets, and the second DNN may operate based on DNN setting information corresponding to a certain upscaling target. The second DNN may have different structures based on the DNN setting information. For example, the second DNN may include three convolution layers according to any piece of DNN setting information, or may include four convolution layers according to another piece of DNN setting information.

According to an embodiment, the DNN setting information may only include a parameter of a filter kernel used in the second DNN. In this case, rather than the structure of the second DNN changing, only the parameter of the internal filter kernel may change based on the DNN setting information.

The AI setter 2338 may obtain the DNN setting information for performing AI upscaling on the second image 1925, among the plurality of pieces of DNN setting information. Each of the plurality of pieces of DNN setting information used at this time is information for obtaining the reconstructed image 1935 of a pre-determined resolution and/or pre-determined quality, and is trained jointly with a first DNN.

For example, one piece of DNN setting information from among the plurality of pieces of DNN setting information may include pieces of information for obtaining the reconstructed image 1935 having a resolution that is 4 times greater than the resolution of the second image 1925, for example, the reconstructed image 1935 of VGA (640×480) that is 4 times greater than the second image 1925 of QVGA(320×240).

Each of the plurality of pieces of DNN setting information is obtained jointly with DNN setting information of the first DNN of the mobile communication terminal 2200, and the AI setter 2338 obtains one piece of DNN setting information from among the plurality of pieces of DNN setting information according to an enlargement ratio corresponding to a reduction ratio of the DNN setting information of the first DNN. To this end, the AI setter 2338 verifies information of the first DNN. In order for the AI setter 2338 to verify the information of the first DNN, the mobile communication terminal 2300 according to an embodiment receives AI data including the information of the first DNN from the mobile communication terminal 2200.

In other words, the AI setter 2338 may verify information targeted by DNN setting information of the first DNN used to obtain the first image 1910 and obtain the DNN setting information of the second DNN trained jointly with the DNN setting information of the first DNN, by using pieces of information received from the mobile communication terminal 2200.

When DNN setting information for performing the AI upscaling on the second image 1925 is obtained from among the plurality of pieces of DNN setting information, the DNN setting information may be transmitted to the AI up-scaler 2336, and input data may be processed based on the second DNN operating according to the DNN setting information.

For example, when any one piece of DNN setting information is obtained, the AI up-scaler 2336 sets the number of filter kernels included in each of the first, second, and third convolution layers 310, 330, and 350 of the second DNN 300 of FIG. 3, and the parameters of the filter kernels, as values included in the obtained DNN setting information.

In detail, when parameters of a filter kernel of 3×3 used in any one convolution layer of the second DNN 300 of FIG. 3 are {1, 1, 1, 1, 1, 1, 1, 1, 1} and DNN setting information is changed, the AI up-scaler 2336 may replace the parameters of the filter kernel with {2, 2, 2, 2, 2, 2, 2, 2, 2} that are parameters included in the changed DNN setting information.

The AI setter 2338 may obtain the DNN setting information for upscaling the second image 1925 from among the plurality of pieces of DNN setting information, based on information included in the AI data, and the AI data used to obtain the DNN setting information will now be described.

According to an embodiment, the AI setter 2338 may obtain the DNN setting information for upscaling the second image 1925 from among the plurality of pieces of DNN setting information, based on difference information included in the AI data. For example, when it is verified that the resolution (for example, VGA (640×480)) of the original image 1900 is twice higher than the resolution (for example, QVGA (320×240)) of the first image 1910, based on the difference information, the AI setter 2338 may obtain the DNN setting information for increasing the resolution of the second image 1925 by 4 times.

According to another embodiment, the AI setter 2338 may obtain the DNN setting information for upscaling the second image 1925 from among the plurality of pieces of DNN setting information, based on information related to the first image 1910 included in the AI data. The AI setter 2338 may pre-determine a mapping relationship between pieces of image-related information and pieces of DNN setting information, and obtain the DNN setting information mapped to the information related to the first image 1910.

Figure 24:
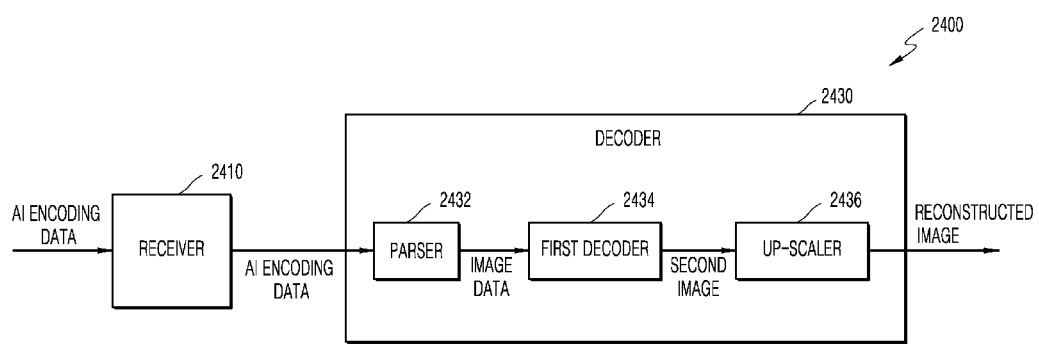
FIG. 24 is a block diagram of a configuration of a mobile communication terminal not supporting AI upscaling during a video telephone call, according to another embodiment.

FIG. 24 is a block diagram of a configuration of a mobile communication terminal 2400 not supporting AI upscaling during a video telephone call, according to another embodiment.

Referring to FIG. 24, the mobile communication terminal 2400 includes a receiver 2410 and a decoder 2430. The decoder 2430 may include a parser 2432, a first decoder 2434, and an up-scaler 2436.

In FIG. 24, the receiver 2410 and the decoder 2430 are illustrated as separate devices. However, the receiver 2410 and the decoder 2430 may be implemented through one processor. In this case, the receiver 2410 and the decoder 2430 may be implemented through a dedicated processor or through a combination of software and a general-purpose processor such as an application processor (AP), a central processing unit (CPU), or a graphic processing unit (GPU). The dedicated processor may include a memory for implementing an embodiment (e.g., for storing instructions executable by the processor to perform a method according to an embodiment) or may include a memory processor for using an external memory.

The receiver 2410 and the decoder 2430 may be configured by a plurality of processors. In this case, the receiver 2410 and the decoder 2430 may be implemented through a combination of dedicated processors or through a combination of software and a plurality of general-purpose processors such as an AP, a CPU, or a GPU. According to an embodiment, the receiver 2410 may be implemented using a first processor, the first decoder 2434 may be implemented using a second processor different from the first processor, and the parser 2432 and the up-scaler 2436 may be implemented using a third processor different from the first and second processors. It is understood that this is just an example, and one or more other embodiments may implement the various components via any combination of one or more processors.

The receiver 2410 receives AI encoding data obtained as a result of AI encoding. For example, the AI encoding data may be a video file having a file format such as mp4 or mov.

The receiver 2410 may receive AI encoding data transmitted through a communication network. The receiver 2410 outputs the AI encoding data to the AI decoder 2430.

The parser 2432 parses the AI encoding data to transmit image data obtained through first encoding on the first image 1910 to the first decoder 2434.

According to an embodiment, the parser 2432 may parse the AI encoding data including the image data.

The parser 2432 may verify that the image data included in the AI encoding data is image data obtained via a certain codec (for example, MPEG-2, H.264 AVC, MPEG-4, HEVC, VC-1, VP8, VP9, AV1, etc.). In this case, the parser 2432 may transmit corresponding information to the first decoder 2434 such that the image data is processed via the verified codec.

Because the mobile communication terminal 2400 does not support AI upscaling, the mobile communication terminal 2400 does not receive the AI data from the opposite mobile communication terminal 2200, as opposed to the mobile communication terminal 2300 of FIG. 23.

The first decoder 2434 reconstructs the second image 1925 corresponding to the first image 1910, based on the image data received from the parser 2432. The second image 1925 obtained by the first decoder 2434 is provided to the up-scaler 2436.

The image data may include information related to the first image 1910, and the information related to the first image 1910 may include information about at least one of a resolution of the first image 1910, a bitrate of the image data obtained as the result of performing first encoding on the first image 1910, or a codec type used during the first encoding of the first image 1910.

The up-scaler 2436 may obtain the reconstructed image 1935 having a resolution that is 4 times greater than the resolution of the second image 1925, for example, the reconstructed image 1935 of VGA (640×480) that is 4 times greater than the second image 1925 of QVGA(320×240), based on a legacy upscaling method according to the specifications or processing power of the mobile communication terminal 2400. Because the AI encoding data received from the opposite mobile communication terminal 2200 is generated based on the AI upscaling model information of the mobile communication terminal 2400, the mobile communication terminal 2400 may obtain the reconstructed image 1935 by upscaling the second image 1925 according to an upscaling method of the mobile communication terminal 2400 by using only the image data without the AI data.

Figure 25:
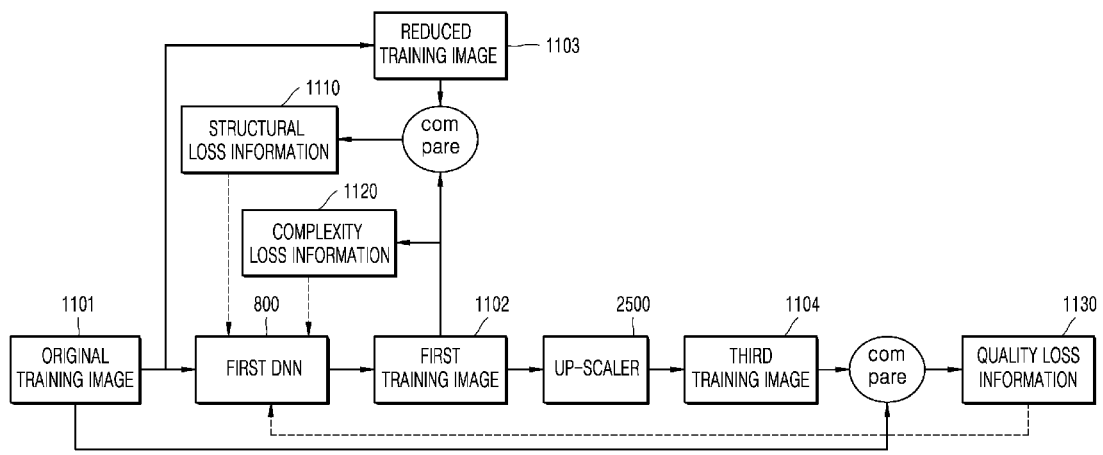
FIG. 25 is a block diagram for explaining a method of training a first DNN for AI-downscaling an original image when an opposite mobile communication terminal does not support AI upscaling according to an embodiment.

FIG. 25 is a block diagram for explaining a method of training a first DNN for AI-downscaling an original image when an opposite mobile communication terminal does not support AI upscaling.

FIG. 25 is different from FIG. 11 described above, in that a third training image is obtained by upscaling a first training image by using an up-scaler applying a legacy upscaling method instead of using a second DNN, which is an upscaling DNN.

First, a training process shown in FIG. 25 will be described.

In FIG. 25, an original training image 1101 is an image on which AI downscaling is to be performed, and a first training image 1102 is an image obtained by performing AI downscaling on the original training image 1101. Also, a third training image 1104 is an image obtained by performing upscaling on the first training image 1102 according to the legacy upscaling method. Here, the legacy upscaling method may include at least one of bilinear scaling, bicubic scaling, lanczos scaling, or stair step scaling.

The original training image 1101 includes a still image or a moving image including a plurality of frames. According to an embodiment, the original training image 1101 may include a luminance image extracted from the still image or the moving image including the plurality of frames. According to an embodiment, the original training image 1101 may include a patch image extracted from the still image or the moving image including the plurality of frames. When the original training image 1101 includes the plurality of frames, the first training image 1102, a second training image, and the third training image 1104 also each include a plurality of frames. When the plurality of frames of the original training image 1101 are sequentially input to the first DNN 800, the plurality of frames of the first training image 1102, the second training image, and the third training image 1104 may be sequentially obtained through the first DNN 800 and the up-scaler 1900.

For joint training of the first DNN 800, the original training image 1101 is input to the first DNN 800. The original training image 1101 input to the first DNN 800 is output as the first training image 1102 via the AI downscaling, the first training image 1102 is input to an up-scaler 2500 and undergoes upscaling, and the third training image 1104 is output a result of the upscaling.

Referring to FIG. 25, the third training image 1104 is output by applying an upscaling method to the first training image 1102. According to an embodiment, an upscaling method may be applied to a second training image obtained via first encoding and first decoding on the first training image 1102. In order to apply an upscaling method to the second training image, any one codec among MPEG-2, H.264, MPEG-4, HEVC, VC-1, VP8, VP9, AV1, etc., may be used. In detail, any one codec among MPEG-2, H.264, MPEG-4, HEVC, VC-1, VP8, VP9, AV1, etc., may be used to perform first encoding on the first training image 1102 and first decoding on image data corresponding to the first training image 1102.

Referring to FIG. 25, separate from the first training image 1102 being output through the first DNN 800, a reduced training image 1103 is obtained by performing legacy downscaling on the original training image 1101. Here, the legacy downscaling may include at least one of bilinear scaling, bicubic scaling, lanczos scaling, or stair step scaling.

In order to prevent a structural feature of the first image 1310 from deviating greatly from a structural feature of the original image 1300, the reduced training image 1103 is obtained to preserve the structural feature of the original training image 1101.

Before training is performed, the first DNN 800 may be set with pre-determined DNN setting information. When the training is performed, structural loss information 1110, complexity loss information 1120, and the quality loss information 1130 may be determined.

The structural loss information 1110 may be determined based on a result of comparing the reduced training image 1103 and the first training image 1102. For example, the structural loss information 1110 may correspond to a difference between structural information of the reduced training image 1103 and structural information of the first training image 1102. Structural information may include various features extractable from an image, such as luminance, contrast, histogram, or the like of the image. The structural loss information 1110 indicates how much structural information of the original training image 1101 is maintained in the first training image 1102. When the structural loss information 1110 is small, the structural information of the first training image 1102 is similar to the structural information of the original training image 1101.

The complexity loss information 1120 may be determined based on spatial complexity of the first training image 1102. For example, a total variance value of the first training image 1102 may be used as the spatial complexity. The complexity loss information 1120 is related to a bitrate of image data obtained by performing first encoding on the first training image 1102. It is defined that the bitrate of the image data is low when the complexity loss information 1120 is small.

The quality loss information 1130 may be determined based on a result of comparing the original training image 1101 with the third training image 1104. The quality loss information 1130 may include at least one of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multimethod Assessment Fusion (VMAF) value regarding the difference between the original training image 1101 and the third training image 1104. The quality loss information 1130 indicates how much the third training image 1104 is similar to the original training image 1101. The third training image 1104 is more similar to the original training image 1101 when the quality loss information 1130 is small.

Referring to FIG. 25, the structural loss information 1110, the complexity loss information 1120, and the quality loss information 1130 may be used to train the first DNN 800.

The first DNN 800 may update a parameter such that final loss information determined based on the structural loss information 1110, the complexity loss information 1120, and the quality loss information 1130 is reduced or minimized.

The final loss information for training the first DNN 800 may be determined as Equation 2 below.

$$\text{Loss}DS2 = a*\text{structural loss information} + b*\text{complexity loss information} + c*\text{quality loss information} \quad \text{[Equation 2]}$$

In Equation 2, LossDS2 represents final loss information that is to be reduced or minimized for training of the first DNN 800. Also, a, b, and c may correspond to pre-determined certain weights.

In other words, the first DNN 800 updates parameters in a direction in which LossDS2 of Equation 2 decreases.

When the parameters of the first DNN 800 are updated according to LossDS2 derived during the training, the first training image 1102 obtained based on the updated parameters becomes different from a first training image 1102 obtained during previous training, and accordingly, the third training image 1104 also becomes different from a third training image 1104 obtained during the previous training. When the quality loss information 1130 is newly determined, LossDS2 is also newly determined, and thus the first DNN 800 updates the parameters according to the newly determined LossDS2.

It has been described above that the AI setter 2218 of the mobile communication terminal 2200 stores the plurality of pieces of DNN setting information. A method of training each of the plurality of pieces of DNN setting information stored in the AI setter 2218 will now be described.

As described with reference to Equation 2, the first DNN 800 updates the parameters, based on the similarity (the structural loss information 1110) between the structural information of the first training image 1102 and the structural information of the original training image 1101, the bitrate (the complexity loss information 1120) of the image data obtained as a result of performing first encoding on the first training image 1102, and the difference (the quality loss information 1130) between the third training image 1104 and the original training image 1101.

In detail, the parameters of the first DNN 800 may be updated such that the first training image 1102 having similar structural information as the original training image 1101 is obtained and the image data having a small bitrate is obtained when first encoding is performed on the first training image 1102, and also such that the first training image 1102 is input to the up-scaler 2500 to obtain the third training image 1104 similar to the original training image 1101.

A direction in which the parameters of the first DNN 800 are optimized varies by adjusting the weights a, b, and c of Equation 2. For example, when the weight b is determined to be high, the parameters of the first DNN 800 may be updated by prioritizing a low bitrate over the high quality of the third training image 1104. Also, when the weight c is determined to be high, the parameters of the first DNN 800 may be updated by prioritizing high quality of the third training image 1104 over a high bitrate or maintenance of the structural information of the original training image 1101.

Also, the direction in which the parameters of the first DNN 800 are optimized may vary according to a type of codec used to perform first encoding on the first training image 1102. This is because the second training image may vary according to the type of codec.

In other words, the parameters of the first DNN 800 may be updated based on the weights a, b, and c, and the type of codec for performing first encoding on the first training image 1102. Accordingly, when the first DNN 800 is trained after determining the weights a, b, and c each to be a certain value and determining the type of codec to be a certain type, the optimized parameters of the first DNN 800 may be determined.

Also, when the first DNN 800 is trained after changing the weights a, b, and c, and the type of codec, the optimized parameters of the first DNN 800 may be determined. In other words, the plurality of pieces of DNN setting information jointly trained with each other may be determined in the first DNN 800, when the first DNN 800 is trained while changing the values of the weights a, b, and c, and the value of each type of codec.

The plurality of pieces of DNN setting information of the first DNN 800 may be mapped to pieces of information related to a first image. To set such a mapping relationship, first encoding may be performed on the first training image 1102 output from the first DNN 800, via a certain codec according to a certain bitrate, and a second training image obtained by performing first decoding on a bitstream obtained as a result of the first encoding may be input to the up-scaler 2500. In other words, by training the first DNN 800 after setting an environment such that the first encoding is performed on the first training image 1102 of a certain resolution via the certain codec according to the certain bitrate, a DNN setting information pair mapped to the resolution of the first training image 1102, a type of the codec used to perform the first encoding on the first training image 1102, and the bitrate of the bitstream obtained as a result of performing the first encoding on the first training image 1102 may be determined. The mapping relationships between the plurality of pieces of DNN setting information of the first DNN 800 and the pieces of information related to the first image may be determined by varying the resolution of the first training image 1102, the type of codec used to perform the first encoding on the first training image 1102, and the bitrate of the bitstream obtained via the first encoding with respect to the first training image 1102.

Figure 26:
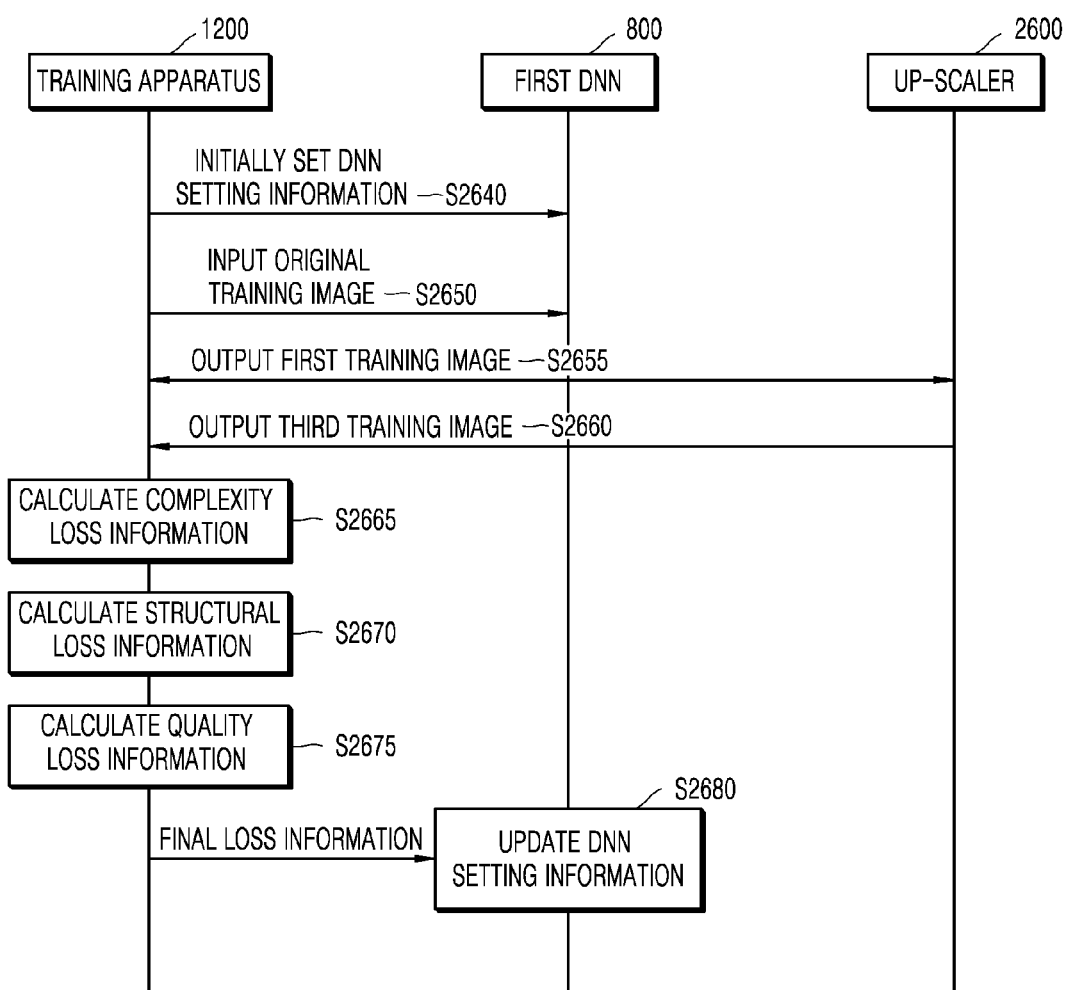
FIG. 26 is a flowchart for explaining a method, performed by a training apparatus, of training a first DNN when an opposite mobile communication terminal does not support AI upscaling according to an embodiment.

FIG. 26 is a flowchart for explaining a method, performed by a training apparatus 1200, of training a first DNN 800 when an opposite mobile communication terminal does not support AI upscaling.

The training of the first DNN 800 described above with reference to FIG. 26 may be performed by the training apparatus 1200. The training apparatus 1200 includes the first DNN 800 and an up-scaler 2600. The training apparatus 1200 may be, for example, the mobile communication terminal 2200 or a separate server.

Referring to FIG. 26, the training apparatus 1200 initially sets DNN setting information of the first DNN 800, in operation S2640. Accordingly, the first DNN 800 may operate according to pre-determined DNN setting information. The DNN setting information may include information about at least one of the number of convolution layers included in the first DNN 800, the number of filter kernels for each convolution layer, the size of a filter kernel for each convolution layer, or a parameter of each filter kernel.

The training apparatus 1200 inputs the original training image 1101 into the first DNN 800, in operation S2650. The original training image 1101 may include a still image or at least one frame included in a moving image.

The first DNN 800 processes the original training image 1101 according to the initially set DNN setting information and outputs the first training image 1102 obtained by performing AI downscaling on the original training image 1101, in operation S2655. In FIG. 26, the first training image 1102 output from the first DNN 800 is directly input to the up-scaler 2600. However, the first training image 1102 output from the first DNN 800 may be input to the up-scaler 2600 by the training apparatus 1200. Also, the training apparatus 1200 may perform first encoding and first decoding on the first training image 1102 via a certain codec, and then may input the second training image to the up-scaler 2600.

The up-scaler 2600 outputs the third training image 1104 obtained by upscaling the first training image 1102 or the second training image, in operation S2660.

The training apparatus 1200 calculates the complexity loss information 1120, based on the first training image 1102, in operation S2665.

The training apparatus 1200 calculates the structural loss information 1110 by comparing the reduced training image 1103 with the first training image 1102, in operation S2670.

The training apparatus 1200 calculates the quality loss information 1130 by comparing the original training image 1101 with the third training image 1104, in operation S2675.

The first DNN 800 updates the initially-set DNN setting information via a back propagation process based on final loss information, in operation S2680. The training apparatus 1200 may calculate the final loss information for training the first DNN 800, based on the complexity loss information 1120, the structural loss information 1110, and the quality loss information 1130.

Then, the training apparatus 1200 and the first DNN 800 repeat operations S2640 through S2680 until pieces of final loss information are minimized, to update the DNN setting information. At this time, during each repetition, the first DNN 800 operates according to the DNN setting information updated in the previous operation.

Figure 27:
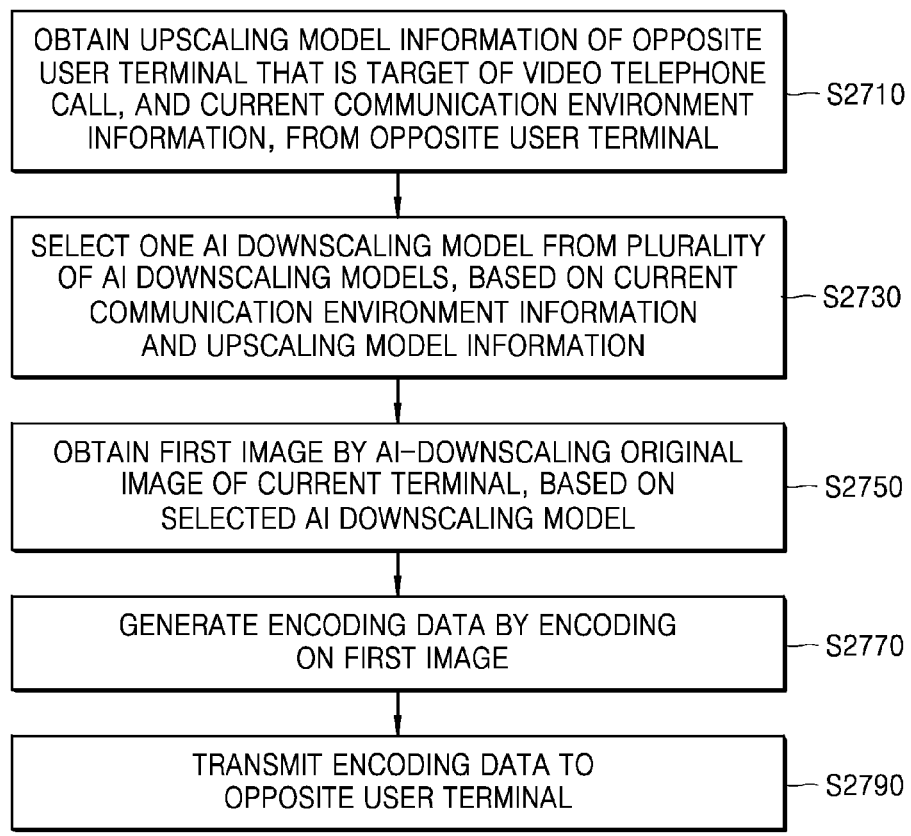
FIG. 27 is a flowchart of a method of adaptively AI-downscaling an image during a video telephone call of a terminal, according to another embodiment.

FIG. 27 is a flowchart of a method of adaptively AI-downscaling an image during a video telephone call of a terminal, according to another embodiment.

In operation S2710, the mobile communication terminal 2200 obtains upscaling model information of an opposite user terminal that is a target of a video telephone call, and current communication environment information, from the opposite user terminal. The current communication environment information indicates a bandwidth, a bitrate, and the like allowable in a current communication environment, and upscaling information indicates an upscaling method usable by the opposite user terminal.

In operation S2730, the mobile communication terminal 2200 selects one AI downscaling model from a plurality of AI downscaling models, based on the current communication environment information and the upscaling model information.

In operation S2750, the mobile communication terminal 2200 obtains a first image by AI-downscaling an original image of a current terminal, based on the selected AI downscaling model.

The mobile communication terminal 2200 determines a downscaling target, based on a certain criterion, obtains DNN setting information corresponding to the downscaling target from among a plurality of pieces of pre-stored DNN setting information, and performs AI downscaling on the original image 1900 through the first DNN operating according to the obtained DNN setting information.

In operation S2770, the mobile communication terminal 2200 generates encoding data by encoding the first image. When the upscaling information of the opposite user terminal indicates that AI upscaling is possible, the encoding data includes image data of the first image and AI data related to AI downscaling. When the upscaling information of the opposite user terminal indicates that one legacy upscaling method instead of AI upscaling is possible, the encoding data includes the image data of the first image and does not include the AI data related to AI downscaling.

In operation S2790, the mobile communication terminal 2200 transmits the encoding data to the opposite user terminal. The opposite user terminal reconstructs an image, based on the received encoding data.

Figure 28:
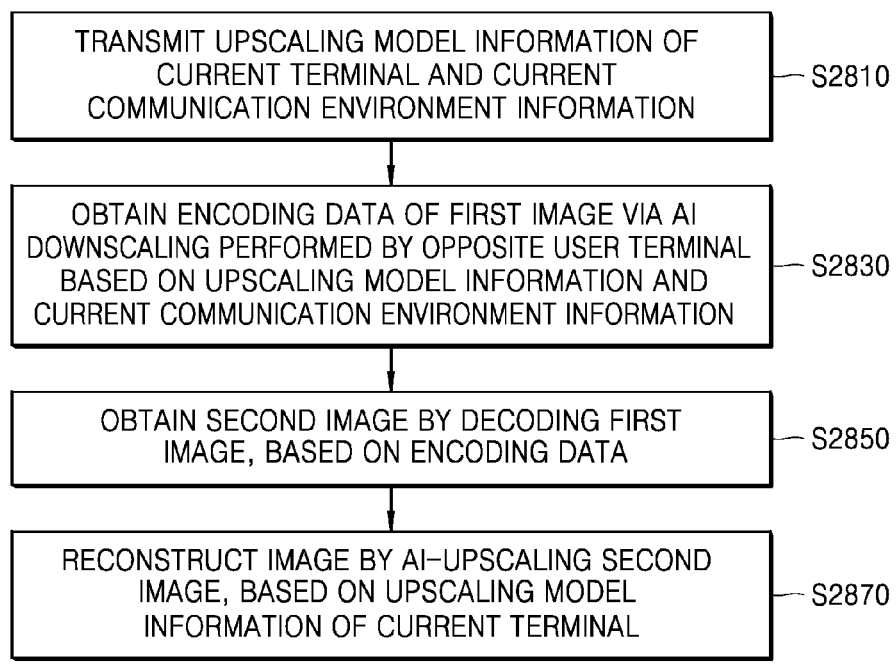
FIG. 28 is a flowchart of a method of AI-upscaling an image during a video telephone call of a terminal, according to another embodiment.

FIG. 28 is a flowchart of a method of AI-upscaling an image during a video telephone call of a terminal, according to another embodiment.

In operation S2810, the mobile communication terminal 2300 transmits upscaling model information of a current terminal and current communication environment information.

In operation S2830, the mobile communication terminal 2300 obtains encoding data of a first image via AI downscaling performed by an opposite user terminal based on the upscaling model information and the current communication environment information. The encoding data may include image data of the first image and AI data related to the AI downscaling. The mobile communication terminal 2300 may obtain the encoding data from the mobile communication terminal 2200 through a communication network.

In operation S2850, the mobile communication terminal 2300 obtains a second image by decoding the first image, based on the encoding data. The mobile communication terminal 2300 supporting AI upscaling includes the image data and the AI data.

In operation S2870, the mobile communication terminal 2300 reconstructs an image by AI-upscaling the second image, based on the upscaling model information of the current terminal. The mobile communication terminal 2300 supporting AI upscaling obtains DNN setting information for AI-upscaling from the AI data related to the AI downscaling, which is included in the encoding data, and reconstructs an image via AI upscaling based on the obtained DNN setting information for AI-upscaling.

As another example, the mobile communication terminal 2400 not supporting AI upscaling and supporting legacy upscaling obtains encoding data including only image data without AI data, and reconstructs an image according to a method of upscaling an AI-downscaled first image, based on the image data, the method being supported by the mobile communication terminal 2400.

As another example, when a current communication environment is good, a current terminal transmits only current communication environment information, receives encoding data of an original image from an opposite user terminal, and reconstructs an image, based on encoding data.

The above-described embodiments of the disclosure can be written as computer-executable programs, and the written computer-executable programs can be stored in a medium.

The medium may continuously store the computer-executable programs, or temporarily store the computer-executable programs for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to the above-described DNN may be implemented by using a software module. When the DNN model is implemented by using a software module (for example, a program module including instructions), the DNN model may be stored in a computer-readable recording medium.

The DNN model may be a part of the above-described AI decoding apparatus 200 or AI encoding apparatus 600 by being integrated in the form of a hardware chip. For example, the DNN model may be manufactured in the form of an exclusive hardware chip for AI, or may be manufactured as a part of an existing general-purpose processor (for example, a CPU or an AP) or a graphic-exclusive processor (for example, a GPU).

The DNN model may be provided in the form of downloadable software. For example, a computer program product may include a product (e.g., a downloadable application) in the form of a software program that is electronically distributed through a manufacturer or an electronic market. For electronic distribution, at least a portion of the software program may be stored on a storage medium or may be created temporarily. In this case, the storage medium may be a server of the manufacturer or electronic market, or a storage medium of a relay server.

By applying appropriate AI downscaling to a video call image by ascertaining specifications or processing power of an opposite user terminal during a video telephone call, a downscaled image having improved image quality is obtained and efficiently transmitted and is effectively upscaled by the opposite user terminal, and thus a video call image may be reconstructed.

While one or more embodiments of the disclosure have been described with reference to the figures, it will be understood by those of ordinary skill in the art that various changes in form and details may be made therein without departing from the spirit and scope as defined by the following claims.

What is claimed is:

1. A mobile communication terminal capable of video telephone calling with an opposite user terminal, the mobile communication terminal comprising:
   a memory; and
   at least one processor,
   wherein the memory stores instructions executable by the at least one processor, and
   the at least one processor is configured to:
   obtain, from the opposite user terminal, artificial intelligence (AI) upscaling support information of the opposite user terminal that is a target of a video telephone call, the mobile communication terminal and the opposite user terminal being user terminals at opposing ends of the video telephone call;
   determine whether to perform AI downscaling on an original image, based on the AI upscaling support information;
   based on determining to perform the AI downscaling on the original image, obtain a first image by AI downscaling the original image using a downscaling deep neural network (DNN);
   generate image data by performing first encoding on the first image; and
   transmit the image data and AI data including information related to the AI downscaling.

2. The mobile communication terminal of claim 1, wherein, based on the AI upscaling support information indicating that the opposite user terminal supports AI upscaling, the at least one processor is configured to determine to perform the AI downscaling on the original image.

3. The mobile communication terminal of claim 1, wherein, based on the AI upscaling support information indicating that the opposite user terminal does not support AI upscaling, the at least one processor is configured to determine to not perform the AI downscaling on the original image and to perform first encoding on the original image to generate and transmit the image data.

4. The mobile communication terminal of claim 1, wherein:
   the AI upscaling support information is AI data associated with AI downscaling of a video call image by the opposite user terminal; and
   based on the AI data associated with the AI downscaling of the video call image by the opposite user terminal being obtained, the at least one processor is configured to determine that the opposite user terminal supports AI upscaling.

5. The mobile communication terminal of claim 1, wherein the AI upscaling support information is flag information included in AI data associated with AI downscaling of a video call image by the opposite user terminal.

6. The mobile communication terminal of claim 1, wherein the AI upscaling support information is received through a real-time transport control protocol.

7. The mobile communication terminal of claim 1, wherein DNN setting information of the downscaling DNN is obtained by jointly training the downscaling DNN with an upscaling DNN for AI-upscaling a second image obtained by decoding the image data.

8. A mobile communication terminal capable of video telephone calling with an opposite user terminal, the mobile communication terminal comprising:
   a memory; and
   at least one processor,
   wherein the memory stores instructions executable by the at least one processor, and the at least one processor is configured to:
   transmit, to the opposite user terminal that is a target of a video telephone call, artificial intelligence (AI) upscaling support information of the mobile communication terminal, the mobile communication terminal and the opposite user terminal being user terminals at opposing ends of the video telephone call;
   obtain image data generated as a result of performing first encoding on a first image AI downscaled by the opposite user terminal based on the transmitted AI upscaling support information;
   obtain a second image corresponding to the first image by performing first decoding on the image data; and
   obtain an AI-upscaled reconstructed image from the second image through an upscaling deep neural network (DNN).

9. The mobile communication terminal of claim 8, wherein:
   the at least one processor is configured to:
   obtain AI data related to AI downscaling from an original image to the first image, and
   obtain, from a plurality of pieces of DNN setting information, DNN setting information for AI upscaling the second image, based on the AI data; and
   the upscaling DNN operates according to the obtained DNN setting information.

10. The mobile communication terminal of claim 9, wherein the plurality of pieces of DNN setting information are obtained through joint training of the upscaling DNN and a downscaling DNN for use in the AI downscaling of the original image.

11. The mobile communication terminal of claim 8, wherein the AI upscaling support information indicates that the mobile communication terminal supports AI upscaling.

12. The mobile communication terminal of claim 8, wherein based on the AI upscaling support information indicating that the mobile communication terminal does not support AI upscaling, the at least one processor is configured to:

obtain image data by performing first encoding on an original image that does not undergo AI downscaling; and obtain a reconstructed image corresponding to the original image by performing first decoding on the image data.

13. The mobile communication terminal of claim 8, wherein the AI upscaling support information is AI data associated with AI downscaling of a video call image by the mobile communication terminal.

14. A method of adaptively performing artificial intelligence (AI) downscaling on an image during a video telephone call of a user terminal, the method comprising:

obtaining, by the user terminal from an opposite user terminal, AI upscaling support information of the opposite user terminal that is a target of a video telephone call, the user terminal and the opposite user terminal being at opposing ends of the video telephone call;

determining whether the user terminal is to perform AI downscaling on an original image, based on the AI upscaling support information;

based on determining that the user terminal is to perform the AI downscaling on the original image, obtaining a first image by AI downscaling the original image using a downscaling deep neural network (DNN);

generating image data by performing first encoding on the first image; and transmitting the image data and AI data including information related to the AI downscaling.

15. The method of claim 14, wherein the determining whether the user terminal is to perform the AI downscaling comprises determining to perform the AI downscaling based on the AI upscaling support information indicating that the opposite user terminal supports AI upscaling.

* * * * *